(12) United States Patent
Ohshita

(10) Patent No.: US 6,606,842 B2
(45) Date of Patent: *Aug. 19, 2003

(54) APPARATUS FOR DISPENSING CHANGE

(75) Inventor: Mizuo Ohshita, Yono (JP)

(73) Assignee: Laurel Bank Machines, Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,916

(22) Filed: Jun. 3, 1999

(65) Prior Publication Data
US 2002/0005031 A1 Jan. 17, 2002

(30) Foreign Application Priority Data
Jun. 5, 1998 (JP) .......................... 10-174174

(51) Int. Cl.⁷ .................. B65B 35/30; G06F 7/08
(52) U.S. Cl. ................. 53/532; 53/212; 53/373.7; 53/474; 209/534; 209/592; 235/379; 235/381; 705/16
(58) Field of Search ............ 53/532, 536, 212, 53/473, 476, 477, 373.7, 375.9, 372.7, 474; 209/534, 592, 593; 235/379, 381; 705/16

(56) References Cited

U.S. PATENT DOCUMENTS

| | | | | |
|---|---|---|---|---|
| 3,931,612 A | * | 1/1976 | Stevens et al. | 340/172.5 |
| 3,963,900 A | * | 6/1976 | Sawaguchi et al. | 235/379 |
| 4,636,950 A | * | 1/1987 | Caswell et al. | 364/403 |
| 4,646,767 A | * | 3/1987 | Hikita | 133/8 R |
| 4,940,162 A | | 7/1990 | Thie | |
| 4,995,848 A | | 2/1991 | Goh | |
| 5,110,009 A | | 5/1992 | Gartner | |
| 5,264,665 A | | 11/1993 | Delfer | |
| 5,326,959 A | * | 7/1994 | Perazza | 235/379 |
| 5,573,457 A | * | 11/1996 | Watts et al. | 453/31 |
| 5,909,492 A | * | 6/1999 | Payne et al. | 380/24 |
| 5,940,623 A | * | 8/1999 | Watts et al. | 395/712 |
| 6,016,479 A | * | 1/2000 | Taricani, Jr. | 705/19 |
| 6,021,400 A | * | 2/2000 | Gallacher et al. | 705/43 |
| 6,058,375 A | * | 5/2000 | Park | 705/30 |

FOREIGN PATENT DOCUMENTS

| | | |
|---|---|---|
| JP | 5-12538 | 1/1993 |
| JP | 8-198413 | 8/1996 |
| JP | 9-147184 | 6/1997 |
| JP | 10-95524 | 4/1998 |

\* cited by examiner

Primary Examiner—Rinaldi I. Rada
Assistant Examiner—Christopher R Harmon
(74) Attorney, Agent, or Firm—Nixon & Vanderhye PC

(57) ABSTRACT

The apparatus for packing cash in a change pack based on input change data of the present invention comprises: a contractor register for registering a contractor; a store register for registering a store of the contractor; a cash-register register for registering a cash register of the store; and a data input device for registering change data by at least one of store and cash register and by day.

8 Claims, 51 Drawing Sheets

APPARATUS FOR DISPENSING CHANGE

BACKGROUND OF THE INVENTION

1. Field of the Invention

The present invention relates to an apparatus for dispensing change, which is suitable for preparation of desired amounts and types of change, and to a cash supply apparatus for packing a desired amount and type of coins and bills.

This application is based on Japanese Patent Application No. Hei 10-174174, the contents of which are incorporated herein by reference.

2. Description of the Related Art Including Information Disclosed Under 37 CFR 1.97 and 1.98

Stores handling cash put the sales in banks, which calculate the sales. Recently, the amount of cash put in the banks by large stores has increased, and there are security problems when the sales are put in night safe boxes. Therefore, business service companies or security companies collect the sales from the stores, and integrated processing centers calculate the sales.

The integrated processing centers must prepare cash which the dealers use for change on the next day (hereinafter simply referred to as "change"). Japanese Unexamined Patent Application, First Publication No. Hei 9-147184 discloses an apparatus for dispensing change.

In the disclosed apparatus for dispensing change, a cash deliverer delivers cash to a change box transferred by a conveyer. Then the cash, which is loaded into the change box, must be manually transferred into a bag.

There is the problem that this apparatus for dispensing change increases the labor costs because the cash is manually transferred from the change box to the bag. To avoid this, the cash may not be delivered in the change box but may be directly packed, thereby decreasing the labor costs.

When directly packing the cash, change data of the change packs must be input by a contractor in a similar manner to the apparatus for dispensing change in the background art. However, the apparatus of the background art, which allows the input of the change data by contractor, can prepare the same amount of change everyday, but cannot prepare a different amount of change each day.

BRIEF SUMMARY OF THE INVENTION

It is therefore an object of the present invention to provide an apparatus for dispensing change which can prepare a different amount of change each day.

In order to accomplish the above object, the apparatus for dispensing change and packing cash in a change pack based on input change data, comprises: a contractor register for registering a contractor; a store register for registering a store of the contractor; a cash-register register for registering a cash register of the store; and a data input device for registering change data by at least one of the store and cash register and by day.

The apparatus allows the registration of the change data by at least one of store and cash register and by day, so that the apparatus can prepare a different amount of change.

The data input device allows the registration of the relationship of the delivery date of the change pack to the production date of the change pack. Based on the registered relationship between the delivery date and the production date, an appropriate production can be automatically set in response to the input of the delivery date.

Therefore, when the delivery date is determined, the apparatus automatically produces the change pack on the preset production date.

The apparatus further comprises: a reserve calculator for adding up all the change data of change to be prepared on the day of producing the change packs, and calculating the amount of each type of cash to be prepared; and a printer for printing the amount of each type of cash calculated by the reserve calculator. Therefore, an operator can easily grasp the necessary reserve before the production date.

The apparatus may further comprise a contractor-based production instructor for producing the change packs by contractor in response to an instruction. This apparatus can produce the change pack by contractor.

The store register may register a delivery route with the store. This apparatus allows the operator to understand the delivery route of the change packs.

The apparatus may further comprise a delivery-route-based production instructor for producing the change packs by delivery route in response to an instruction. This apparatus can produce the change packs by delivery route.

BRIEF DESCRIPTION OF THE DRAWINGS

FIG. 9A shows the open condition, and FIG. 9B shows the closed condition.

DETAILED DESCRIPTION OF THE INVENTION

First Embodiment

Figure 1:
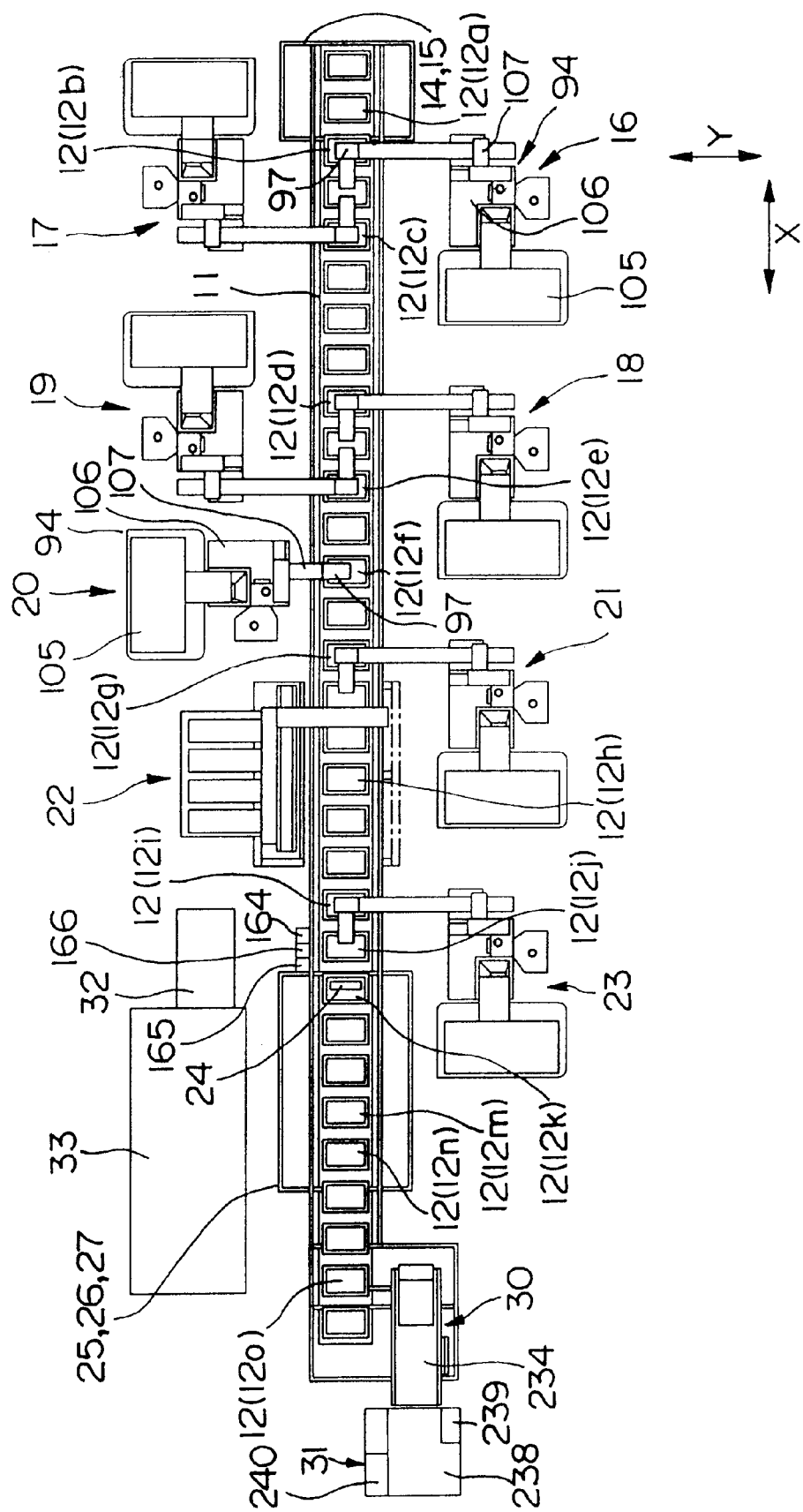
FIG. 1 is a schematic view showing the first embodiment of the apparatus for dispensing change of the present invention.
Figure 54:
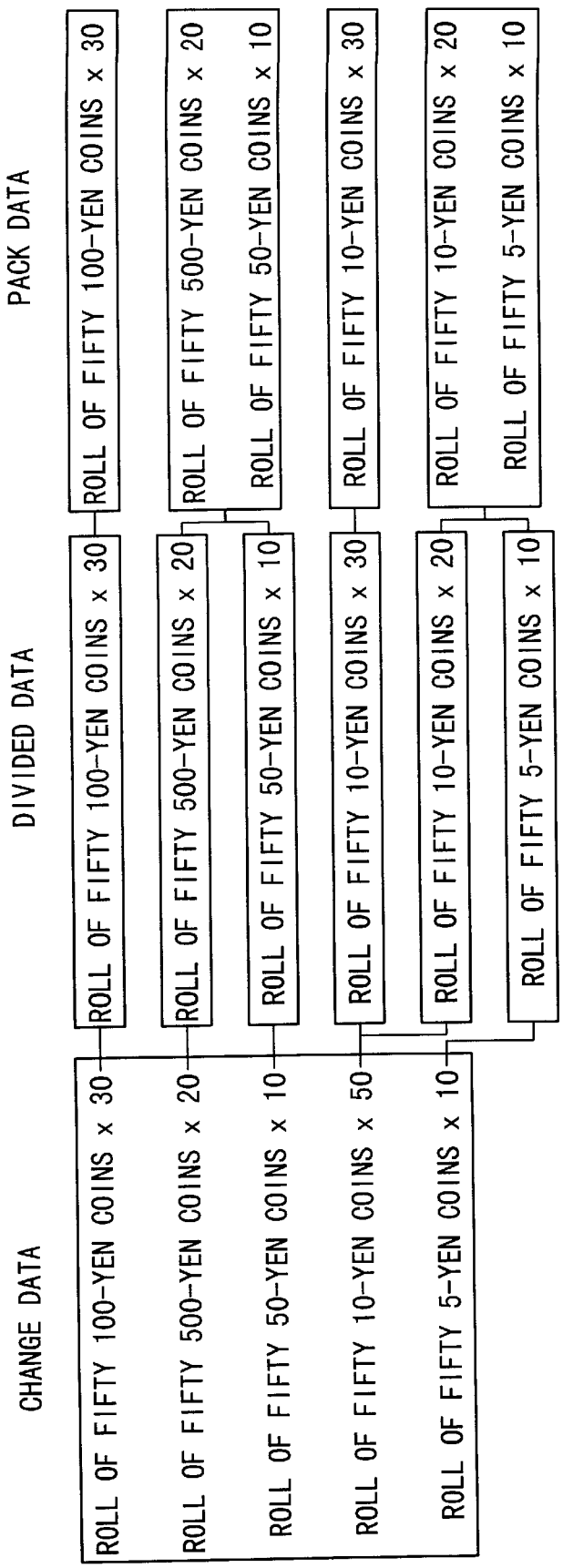
FIG. 54 is an example of division of the change data into pack data in the first embodiment of the present invention.

Referring to FIGS. 1 to 54, the best mode of the apparatus for dispensing change, according to a first embodiment of the present invention, will be explained.

The apparatus packs change based on input change data. Specifically, the apparatus divides the change data of a large amount of cash into a plurality of pack data so as to pack the cash corresponding to the pack data into a change pack. That is, the apparatus packs the change based on divided pack data.

Figure 2:
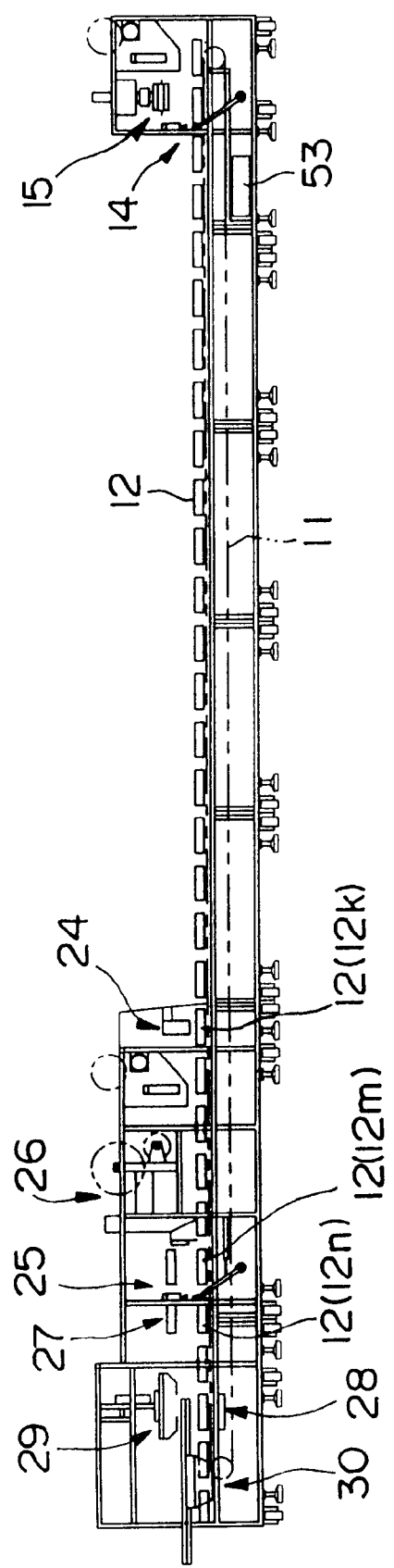
FIG. 2 is a side view showing the first embodiment of the apparatus for dispensing change of the present invention.

The apparatus for dispensing change, as shown in FIGS. 1 and 2, comprises an endless-type main conveyer (conveyer) II extending horizontally, and a number of containers 12 with identical shapes which are fixed to the main conveyer 11 at even intervals. The apparatus produces a change pack packing cash using containers 12. In the following description, "upstream" and "downstream" are relative to the traveling direction of the containers 12 on the upper side of the conveyer. Hereinafter, in FIGS. 1 and 2, the right direction will be referred to as "upstream", while the left direction will be referred to as "downstream". The X-direction represents the direction parallel to the transfer of the container 12 on the upper side of the conveyer (the right-left direction in FIG. 1), and the Y-direction represents the direction perpendicular to the transfer of the containers 12 on the upper side of the conveyer (the top-bottom direction in FIG. 1).

The apparatus for dispensing change, in which the main conveyer 11 is stopped, will be explained. As shown in FIGS. 1 and 2, the apparatus for dispensing change has a base sheet supplier 14 (a base sheet supplier, or a change pack producer) and a base sheet arranger 15 which are located furthest upstream, a coin roll deliverer (a cash deliverer, a coin roll deliverer, or a change pack producer) 16 for the container 12 (12b) stopped downstream of the base sheet supplier 14 and the base sheet arranger 15, and a coin roll deliverer 17 (a cash deliverer, a coin roll deliverer, or a change pack producer) for the container 12 (12c) stopped downstream of the container 12 (12b).

Additionally, the apparatus for dispensing change has a coin roll deliverer 18 (a cash deliverer, a coin roll deliverer, or a change pack producer) for the container 12 (12d) stopped downstream of the container 12 (12c), a coin roll deliverer 19 (a cash deliverer, a coin roll deliverer, or a change pack producer) for the container 12 (12e) stopped downstream of the container 12 (12d), a coin roll deliverer (a cash deliverer, a coin roll deliverer, or a change pack producer) 20 for the container 12 (12f) stopped downstream of the container 12 (12e), and a coin roll deliverer (a cash deliverer, a coin roll deliverer, or a change pack producer) 21 for the container 12 (12g) stopped downstream of the container 12 (12f).

Further, the apparatus for dispensing change has a stacked bills deliverer (a cash deliverer, a stacked bills deliverer, or a change pack producer) 22 for the container 12 (12h) stopped downstream of the container 12 (12g), a coin roll deliverer 23 (a cash deliverer, a coin roll deliverer, or a change pack producer) for the container 12 (12i) stopped downstream of the container 12 (12h), a load adjuster 24 for the container 12 (12k) stopped downstream of the container 12 (12j), a top sheet supplier (a top sheet supplier, or a change pack producer) 25 for the containers 12 (12m and 12n), a labeler (labeler for printing and adhering a label) 26, and a bonding device (a change pack producer) 27.

Figure 3:
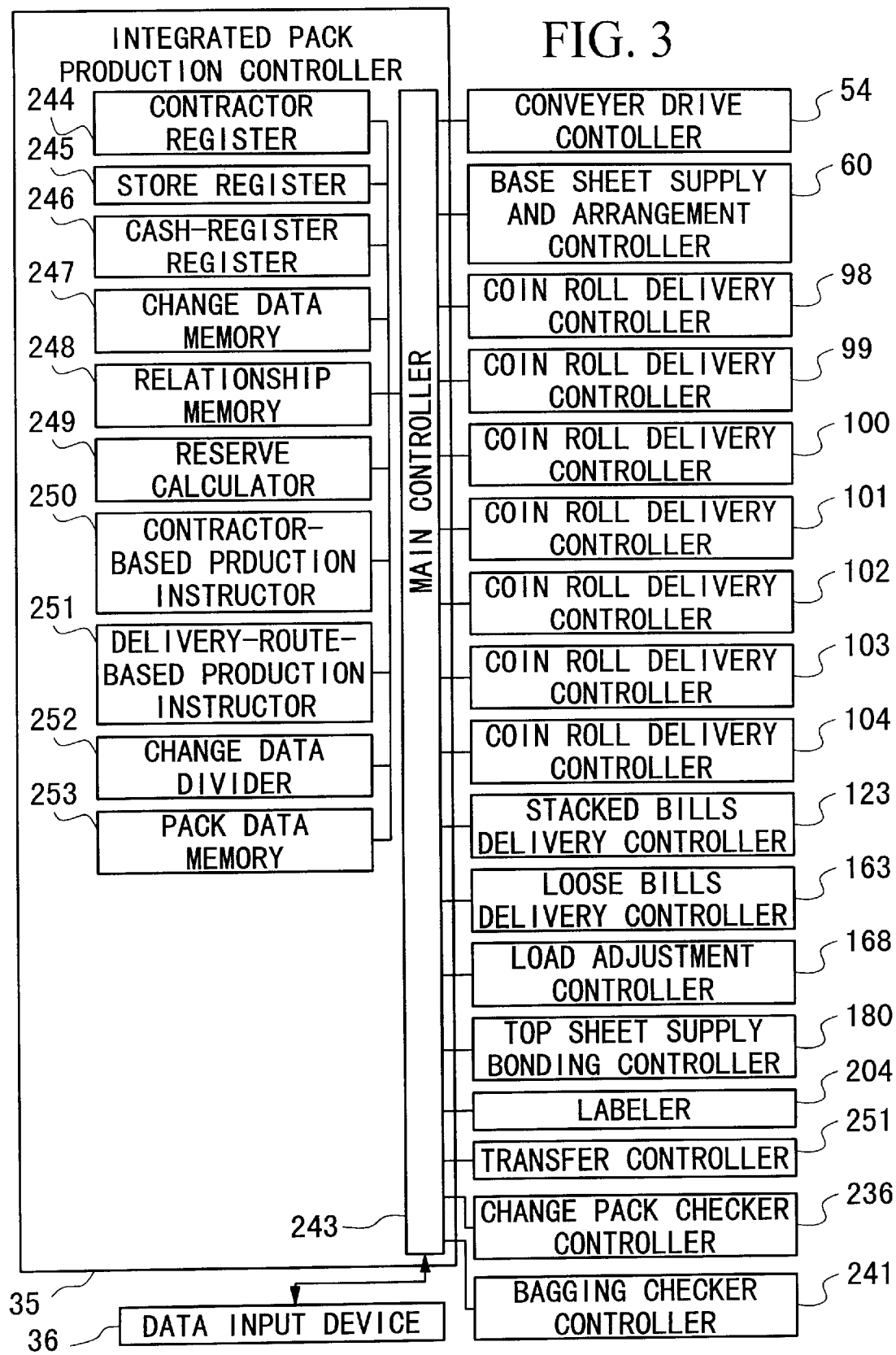
FIG. 3 is a block diagram showing a control system in the first embodiment of the apparatus for dispensing change of the present invention.

The apparatus for dispensing change has a lifter 28 for the container 12 (12o) stopped downstream of the container 12 (12n), a transfer device 29 above the lifter 28, a checker (change pack checker) 30 parallel to the downstream portion of the main conveyer 11, a bagging checker 31 located downstream of the checker 30, a loose bills deliverer 32 located near the container 12 (12j) which is positioned between the containers 12 (12i) and 12 (12k), and a controller 33 adjacent to the loose bills deliverer 32. The controller 33, as shown in FIG. 3, comprises an integrated pack production controller 35 for controlling the entire operation of the apparatus for dispensing change, and a data input device (data input means) 36 for inputting data for the change pack.

Figure 4:
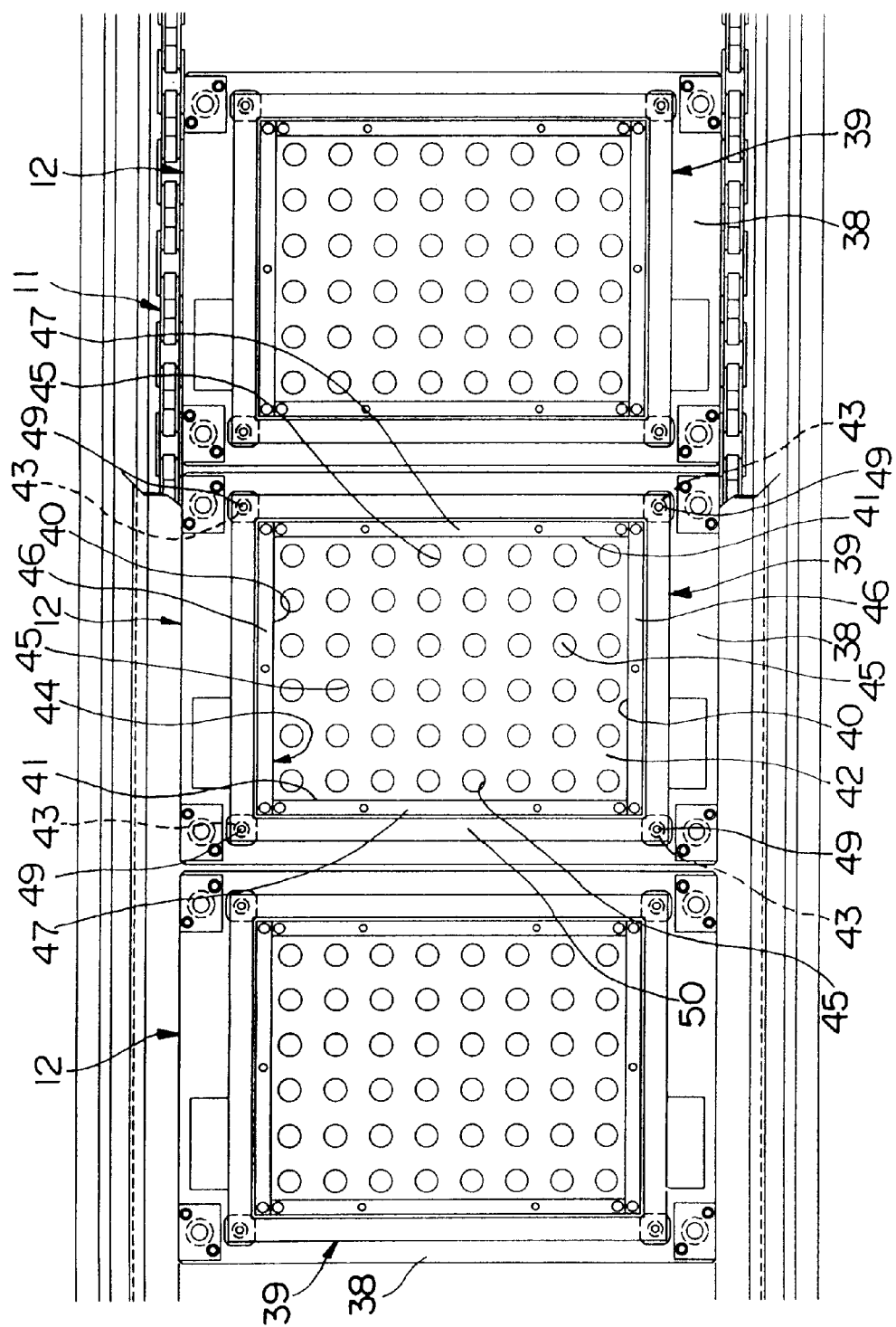
FIG. 4 is a top view showing containers of the first embodiment of the present invention.
Figure 5:
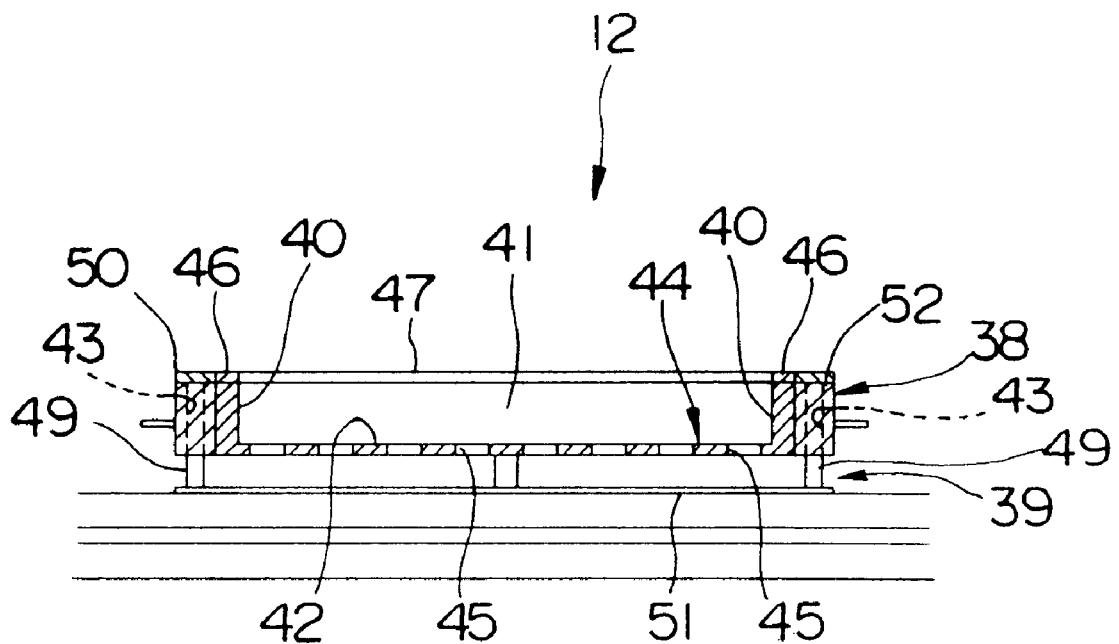
FIG. 5 is a front view showing the containers of the first embodiment of the present invention.

As shown in FIGS. 4 and 5, the container 12 comprises a container body (a change pack producer, or a base) 38 coupled to the main conveyer 11, and a stopper 39 coupled to the container body 38. Hereinafter, a description will be give for when the container 12 is positioned on the upper side of the main conveyer 11.

The container body 38 has a pair of walls 40 which extend in the X-direction along the main conveyer 11, stand vertically, and are parallel to each other, a pair of walls 41 which connect the ends of the walls 40, and stand vertically, and a flat bottom 42 positioned horizontally so as to seal the lower opening of the space enclosed by the walls 40 and 41. That is, the container body 38 is a box with an upper opening and a concavity 44 as seen from the upper side.

Through holes 43 are made at the corners of the container body 38 and extend vertically.

A number of through holes 45, which extend vertically, are distributed over the bottom 42 of the container body 38, and are located at the intersections of a number of virtual lines at even intervals in the X-direction and in the Y-direction.

On the top horizontal surfaces of the walls 40 adjacent to the concavity 44, heat resisting seal receptors 46 are fixed. Similarly, on the top horizontal surfaces of the walls 41 adjacent to the concavity 44, heat resisting seal receptors 47 are fixed. The seal receptors 46 and 47 forms a rectangular shape.

The stopper 39 comprises shafts 49 inserted movably in the vertical direction into the through holes 43 at the four corners of the container body 38, horizontal flat stopper portion 50 fixed at the tops of the shafts 49, and a horizontal flat operational portion 51 with a rectangular shape which is fixed to the lower ends of the shafts 49.

The stopper portion 50 is disposed on holding surface 52 which is arranged outside of the seal receptors 46 and 47 on the walls 40 and 41, so as to surround the seal receptors 46 and 47. The shafts 49 are longer than the through holes 43 so that the stopper portion 50 can separate from the holding surfaces 52 of the container body 38. When a base sheet BS is held between the stopper portion 50 and the holding surface 52, the upper surfaces of the stopper portion 50 are lower than the upper surfaces of the seal receptors 46 and 47, as described later.

The containers 12 with the structure described above are disposed at even intervals on the main conveyer 11 which is transferred in the horizontal direction.

The main conveyer 11 is equipped with a drive unit 53 such as an air cylinder (shown in FIG. 2) for transferring the containers 12 intermittently by a pitch corresponding to the distance between the containers 12 (repeated moving and stopping). The drive unit 53 is electrically connected to a conveyer drive controller 54 (shown in FIG. 3) which controls the driving operation.

Base Sheet Supplier

Figure 6:
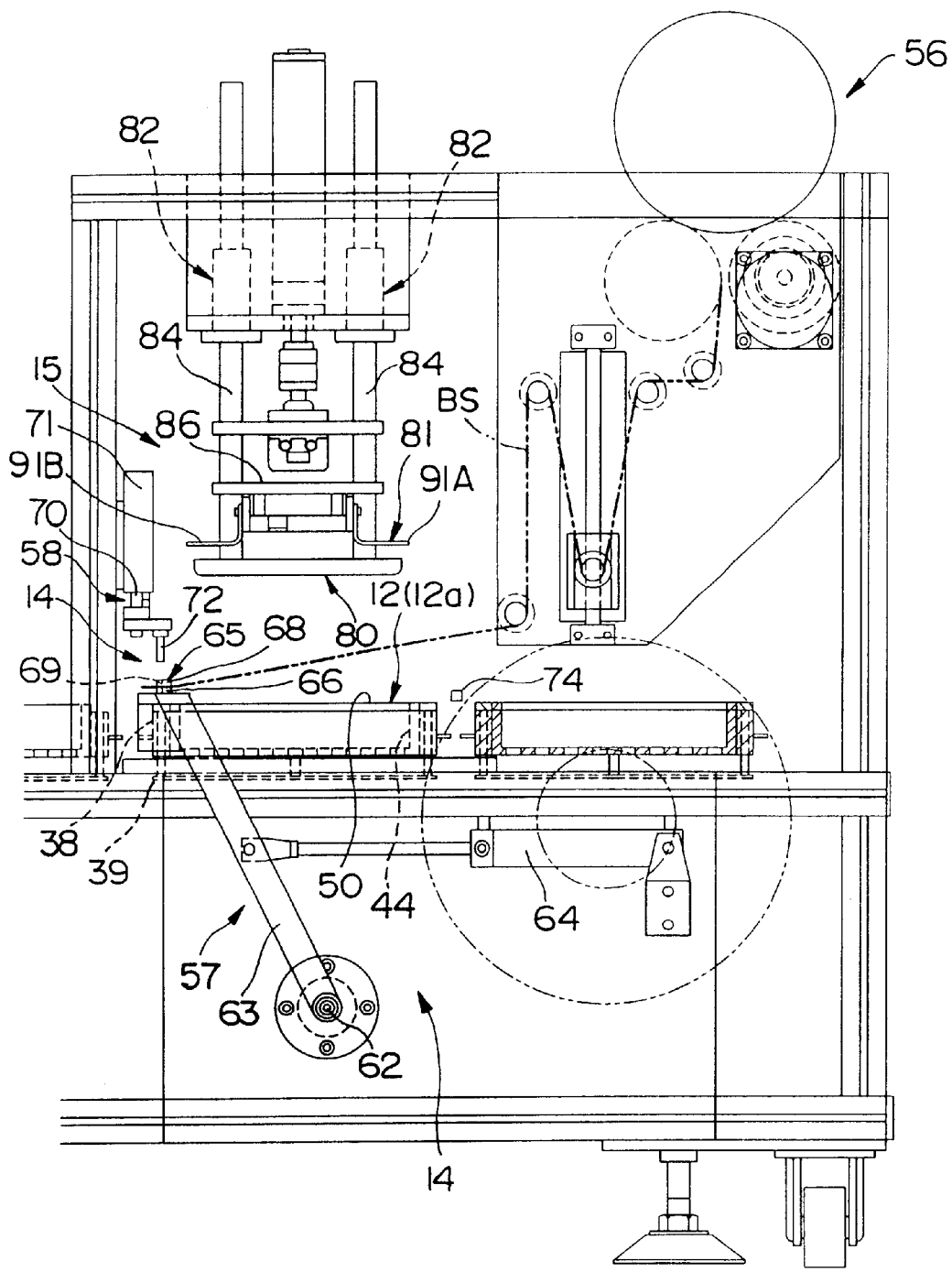
FIG. 6 is a side view showing a base sheet supplier and a base sheet arranger in the first embodiment of the present invention.
Figure 7:
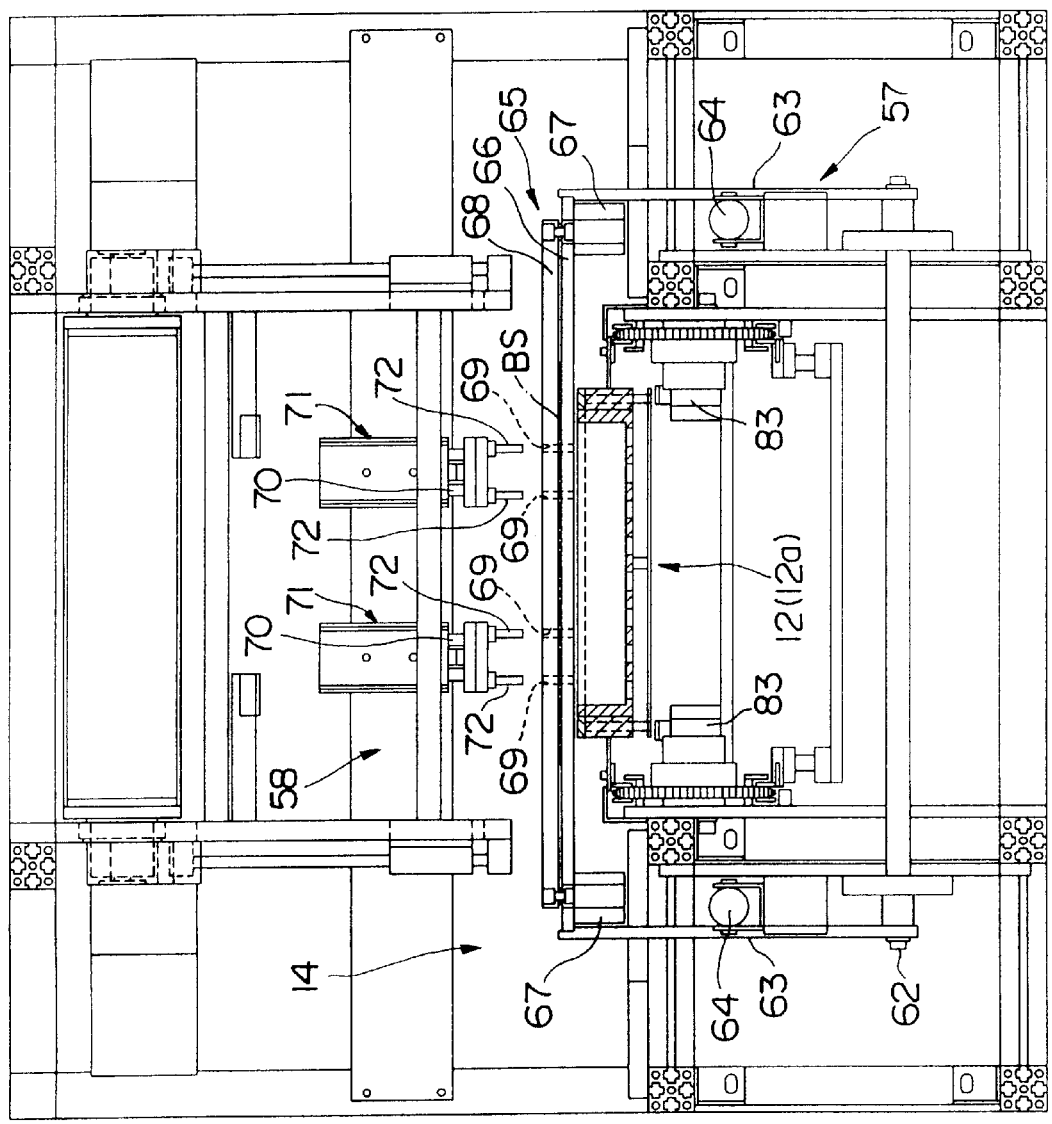
FIG. 7 is a front view showing the base sheet supplier and the base sheet arranger in the first embodiment of the present invention.
Figure 8:
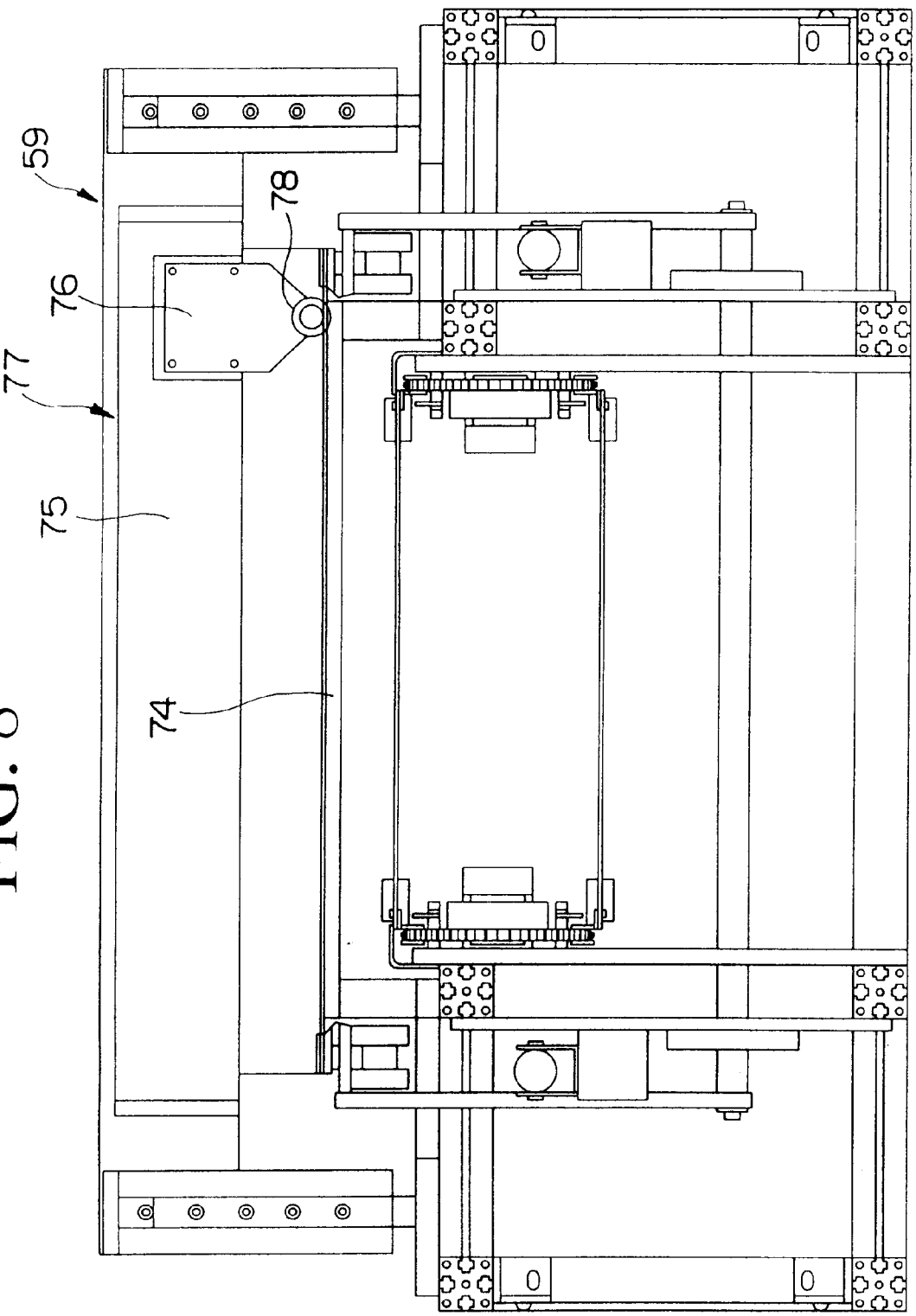
FIG. 8 is a front view showing a base sheet cutter in the first embodiment of the present invention.

The base sheet supplier 14 will be explained. The base sheet supplier, as shown in FIGS. 6 to 8, extracts the base sheet (a pack material) BS and provides it onto the upper surface of the container 12 (12a). The base sheet BS is rolled up and is supported by a supporter 56 which is positioned upstream of and above the container 12 (12a) stopped at a predetermined base sheet supply position. The base sheet BS is long and is made of transparent or semi-transparent synthetic resin. The base sheet supplier 14 comprises a base sheet extractor 57 for extracting the base sheet BS in the direction of the movement of the container 12, a base sheet engager 58 for holding the extracted base sheet BS, and a base sheet cutter 59 for cutting the extracted base sheet BS. These three parts are electrically connected to a base sheet supply and arrangement controller 60 (a change pack producer) (shown in FIG. 3) which controls the driving operation of the three parts.

The base sheet extractor 57 comprises: a support shaft 62 positioned in the Y-direction below the container 12 (12a), a pair of extracting arms 63 whose lower ends are supported by the ends of the support shaft 62, and a pair of drive units 64, such as air cylinders, which are positioned above the support shaft 62, extend in the X-direction, and are connected to the middles of the corresponding extracting arms 63. Between the upper ends of the extracting arms 63, a catcher 65 for holding the base sheet BS is provided across the container 12 (12a). The drive units 64 rotate the extracting arms 63 to move the catcher 65 between a base position upstream of the container 12 (12a) and an extraction position downstream of the container 12 (12a).

The catcher 65 attached to the upper ends of the extracting arms 63 comprises: a catcher base 66 extending in the Y-direction, drive units 67, such as air cylinders, positioned at both ends of the catcher base 66; and a catcher body 68 which is connected to the drive units 67, and is positioned above and is parallel to the catcher base 66. By operating the drive units 67, the catcher body 68 comes close to the catcher base 66 to catch the base sheet BS therebetween. On the other hand, the drive unit 67 separates the catcher body 68 from the catcher base 66 so that the base sheet BS is released.

The catcher body 68 and the catcher base 66 have, for example, four grooves 69 which are formed in the downstream portions of the catcher body 68 and the catcher base 66. The grooves extend vertically when the catcher body 68 and the catcher base 66 are positioned at the extraction position.

The base sheet engager 58 is positioned above the catcher 65 at the extraction position located downstream of the base sheet engager 58. The base sheet engager 58 comprises a plurality of, for example, two drive units 71, such as air cylinders, with movable shafts 70, and two pins 72 fixed at the lower ends of the movable shafts 70. The pins 72 which are moved down by the drive units 71 are inserted into the grooves 69 of the catcher 65 which is positioned at the extraction position, so that the lower ends of the pins 72 are moved down to contact the upper surface of the downstream portion of the stopper portion 50 of the container 12 (12a).

The base sheet cutter 59 is positioned upstream of the container 12 (12a) at the base sheet supply position and extends in the Y-direction. The base sheet cutter 59 comprises: a cutter rail 74 which has a groove (not shown) extending in the Y-direction on the upper surface of the cutter rail 74; a guide rail 75 which is positioned above the cutter rail 74 and is parallel to the cutter rail 74; a drive unit 77 with a movable body 76 which is movable along the guide rail 75; and a disc-shaped cutter 78 which is provided rotatably at the lower end of the movable body 76 so as to allow the lower edge of the cutter 78 into the groove on the cutter rail 74. When the movable body 76 is moved by the drive unit 77, the cutter 78 runs on the cutter rail 74 in the Y-direction, and as the result, the base sheet BS on the cutter rail 74 is cut.

Base Sheet Arranger

The base sheet arranger 15 will now be explained. The base sheet arranger 15 is located above the container 12 (12a) stopped at the base sheet supply position. The base sheet arranger 15 comprises: a base sheet pusher 80; a base sheet insert 81; a pair of drive units 82, such as air cylinders, which are parallel to each other and move up and down the base sheet pusher 80 and the base sheet insert 81; and a pair of drive units 83 (shown in FIG. 7), such as air cylinders, for moving up and down the stopper 39 of the container 12 (12a).

The drive units 82 moves up and down vertically-movable shafts 84 extending in the vertical direction. The base sheet pusher 80 is attached to the lower ends of the vertically-movable shafts 84, and the base sheet insert 81 is attached above the base sheet pusher 80.

The base sheet pusher 80 is an approximately flat plate, as seen from the upper side, which corresponds to and is slightly narrower than the inside area of the concavity 44 of the container 12 (12a) at the base sheet supply position. The lower edges of the base sheet pusher 80 are formed with a rounded chamfer. The base sheet pusher 80 can be moved into the concavity 44 of the container 12 (12a) by the drive units 82.

The base sheet insert 81 comprises: a base plate 86 fixed to the vertically-movable shafts 84; a pair of drive units 88A and 88B, such as air cylinders, mounted on the base plate 86 so that movable shafts 87A and 87B extend in the X-direction (the right-left direction in FIG. 9) and are directed in opposite directions to each other; a pair of drive units 90A and 90B, such as air cylinders, mounted on the base plate 86 so that movable shafts 89A and 89B extend in the Y-direction (the top-bottom direction in FIG. 9) and are directed in opposite directions to each other; a pair of blades 91A and 91B fixed to the movable shafts 87A and 87B of the drive units 88A and 88B and extending in the horizontal direction; and a pair of blades 92A and 92B fixed to the movable shafts 89A and 89B of the drive units 90A and 90B and extending in the horizontal direction.

The drive units 82, 83, 88A, 88B, 90A, and 90B are electrically connected to the above described base sheet supply and arrangement controller 60.

Figure 9A:
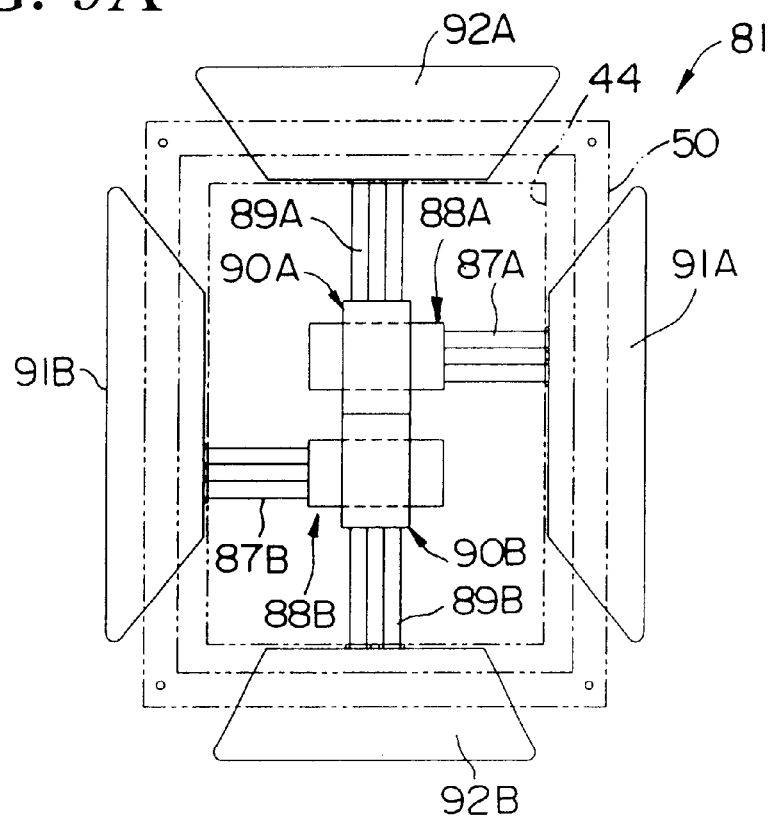
FIGS. 9A and 9B are top views showing a base sheet insert in the first embodiment of the present invention.

The drive unit 88A moves the movable shaft 87A upstream, the drive unit 88B moves the movable shaft 87B downstream, the drive unit 90A moves the movable shaft 89A in the right direction with respect to the transfer of the container 12, and the drive unit 90B moves the movable shaft 89A in the left direction with respect to the traveling direction of the container 12. Then, as shown in FIG. 9a, all blades 91A, 91B, 92A, and 92B are moved in the horizontal direction so that they are separated from each other, that is, they come to an "open condition".

Figure 9B:
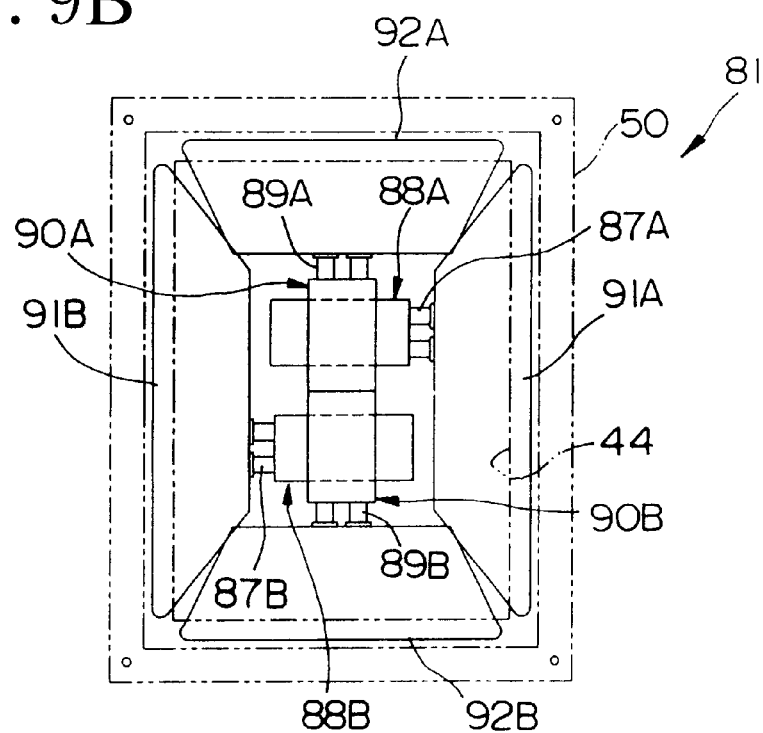

On the other hand, the drive unit 88A moves the movable shaft 87A downstream, the drive unit 88B moves the movable shaft 87B upstream, the drive unit 90A moves the movable shaft 89A to the left with respect to the transfer of the container 12, and the drive unit 90B moves the movable shaft 89A in the right direction with respect to the transfer of the container 12. Then, as shown in FIG. 9b, the blades 90A, 91B, 92A, and 92B come close to each other, that is, they come to a "closed condition".

In the closed condition, the outer edges of all the blades 91A, 91B, 92A, and 92B are positioned in and slightly separated from the stopper portion 50 of the container 12 (12a) at the base sheet supply position.

In the open condition, the outer edges of all the blades 91A, 91B, 92A, and 92B are positioned outside the stopper portion 50 of the container 12 (12a) at the base sheet supply position.

The operations of the base sheet supplier 14 and the base sheet arranger 15 controlled by the base sheet supply and arrangement controller 60 will be explained.

Figure 10:
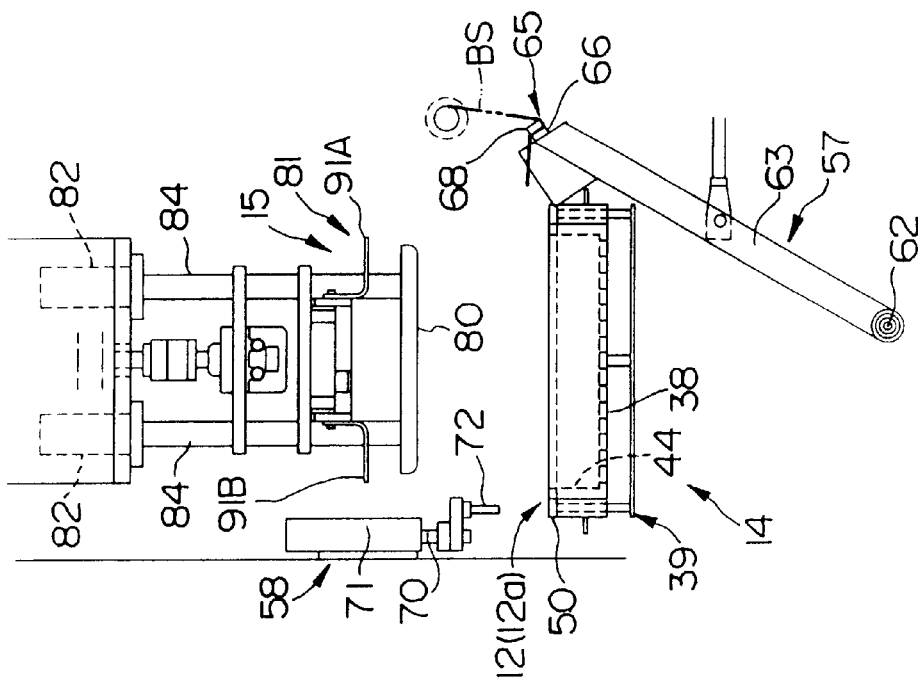
FIG. 10 is a side view showing the operations of the base sheet supplier and the base sheet arranger before extraction of the base sheet in the present invention.
Figure 11:
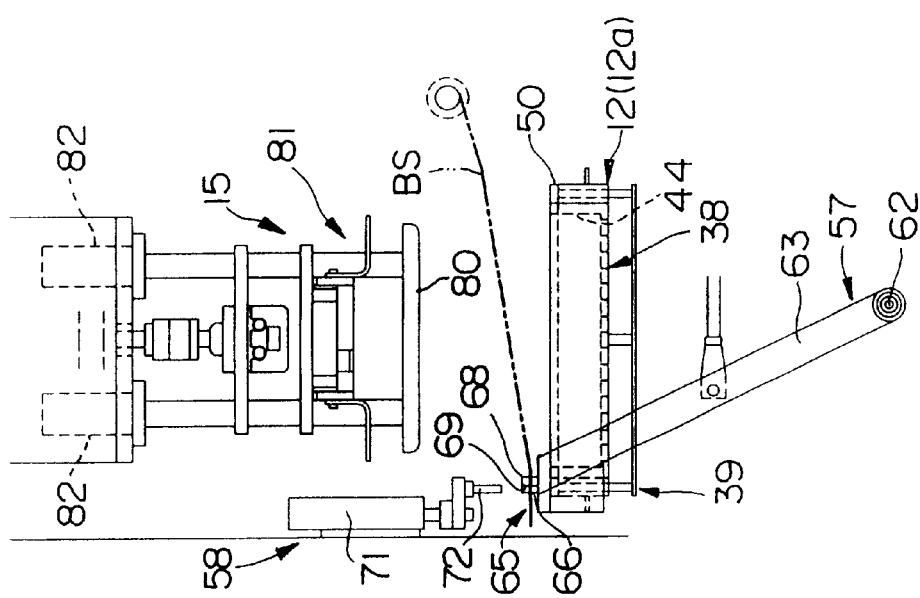
FIG. 11 is a side view showing the operations of the base sheet supplier and the base sheet arranger after extraction of the base sheet in the present invention.

Initially, the catcher 65 of the base sheet extractor 57 is set at the base position so that the end of the base sheet BS is caught by the catcher body 68 and the catcher base 66. The base sheet engager 58 moves up all the pins 72, and the base sheet arranger 15 moves up the base sheet pusher 80 and the base sheet insert 81. The base sheet insert 81 is set in the closed condition (FIG. 10). The base sheet supply and arrangement controller 60 directs the drive units 64 of the base sheet extractor 57 to rotate the extracting arms 63 downstream, so that the catcher 65 is moved from the base position upstream of the container 12 (12a) to the base sheet supply position downstream of the container 12 (12a) (FIG. 11). Thus, the catcher 65 conveys the base sheet BS onto the upper side of the container 12 (12a). The end of the extracted base sheet BS is positioned downstream of the stopper portion 50 of the container 12 (12a). The extracted base sheet BS corresponds to the shape of the concavity 44 of the container 12 (12a), and projects from both sides of the stopper portion 50 in the Y-direction.

Figure 12:
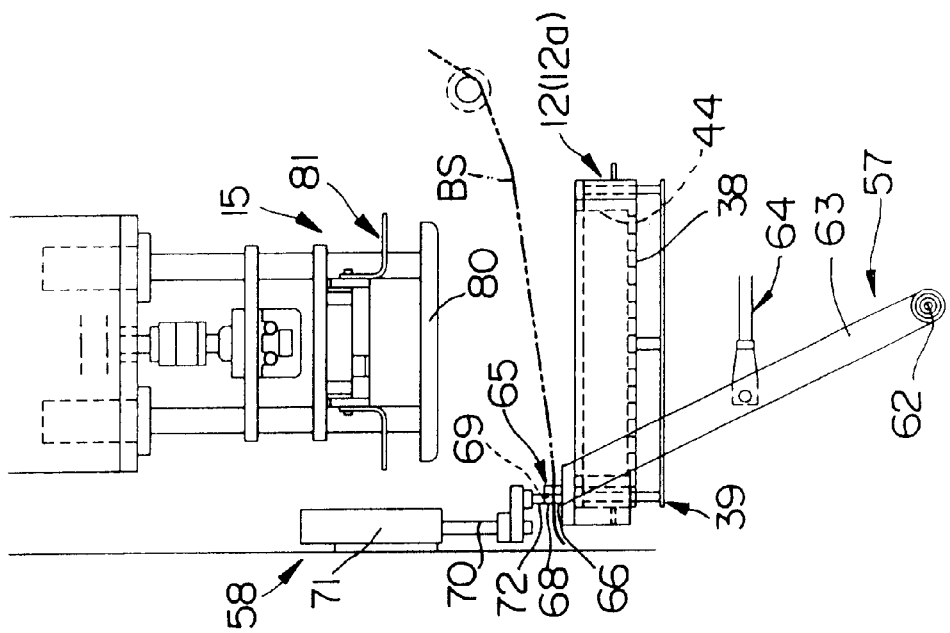
FIG. 12 is a side view showing the operations of the base sheet supplier and the base sheet arranger after engagement of the base sheet in the present invention.

When the base sheet BS is drawn out, the base sheet supply and arrangement controller 60 directs the drive units 71 of the base sheet engager 58 to move down the pins 72, which are then inserted into the grooves of the catcher 65 (FIG. 12). As a result, the pins 72 pierce the downstream portion of the base sheet BS caught by the catcher body 68 and the catcher base 66.

Figure 13:
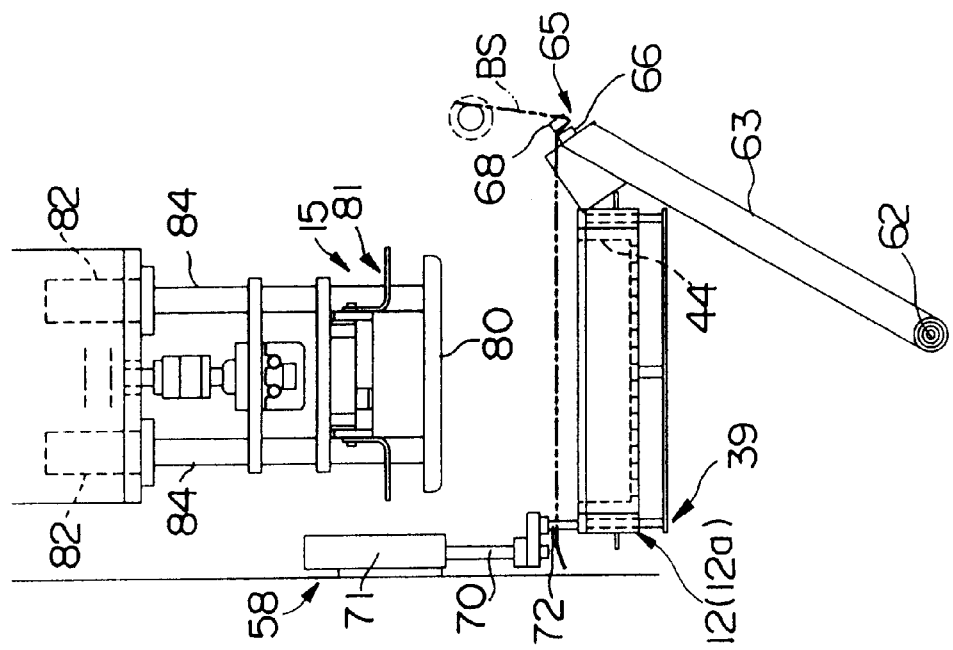
FIG. 13 is a side view showing the operations of the base sheet supplier and the base sheet arranger after an extracting arm returns in the present invention.

The base sheet supply and arrangement controller 60 directs the drive units 67 of the base sheet extractor 57 to separate the catcher body 68 from the catcher base 66 so as to release the base sheet BS. The drive units 64 rotate the extracting arms 63 upstream so that the catcher 65 returns to the base position (FIG. 13).

Figure 14:
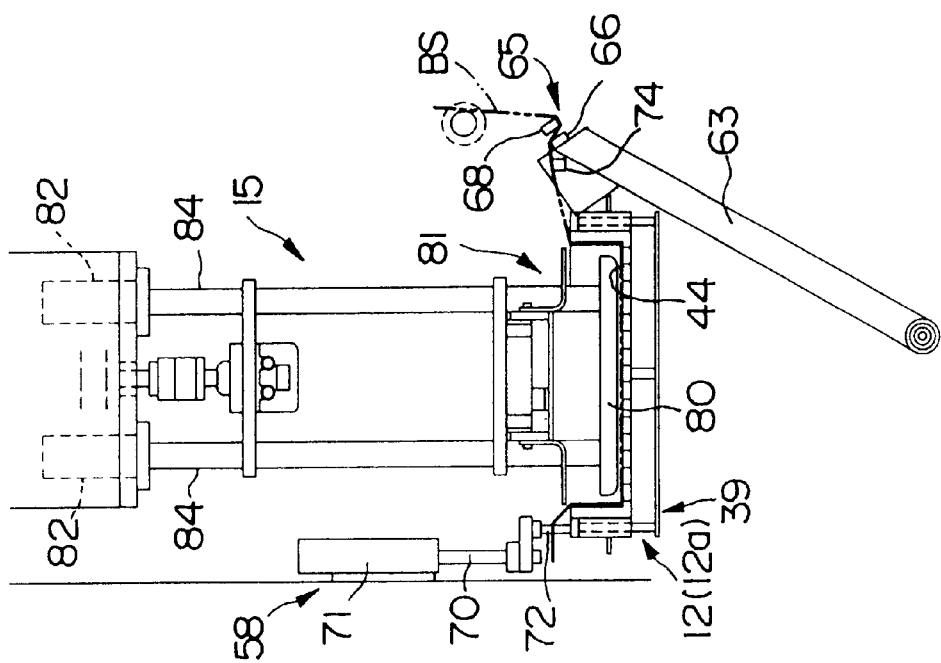
FIG. 14 is a side view showing the operations of the base sheet supplier and the base sheet arranger after insertion by the base sheet insert in the present invention.

Subsequently, the base sheet supply and arrangement controller 60 directs the drive units 82 of the base sheet arranger 15 to move down the base sheet pusher 80 and the base sheet insert 81 (FIG. 14). Then, as the base sheet engager 58 engages with the downstream portion of the base sheet BS and the catcher 65 of the base sheet extractor 57 releases the base sheet BS, the base sheet BS on the container 12 (12a) at the base sheet supply position is pushed into the concavity 44 by the base sheet pusher 80 while drawn out from the roll. The base sheet BS conforms to the shape of the concavity 44.

The base sheet supply and arrangement controller 60 moves the catcher body 68 close to the catcher base 66 of the catcher 65 of the base sheet extractor 57 which stays a the base position, which then holds the base sheet BS.

Figure 15:
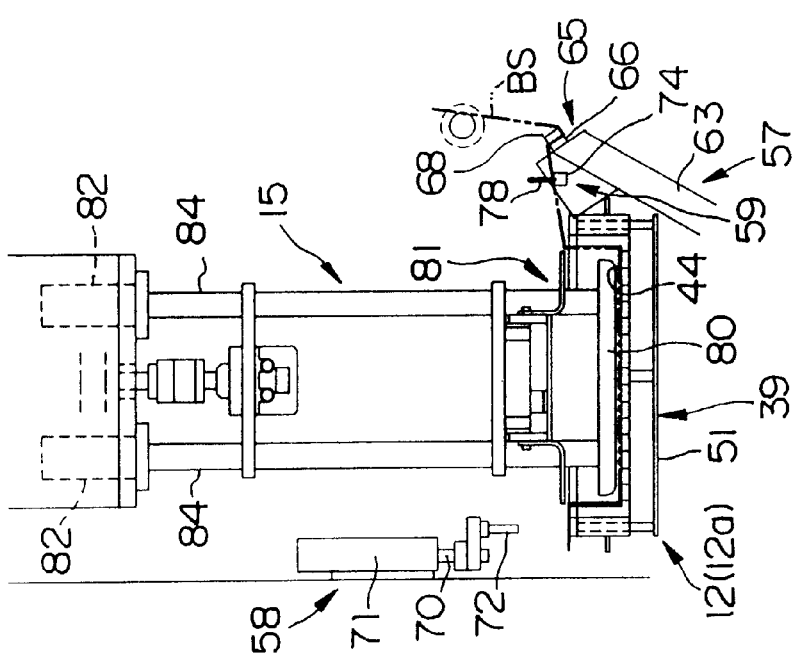
FIG. 15 is a side view showing the operations of the base sheet supplier and the base sheet arranger when cutting the base sheet in the present invention.

The base sheet supply and arrangement controller 60 moves the movable body 76 along the guide rail 75 of the base sheet cutter 59, so that the cutter 78 is rotated and is moved through the groove, which is not shown, of the cutter rail 74. As the result, the cutter 78 cuts the base sheet BS which is extracted by the base sheet extractor 57 and is placed on the cutter rail 74 (FIG. 15). Simultaneously, the drive units 71 moves up the pins 72 of the base sheet engager 58 to release the base sheet BS. The cutting position of the base sheet BS is set upstream of the container 12 (12a) stopped at the base sheet supply position and between the portion of the base sheet BS pushed by the base sheet pusher 80 and the other portion of the base sheet BS caught by the catcher 65.

The upstream base position where the catcher 65 of the base sheet extractor 57 returns is set close to and upstream of the cutter rail 74. As described above, before the base sheet cutter 59 cuts the base sheet BS, the catcher 65 of the base sheet extractor 57 releases the base sheet BS, returns to the upstream base position, and catches the base sheet BS to maintain the shape of the base sheet BS, preventing twisting the base sheet BS. This allows the base sheet cutter 59 to cut the base sheet BS satisfactorily.

Figure 16:
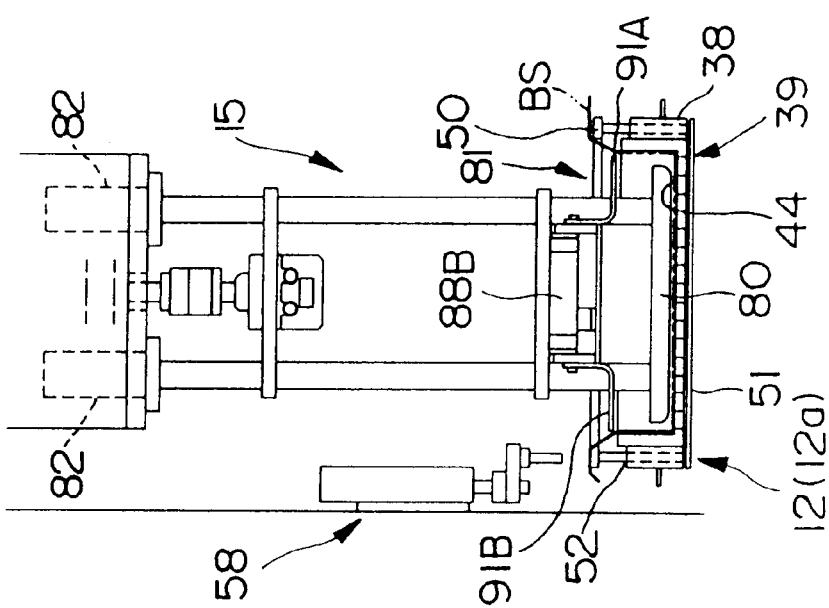
FIG. 16 is a side view showing the operations of the base sheet supplier and the base sheet arranger when moving up a stopper portion in the present invention.

The base sheet supply and arrangement controller 60 directs the drive units 83 to press the underside of the operational portion 51 of the stopper 39 of the container 12 (12a) at the base sheet supply position, so as to lift up the stopper portion 50, which is then separated from the holding surface 52 of the container body 38 (FIG. 16).

Figure 17:
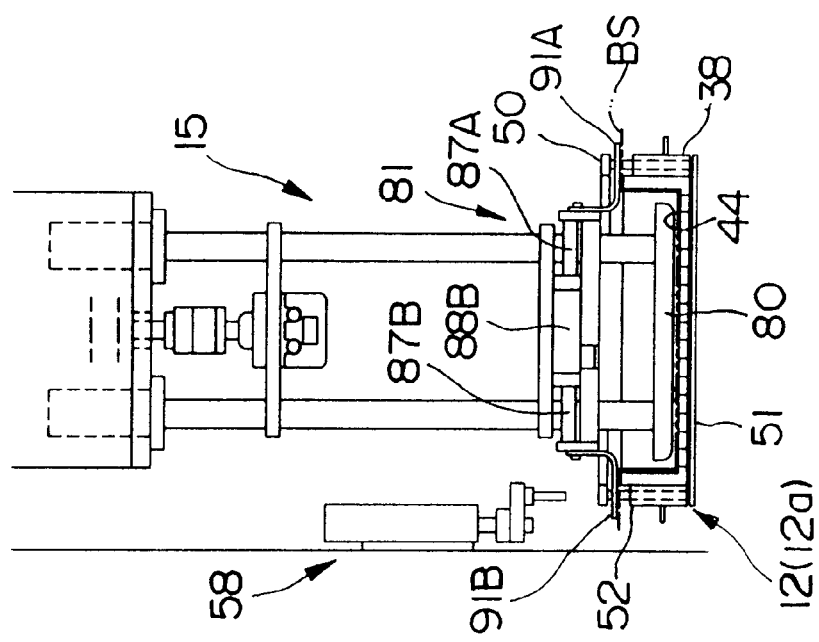
FIG. 17 is a side view showing the operations of the base sheet supplier and the base sheet arranger when the base sheet insert is opened in the present invention.

The base sheet supply and arrangement controller 60 drives the drive units 88A, 88B, 90A, and 90B so that the blades 91A, 91B, 92A, and 92B reach the open condition (FIG. 17). The blades 91A, 91B, 92A, and 92B are expanded into the space between the stopper portion 50 and the container body 38 toward the outside direction. As the result, while the base sheet BS is pushed into the concavity 44 by the base sheet pusher 80, the edge of the base sheet BS outside the concavity 44 is inserted between the stopper portion 50 and the container body 38 by the expanded blades 91A, 91B, 92A, and 92B. The four sides of the base sheet BS are inserted between the stopper portion 50 and the container body 38.

Figure 18:
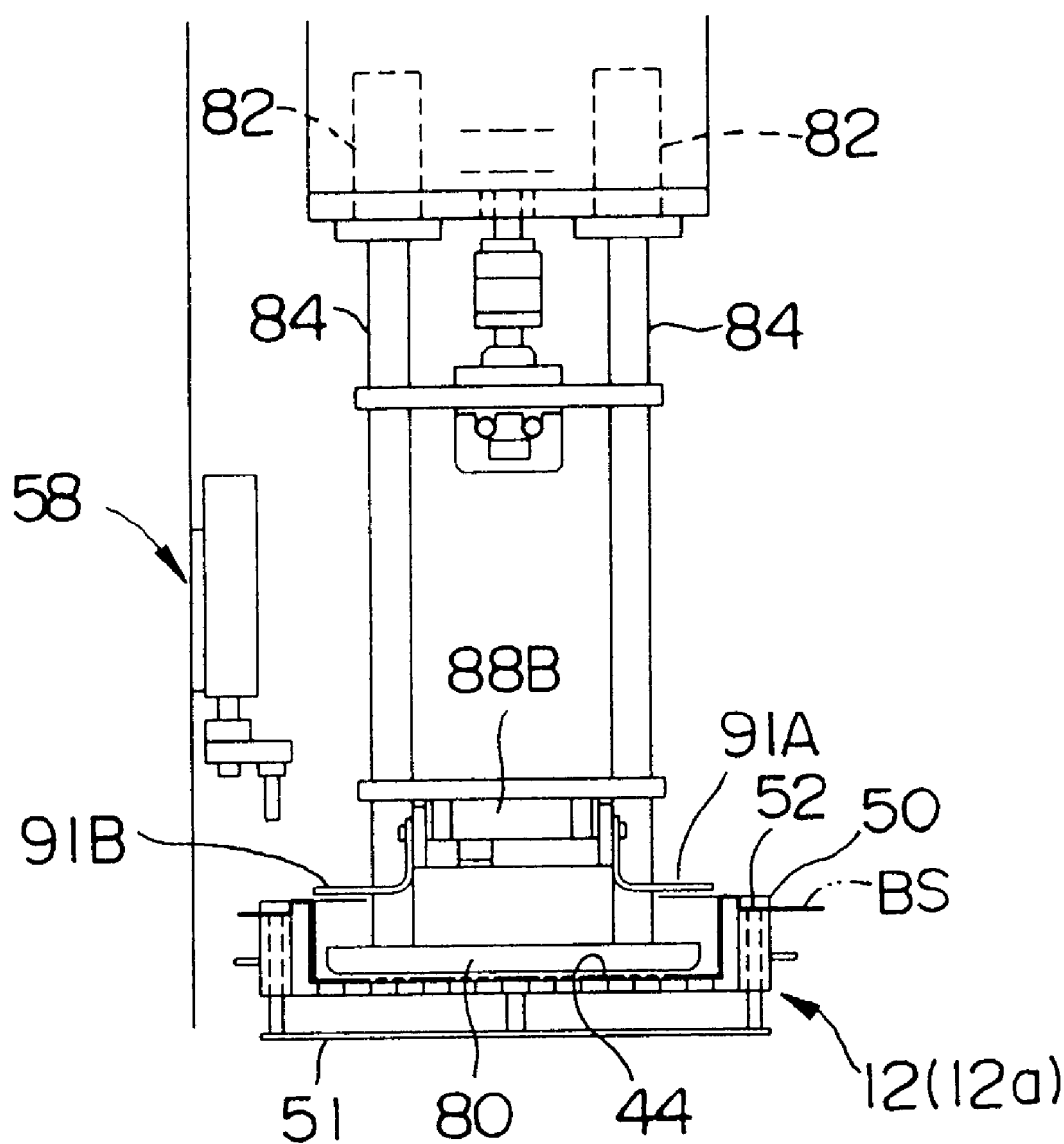
FIG. 18 is a side view showing the operations of the base sheet supplier and the base sheet arranger when the base sheet insert is closed in the present invention.
Figure 19:
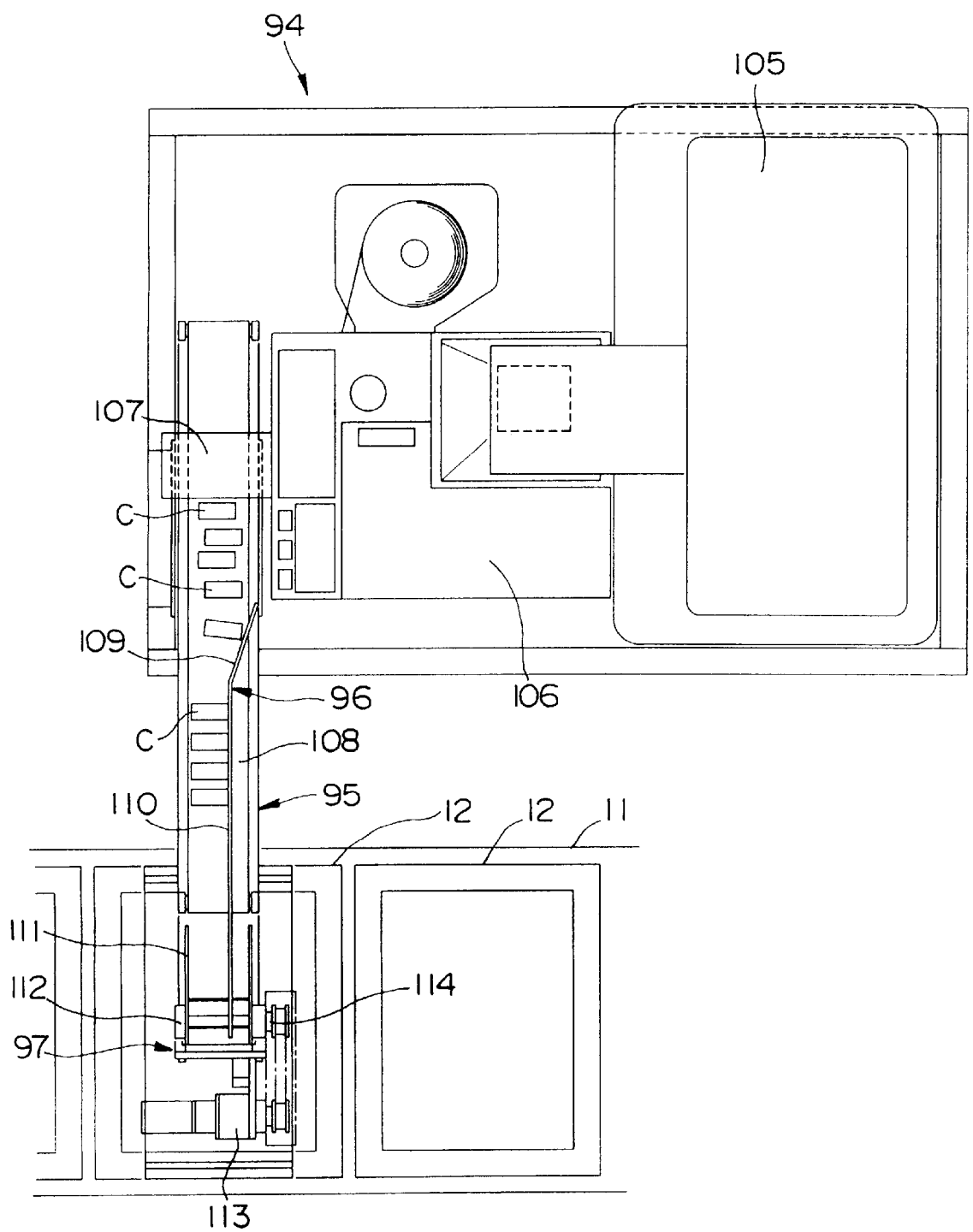
FIG. 19 is a top view showing a coin roll deliverer in the first embodiment of the present invention.
Figure 20:
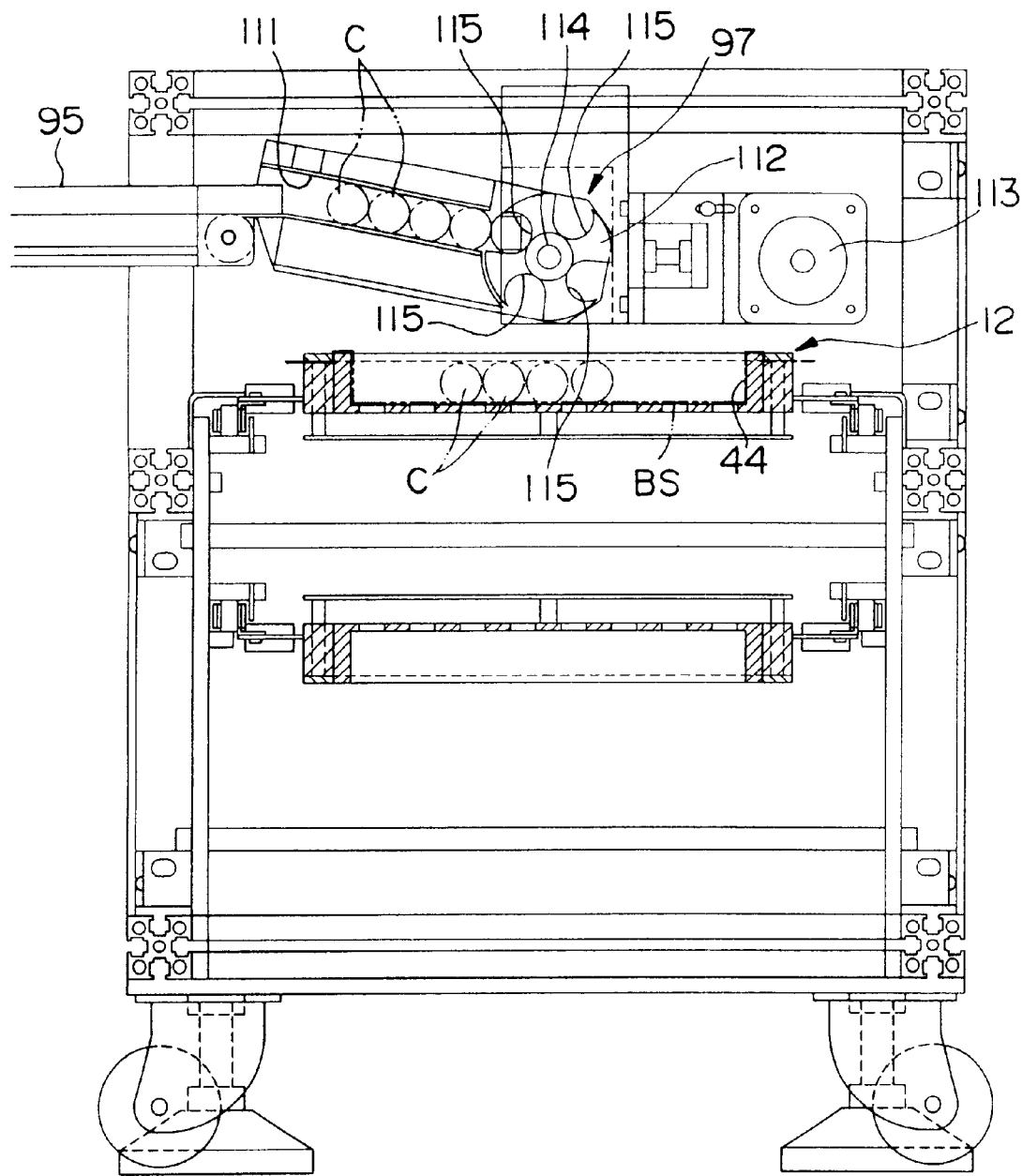
FIG. 20 is a front cross-sectional view showing a deliverer portion of the coin roll deliverer of the first embodiment of the present invention.

Then, the base sheet supply and arrangement controller 60 moves the drive units 88A, 88B, 90A, and 90B to constrict the blades 91A, 91B, 92A, and 92B, and directs the drive units 83 to move down the stopper 39 so that the stopper portion 50 comes close to the holding surface 52 of the container body 38 to hold the edges of the base sheet BS. Therefore, the base sheet BS conforms to the shape of the concavity 44, while the outer edge is held by the stopper portion 50 (FIG. 18).

The base sheet supply and arrangement controller 60 directs the drive units 82 to move up the base sheet pusher 80 and base sheet insert 81 from the concavity 44 of the container body 38.

The base sheet BS, which is set on the container 12 (12a) at the base sheet supply position, projects from all the sides of the stopper portion 50 of the container 12 (12a) in the X- and Y-directions. The base sheet BS can be held as long as its entire edge reaches the underside of the stopper portion 50.

As described above, the setting operation of the base sheet BS to the container 12 (12a) positioned at the base sheet supply position is completed, and the base sheet supply and arrangement controller 60 sends a transfer permission signal to the integrated pack production controller 35.

Coin Roll Deliverer

Next, the coin roll deliverers 16 to 19, 21, and 23 will be explained.

The coin roll deliverers 16 to 19, 21, and 23 have the identical structures. Each of the coin roll deliverers 16 to 19, 21, and 23 comprises a coin packager 94 for packaging a coin roll C with a number of stacked coins from loose coins, a coin roll conveyer 95 for transporting the coin roll C toward the container 12, a guide 96 attached to the coin roll conveyer 95, and a counter deliverer 97 for counting the coin rolls C transported by the coin roll conveyer 95, based on pack data, and for sending them to the container 12. The coin roll deliverers 16 to 19, 21, and 23 are electrically connected to corresponding roll coin delivery controllers (a cash deliverer, a coin roll deliverer, or a coin roll deliverer) 98 to 101, 103, and 104.

The coin packager 94 comprises a hopper 105 into which loose coins are thrown, a packager main portion 106 for making a coin roll by stacking the predetermined number of the coins and putting packing paper round the stacked coins, a releaser 107 for releasing the coin roll C made by the packager main portion 106. The releaser 107 discharges the coin rolls C, which are then aligned in the X-direction.

The roll coin conveyer 95 has an endless-type movable belt 108, and extends horizontally and in the Y-direction. The roll coin conveyer 95 transports the coin rolls C discharged from the releaser 107 of the coin packager 94 onto the endless-type belt 108. The coin rolls C, maintained to be parallel to the X-direction, are transferred in the direction perpendicular to the axis of the coin roll C.

The guide 96, which is a bent rod, comprises an inclined portion 109 inwardly extending from the side edge of the endless-type belt 108 toward the container 12, and a straight portion 110 which extends from the end of the inclined portion 109 toward the container 12 and which is parallel to the endless-type belt 108. The guide 96 is positioned above, is separated slightly from, and is parallel to the upper side of the endless-type belt 108, so as to come in contact with the ends of the coin rolls C transported by the endless-type belt 108, thereby guiding and aligning the coin rolls C.

The counter deliverer 97 is provided at the end of the coin roll conveyer 95. The counter deliverer 97 comprises a guide 111 near the coin roll conveyer 95, a rotatable deliverer portion 112 attached to the opposite end of the guide 111 to the coin roll conveyer 95, and a drive unit 113 for rotating the deliverer portion 112 while controlling its speed.

The straight portion 110 of the guide 96 reaches the inside of the guide 111 so that the guide 111 guides the coil rolls C while regulating the positions of the coil rolls C in the direction of their axes.

The deliverer portion 112 is rotatable by a shaft 114 extending in the X-direction, and a plurality of, for example, four grooves 115 extending in the X-direction are formed at even intervals on the circumference of the deliverer portion 112.

The deliverer portion 112 driven by the drive unit 113 allows one of the grooves 115 to face the guide 111 so as to receive one of the coin rolls C while maintaining its position in the direction of the roll axis. Simultaneously, the other groove 115 turns downwardly so as to drop the coin roll C while maintaining the position of the coin roll C in the direction of the roll axis. The drive unit 113 controls the rotation of the deliverer portion 112 while counting the number of the coin rolls C.

The position of the deliverer portion 112 for delivering the coin roll C is fixed above the concavity 44 of the corresponding container 12 so as to deliver the coin roll C onto the base sheet BS in the concavity 44 while maintaining the roll axis of coin roll C parallel to the X-direction.

The coin roll delivery controller 98, as shown in FIGS. 1 and 3, directs the coin roll deliverer 16 to deliver the necessary number of the coin rolls, which includes fifty 100-yen coins, to the container 12 (12b) at a first coin roll loading position, based on the pack data. Similarly, a coin roll delivery controller 99 directs the coin roll deliverer 17 to deliver coin rolls, which includes fifty 50-yen coins, to the container 12 (12c) at a second coin roll loading position. A coin roll delivery controller 100 directs the coin roll deliverer 18 to deliver a coin roll, which includes fifty 10-yen coins, to the container 12 (12d) at a third coin roll loading position. A coin roll deliverer controller 101 directs the coin roll deliverer 19 to deliver a coin roll, which includes fifty 500-yen coins, to the container 12 (12e) at a fourth coin roll loading position. A coin roll deliverer controller 103 directs the coin roll deliverer 21 to deliver the coin roll, which includes fifty 5-yen coins, to the container 12 (12g) at a sixth coin roll loading position. A coin roll deliverer controller 104 directs the coin roll deliverer 23 to deliver the coin roll, which includes fifty 1-yen coins, to the container 12 (12i) at a seventh coin roll loading position. These coin roll delivery controllers deliver the necessary number of coin rolls to the containers 12.

The coin roll deliverer with the packager 94, the coin roll conveyer 95, the guide 96, and the counter deliverer 97 are provided for each type of the coins. That is, the coin roll deliverers 16 to 19, 21, and 23 are prepared for all types of the coins.

The other coin roll deliverer 20, controlled by a coin roll delivery controller (a cash deliverer, a coin roll deliverer, or a change pack producer) 102, delivers twenty 500-yen coins to the container 12 (12f) at a fifth coin roll loading position, based on the pack data. Similarly, the coin roll deliverer 20 comprises the coin packager 94 with the hopper 105, a packager main part 106, and the releaser 107, and the counter deliverer 97 for delivering coin rolls from the coin packager 94 to the corresponding container 12 (12f) while counting the number of coin rolls. In the coin roll deliverer 20, the releaser 107 of the coin packager 94 releases the coin rolls such that the coin rolls are aligned in the Y-direction, and the counter deliverer 97 drops the coin rolls into the container 12 (12f) while counting the number of coin rolls.

The coin roll deliverer 20 releases the coin rolls while aligning them in the Y-direction in a manner different from the other coin roll deliverers 16 to 19, 21, and 23. This is because the coin rolls with twenty 500-yen coins are short and their directions may differ from those of the other coin rolls. The coin roll deliverer 20 may be constructed in a manner similar to the other coin roll deliverers 16 to 19, 21, and 23.

These coin roll deliverers 16 to 23 deliver the coin rolls to the containers which are stopped at the different positions.

Further, after the delivery of all the coin rolls, the coin roll delivery controllers 98 to 104 send transfer permission signals to the integrated pack production controller 35.

Stacked Bills Deliverer

The stacked bills deliverer 22 will be explained.

Figure 21:
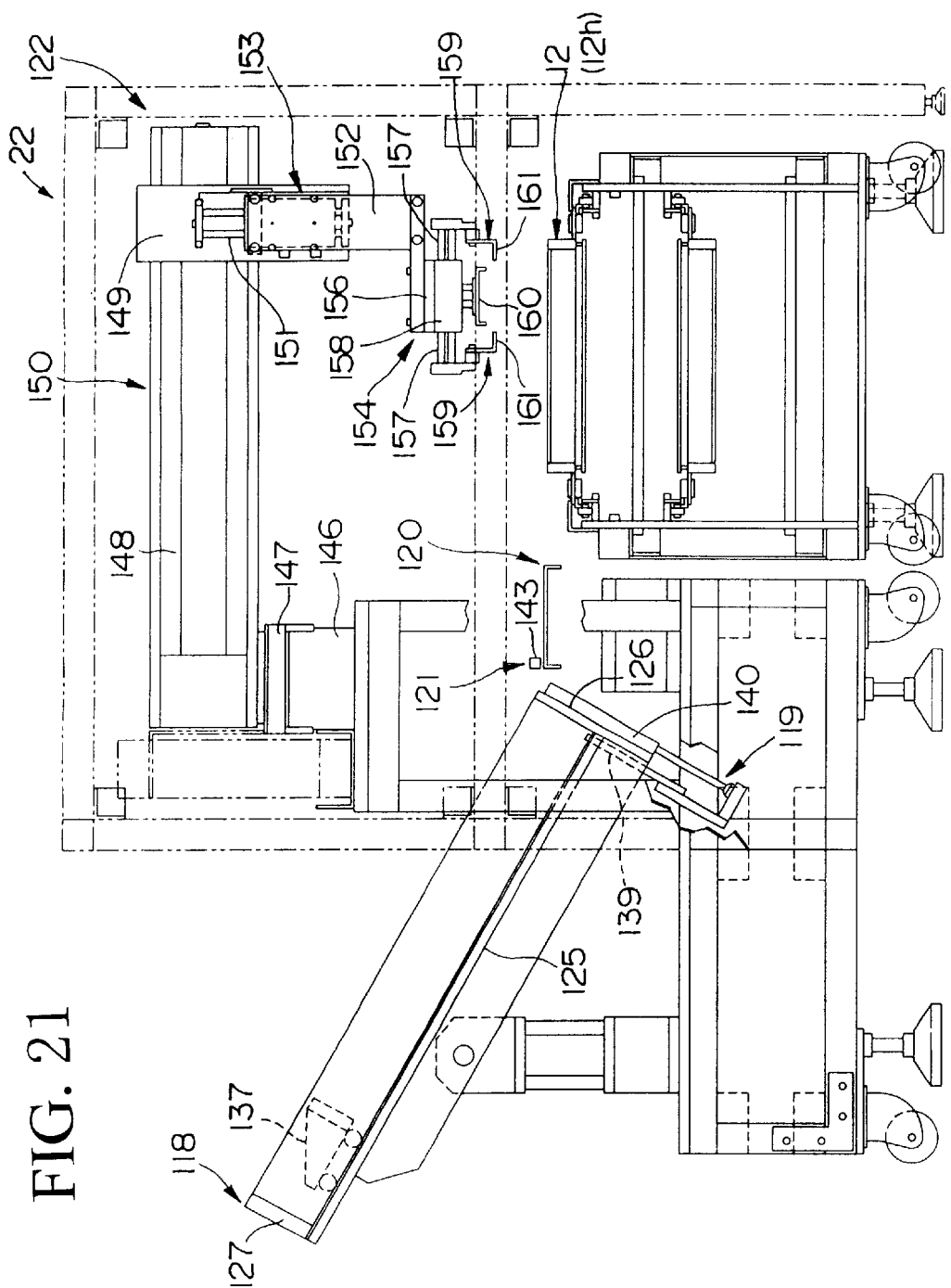
FIG. 21 is a rear view showing a stacked bills deliverer of the first embodiment of the present invention.
Figure 22:
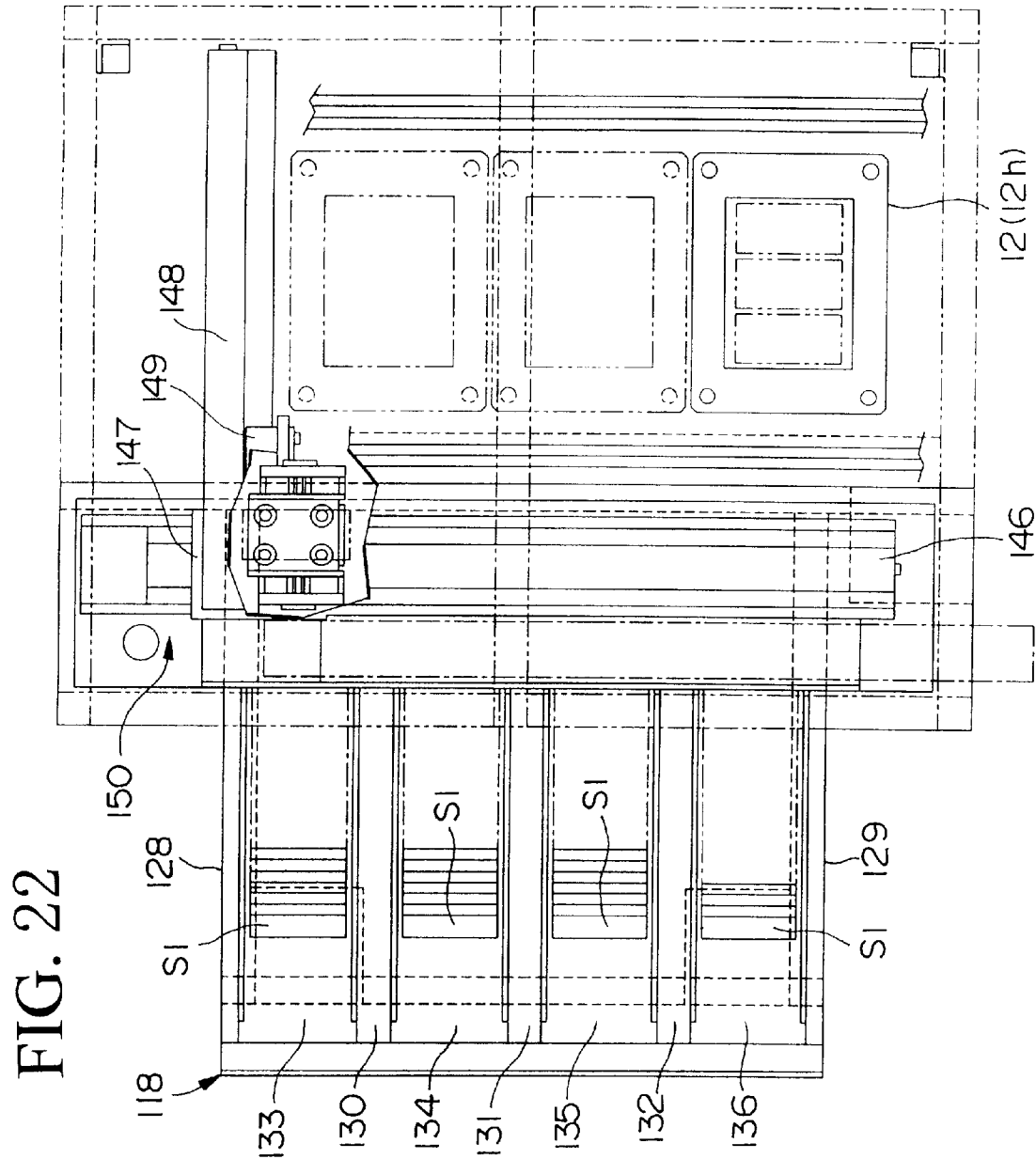
FIG. 22 is a top view showing a stacked bills deliverer of the first embodiment of the present invention.

As shown in FIGS. 21 and 22, the stacked bills deliverers 22 comprises a storage case 118, deliverer portions 119, a stage 120, an aligner 121, and a holder transporter 122. The storage case 118 includes storage spaces 133 to 136 for storing a number of aligned stacks of one hundred bills S1 by types of bills. The deliverer portions 119, attached to the storage spaces 133 to 136, delivers stacks of bills S1 one by one to the container 12 (12h) at a predetermined stacked bill loading position, based on the pack data. The stacks of bills S1 delivered from the deliverer portions 119 are placed on the stage 120. The aligner 121 aligns the stacks of bills S1 on the stage 120. The holder transporter 122 holds the stacks of bills S1 aligned on the stage 120 one by one and loads them onto the container 12 (12h) at the stacked bill loading position, based on the pack data. The deliverer portion 119, the aligner 121, and the holder transporter 122 are electrically connected to a stacked bills delivery controller (a cash deliverer, a stacked bills deliverer, or a change pack producer) 123 (FIG. 3).

The storage case 118 comprises an inclined bottom plate 125 whose end is lowered toward the container 12, a plate 126 perpendicular to the bottom plate 125 at the edge of the bottom plate 125 nearest the container 12, a pair of plates 128 and 129 perpendicular to the bottom plate 125 at both side edge in the X-direction, and partitions 130 to 132 parallel to the plates 128 and 129. In the storage case 118, there are four storage spaces between the plates 128 and the partition 130, between the partitions 130 and 131, between partitions 131 and 132, and between the partition 132 and the plate 129. The storage spaces 133 to 136 are assigned to different types of bills. Specifically, the storage spaces 133 and 134 store 1,000-yen bills, the storage space 135 stores 5,000-yen bills, and the storage space 136 stores 10,000-yen bills. The apparatus may not handle the 10,000-yen bills. As financial liberalization is expanded, ordinary stores may exchange foreign money and may prepare 10,000-yen bill. The storage spaces 133 to 136 may be used to store the other types of bills if necessary.

The storage spaces 133 to 136 include pushers 137 which can move by their own weight in the direction of the plate 126. In the storage spaces 133 to 136, the stacks of bills S1 are stacked in the direction parallel to the plate 126 while the longer sides of bills are aligned in the X-direction. The stacks of bills S1 are stacked from the lower end to the upper end along the inclined surface of the bottom plate 125. The pushers 137 are positioned on the uppermost stack of bills S1 so as to press the stack of bills S1 toward the plate 126.

The bottom plate 125 has through holes, not shown, near the plate 126 in respective storage spaces 133 to 136. The deliverer portion 119 has deliverer pins 139 which can be inserted through the corresponding through holes, and a drive unit, such as an air cylinder, for pushing out and extracting the deliverer pins 139 through the bottom plate 125.

The deliverer portion 119 pushes out the deliverer pins 139 from the bottom plate 125 using the drive unit 140, so that the deliverer pins 139 come in contact with the lowest stack of bills S1, which is then pushed out from the plate 126. When the deliverer pins 139 are extracted, the next stack of bills S1 comes in contact with the plate 126.

The stage 120 is positioned horizontally at the same level as the upper edge of the plate 126 of the storage case 118 and near the container 12, and extends in the X-direction over the width of the storage case 118. The stage 120 receives the stacks of bills S1 pushed out from the storage case 118 by the deliverer portion 119.

Figure 23:
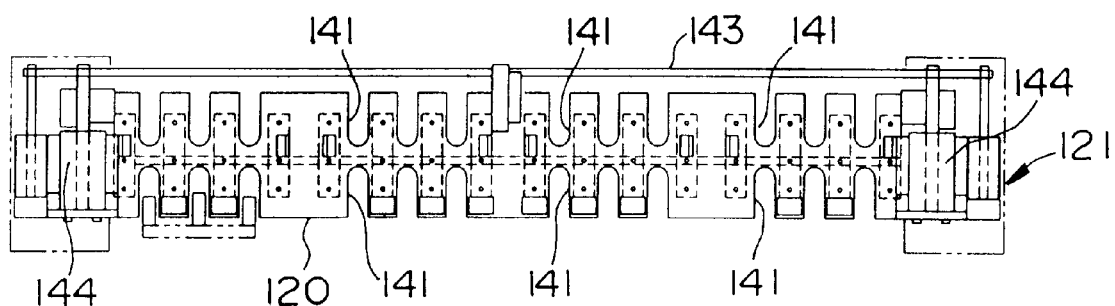
FIG. 23 is a top view showing a stage and an aligner of the first embodiment of the present invention.

As shown in FIG. 23, the stage 120 has a number of cut-out portions 141 in both its longer sides.

The stacked bill delivery controller 123 directs the deliverer portion 119 to release the stacks of bills S1 from the storage case 118 based on the pack data. The stacks of bills S1 are placed at different positions corresponding to the storage spaces 133 to 136, that is, depending on the types of bills.

Figure 24:
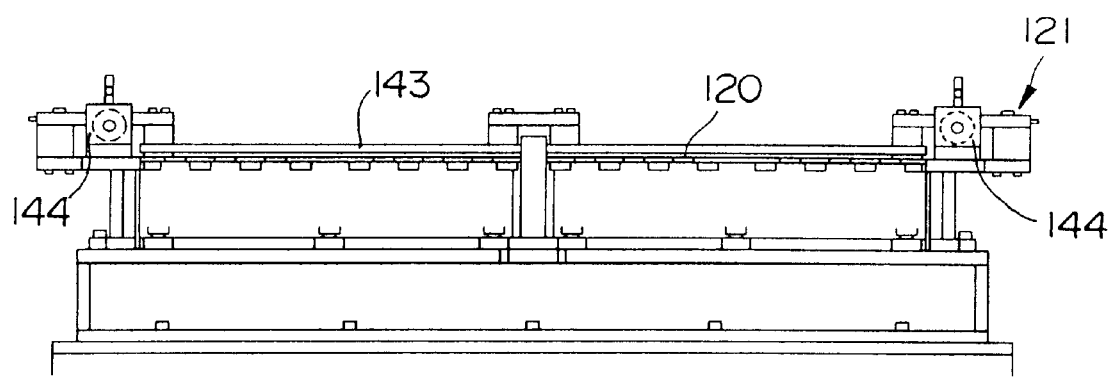
FIG. 24 is a side view showing a stage and an aligner of the first embodiment of the present invention.

As shown in FIGS. 23 and 24, the aligner 121 comprises an aligner portion 143 and drive units 144 such as air cylinders. The aligner portion 143 is a square bar extending in the X-direction and is located above the stage 120 near the storage case 118 (the upper side in FIG. 23). The drive units 144 are connected to both ends of the aligner portion 143, and move the aligner portion 143 in the Y-direction while maintaining the axis of the aligner portion 143 in the X-direction.

The aligner 121 moves the aligner portion 143 farthest from the container 12, so as to allow the stack of bills S1 to pass over the aligner portion 143. As the result, the stack of bills S1 discharged from the storage case 118 is received by the stage 120. The stacked bill delivery controller 123 directs the drive units 144 to move the aligner portion 143 toward the container 12 so that the aligner portion 143 comes in contact with and pushes the side of the stacks of bills S1. Then, the positions of the stacks of bills S1 are aligned in the Y-direction. The stacks of bills S1 are positioned at intermediate positions between the cut-out portions 141 of the stage 120.

The holder transporter 122 is controlled by the stacked bill delivery controller 123, and is used commonly for all types of stacks of bills S1 aligned at the different positions on the stage 120. As shown in FIGS. 21 and 22, the holder transporter 122 comprises a guide rail 146, a movable body 147, an air-driven transporter drive unit 150, an air-driven vertical drive unit 153, and a holder 154. The guide rail 146 extends in the X-direction above the storage case 118. The movable body 147 moves on the guide rail 146. The transporter drive unit 150 has a guide rail 148 fixed to the movable body 147 and extending in the Y-direction and a movable body 149 on the guide rail 148. The vertical drive unit 153 has vertical guide shafts 151 attached to the movable body 149 of the transporter drive unit 150 and a movable body 152 which is moved up and down by the guide shafts 151. The holder 154 is attached to the movable body 152.

The holder 154 comprises a base 156, a holder drive unit 158 such as an air cylinder, a pair of claws 159, and a press portion 160. The base 156 is fixed to the movable body 152. The holder drive unit 158 has movable shaft bodies 157 and is attached to the base 156 so that the movable shaft bodies 157 extend in the Y-direction. The claws 159 are symmetrically attached to both ends of the movable shaft bodies 157 and are moved by the holder drive unit 158 to come close to each other and to separate from each other. The press portion 160 is vertically movably attached to the underside of the holder drive unit 158 and is biased toward the lower direction by a spring or other devices.

The claws 159 have lower plates 161 which symmetrically face each other and which can move vertically so as to pass through the cut-out portions 141 of the stage 120. Above the lower plates 161, the press portion 160 is positioned.

The operation of the stacked bills deliverer 22 controlled by stacked bill delivery controller 123 will be explained.

Figure 25:
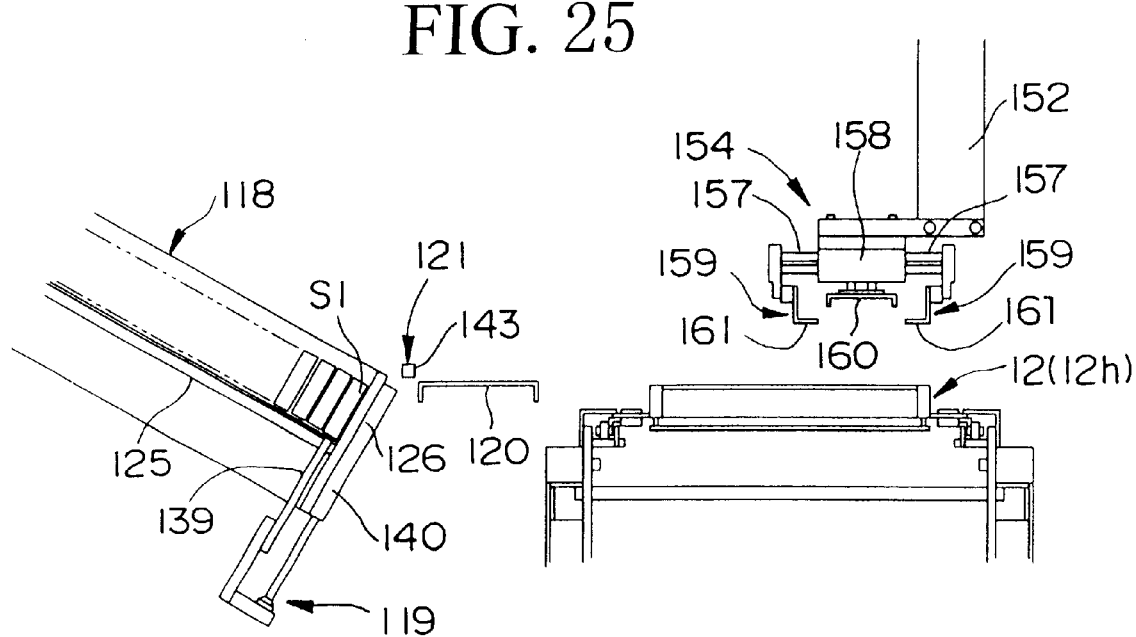
FIG. 25 is a front view showing the operation of the stacked bills deliverer before delivery of the stacked bills in the first embodiment of the present invention.
Figure 26:
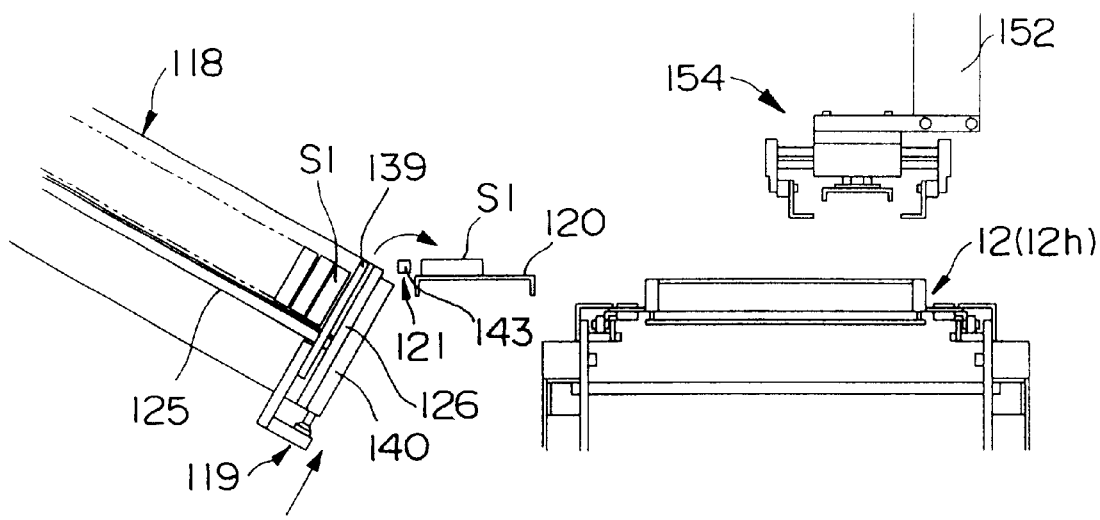
FIG. 26 is a front view showing the operation of the stacked bills deliverer during the delivery of the stacked bills in the first embodiment of the present invention.

The stacked bill delivery controller 123 draws the deliverer pins 139 of the deliverer portion 119 from the storage case 118, and extracts the holder 154 of the holder transporter 122 from the stage 120. While maintaining the aligner portion 143 of the aligner 121 near the storage case 118 (as shown in FIG. 25), the deliverer pins 139 of the deliverer portion 119 for the storage spaces 133 to 136 are pushed out into the storage case 118, based on the pack data, so that the stacks of bills S1 jump over the aligner portion 143 and are placed on the stage 120 (FIG. 26). Depending on the types of bills, the stacks of bills S1 are discharged to the different positions in the X-direction. The deliverer pins 139 are quickly extracted from the storage case 118.

Figure 27:
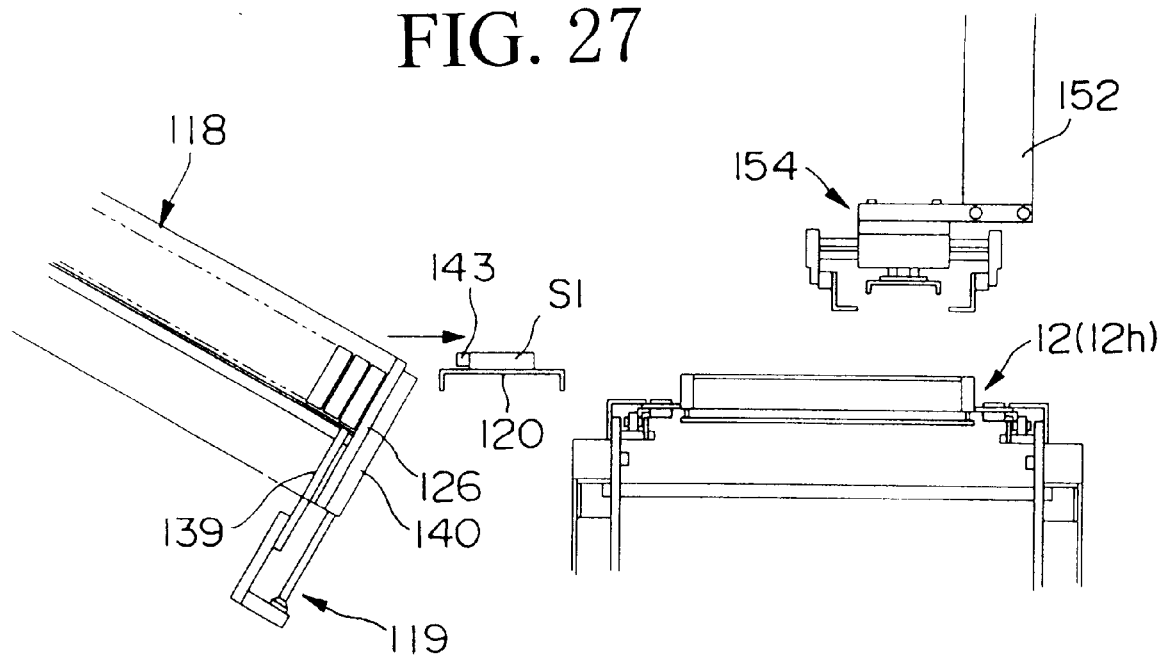
FIG. 27 is a front view showing the operation of the stacked bills deliverer when aligning the stacked bills in the first embodiment of the present invention.
Figure 28:
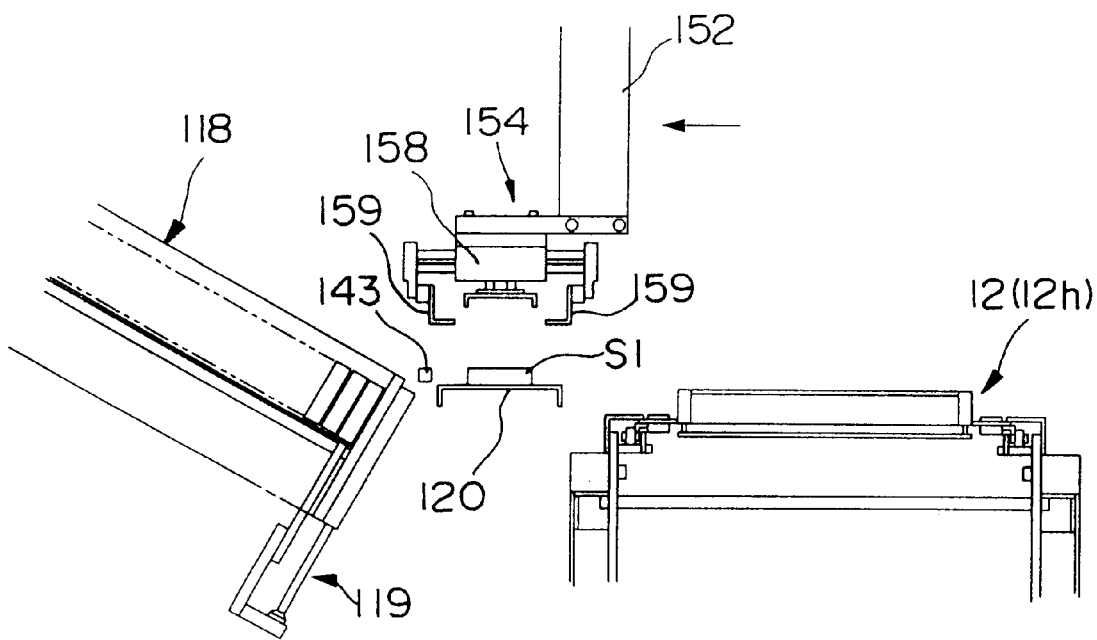
FIG. 28 is a front view showing the operation of the stacked bills deliverer when transferring the stacked bills in the first embodiment of the present invention.
Figure 29:
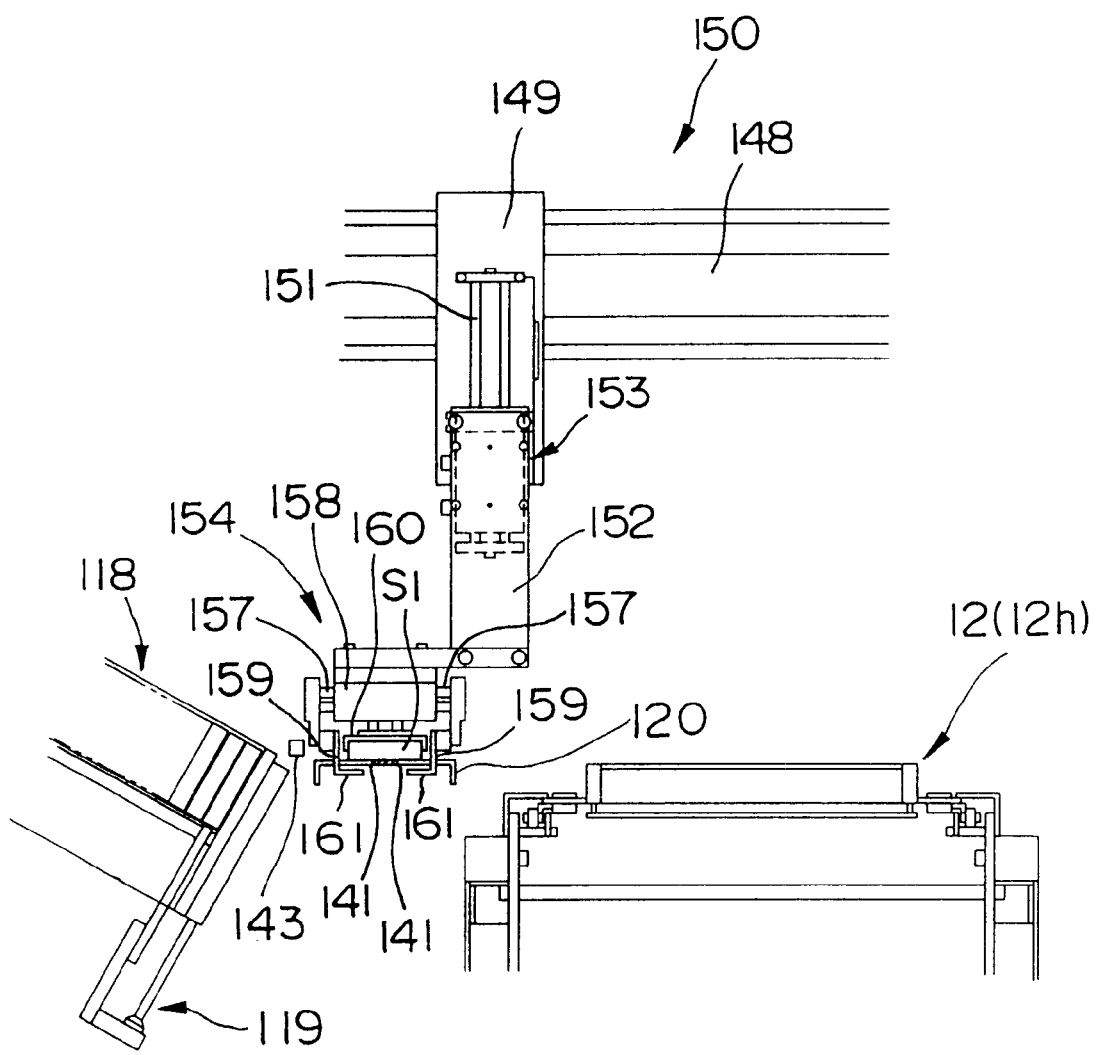
FIG. 29 is a front view showing the operation of the stacked bills deliverer when holder transporter holds the stacked bills in the first embodiment of the present invention.

The stacked bill delivery controller 123 moves the aligner 143 toward the container 12 (FIG. 27) to align the stacks of bills S1 in the Y-direction, returns the aligner 143 to the storage case 118, and directs the transporter drive unit 150 to move the holder 154 to a predetermined holding position just above the stack of bills S1, based on the pack data (FIG. 28). At that time, the stacked bill delivery controller 123 moves up the holder 154 by the vertical drive unit 153 and separates the claws 159 by the holder drive unit 158.

The vertical drive unit 153 moves down the holder 154 from the holding position. When the lower plates 161 of the claws 159 are moves lower than the stage 120, the holder drive unit 158 narrows the claws 159, which are then positioned under the stack of bills S1. By lowering the holder 154, the press portion 160 is pressed onto the stack of bills S1, and is moved up against the biasing force.

The stacked bill delivery controller 123 moves up the holder 154 using the vertical drive unit 153. The holder 154 is positioned above the stage while the claws 159 pass through the cut-out portions 141 of the stage 120. The press portion 160 presses the stack of bills S1 against the lower plates 161 of the claws 159 by its biasing force.

Figure 30:
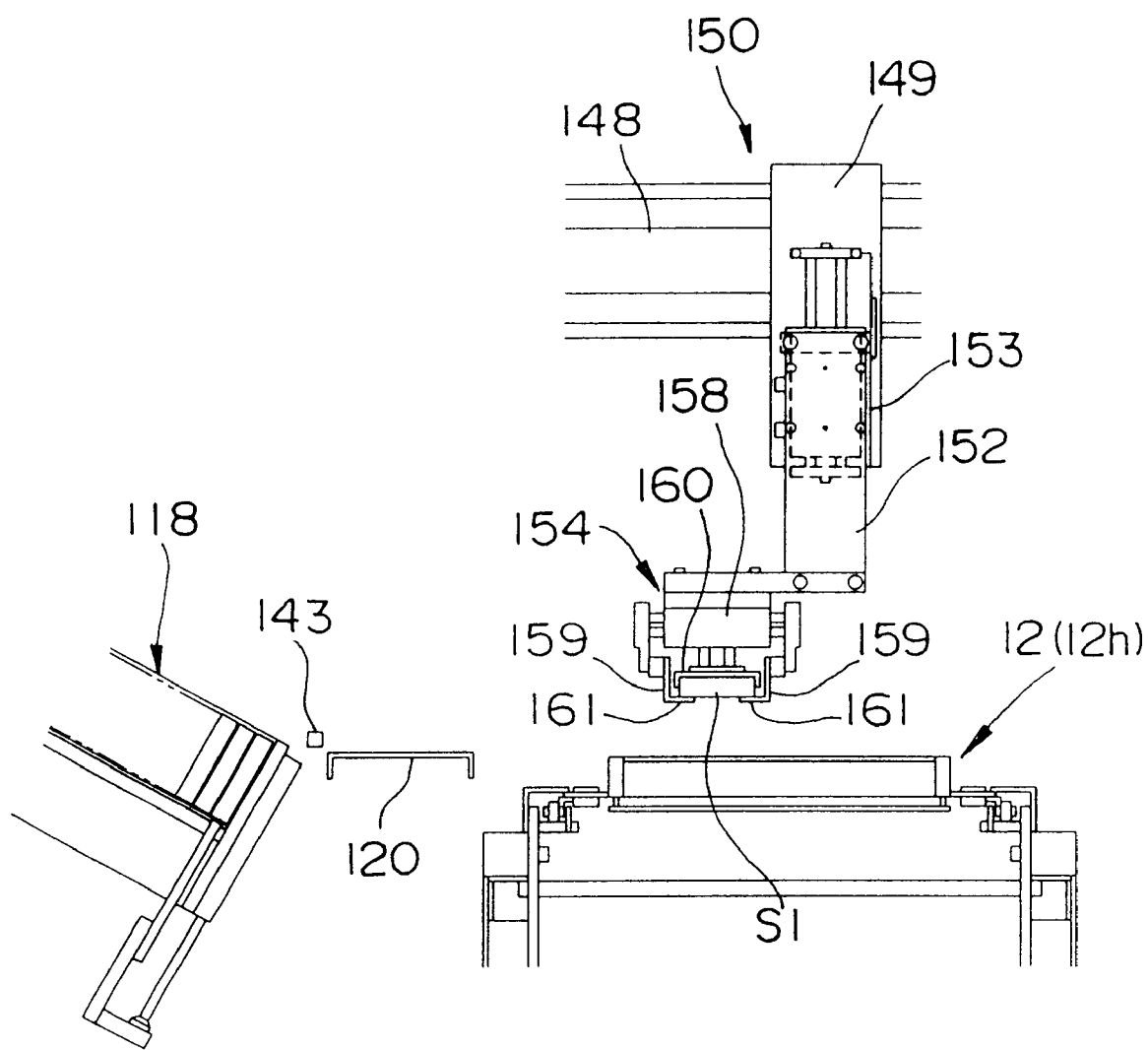
FIG. 30 is a front view showing the operation of the stacked bills deliverer after holder transporter holds the stacked bills in the first embodiment of the present invention.

When the stacked bill delivery controller 123 allows both claws 159 and the press portion 160 to hold the stack of bills SI, the transporter drive unit 150 moves the holder 154 above the container 12 (12h) stopped at the stacked bill loading position. (FIG. 30). The vertical drive unit 153 moves down the holder 154, and the holder drive unit 158 separates both claws 159 at both ends of the holder 154, so as to drop the stack of bills S1 onto the base sheet BS within the concavity 44 of the container 12 (12h) at the stacked bill loading position.

Figure 31:
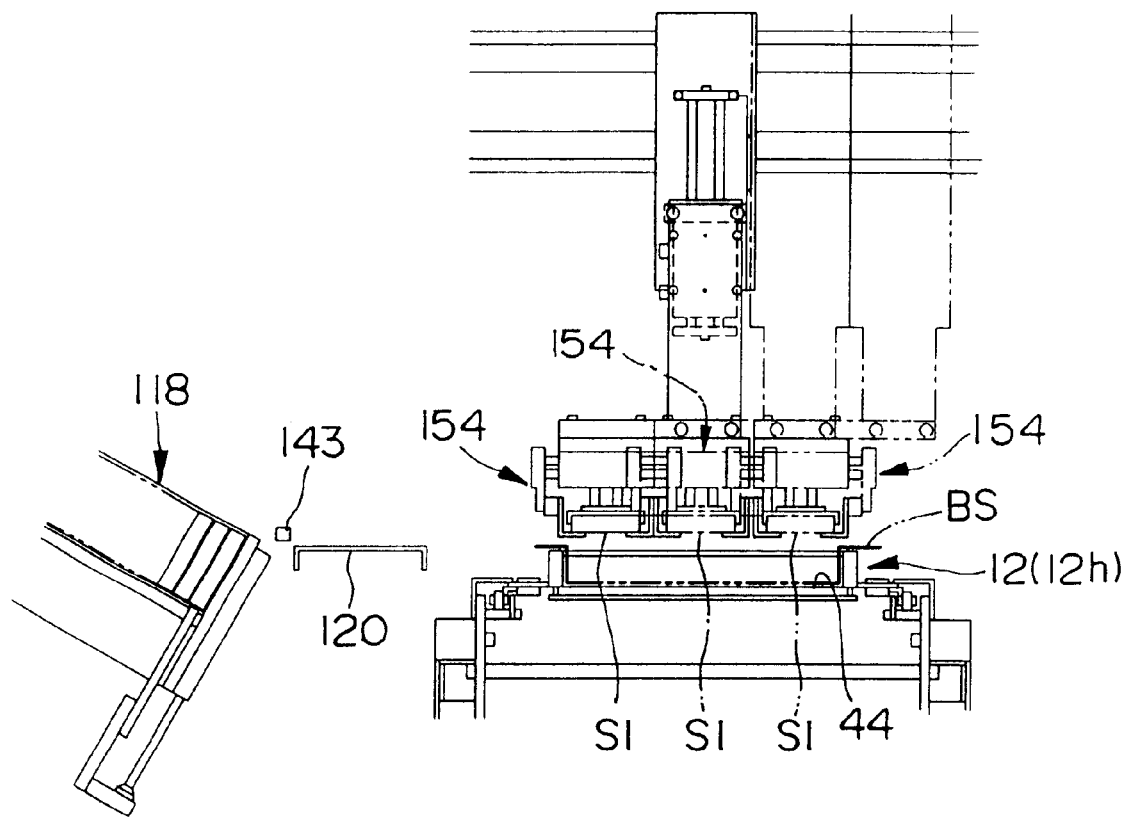
FIG. 31 is a front view showing the operation of the stacked bills deliverer when holder transporter changes the loading positions of the stacked bills in the first embodiment of the present invention.

The stacked bill delivery controller 123 arranges the holder 154, that is, the stack of bills S1 to the appropriate position for the container 12 (12h) in consideration of the other bills which are to be loaded into the container 12 (12h) according to the pack data. In FIG. 31, based on the relationship with the other bills, the stack of bills S1 may be loaded within the concavity 44 nearest the storage case 118 as shown with the solid lines, farthest from the storage case 118 as shown with the double-short-single-long dashed line, or in the middle of the concavity 44 as shown with the single-short-single-long dashed line.

When the necessary stacks of bills S1 are loaded on the container 12 (12h) at the stacked bill loading position, the stacked bill delivery controller 123 sends the transfer permission signal to the integrated pack production controller 35.

Figure 32A:
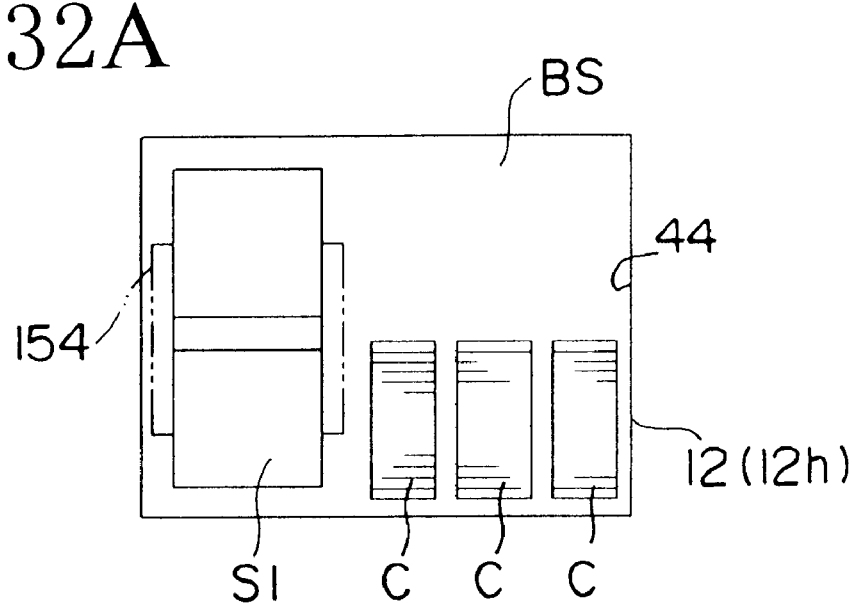
FIG. 32A is a top view showing the directions of the loaded stacked bills delivered by the stacked bill deliverer of the first embodiment of the present invention.
Figure 32B:
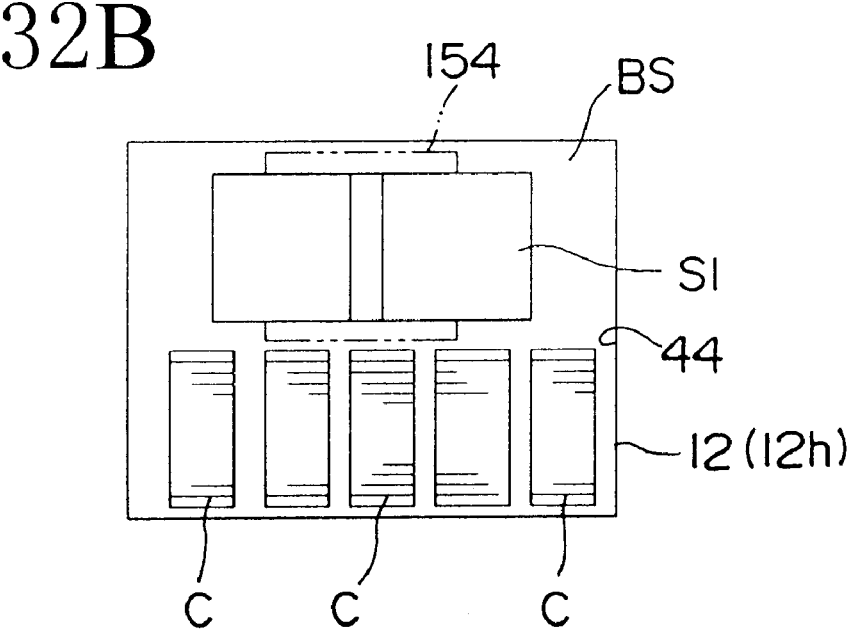
FIG. 32B is a top view showing the other directions of the loaded stacked bills delivered by the stacked bill deliverer of the first embodiment of the present invention

As the holder 154 is rotatable by 90 degrees with respect to the movable body 152 around the shaft, the holder 154, that is, the stack of bills SI, is changed to the appropriate direction for the container 12 (12h) in consideration of the other bills which are to be loaded into the container 12 (12h) according to the pack data. Based on the relationship with the other coin rolls C, the longitudinal side of the stack of bills S1 may be parallel to the X-direction as shown in FIG. 32a, or to the Y-direction as shown in FIG. 32b. The position and direction of the holder 154 may be appropriately controlled.

Loose Bills Deliverer

The loose bill deliverer 32 will now be explained.

As shown in FIG. 1, the loose bills deliverer 32, controlled by a loose bills delivery controller 163 (shown in FIG. 3), delivers loose bills to the container 12 (12j) stopped at a predetermined a loose bill loading position, based on the pack data. The pack data are produced from change data inputted from shops or cash-registers. When the number of bills to be prepared is several hundreds, the above-described stacks of bills S1 may be prepared. When a less than hundred bills, for example, 30 or 50 bills are required, depending on the circumstances, the loose bills deliverer 32 delivers the loose bills.

The number of bills (amount of bills) which can be delivered in each operation of the loose bill deliverer 32 is limited. When the number of bills required to be delivered to the container 12 (12j) is above this limitation, the delivery operations are repeated so that the number of bills delivered in each operation does not exceed the limitation. On the other hand, when the number of bills to be delivered is below the limitation, all types of bills are delivered in one operation so that the bills are stacked and classified according to the types of bills.

When repetition of the delivery is required, the loose bills delivery controller 163 divides the bills according to the types of bills. When the division is required for one type of bills, the delivery operations are repeated so as to minimize the number of the repetitions.

Adjacent to the container 12, a loading sensor 164, a confirmation button 165, and a division sensor 166 are provided. The loading sensor 164 senses the container 12 stopped at the predetermined loose bills loading position through a visual or auditory means. The confirmation button 165 is pushed by the operator. The division sensor 166 senses the repetition of the delivery through a visual or auditory means. The loading sensor 164, the confirmation button 165, and the division sensor 166 are connected to the loose bills delivery controller 163.

When the container 12 is stopped at the loose bills loading position, the loose bills delivery controller 163 informs the loading sensor 164 of positioning of the container, and the loose bill deliverer 32 delivers the loose bills to the container 12 (12j) based on the pack data.

To deliver the loose bills in one operation, the loose bills delivery controller 163 directs the loose bill deliverer to deliver the loose bills, and, once the confirmation button is pushed, outputs the transfer permission signal to the integrated pack production controller 35.

On the other hand, when the loose bills are delivered in two or more operations, the loose bills delivery controller 163 directs the division sensor 166 to perform the sensing operation, and directs the loose bill deliverer 32 to perform the first delivery operation for delivering the loose bills. Then, the next delivery operation by the loose bill deliverer 32 is stopped until the operator pushes the confirmation button 165. Once the operator pushes the confirmation button 165, the next delivery operation is started by the loose bill deliverer 32. Thus, the delivery operations are repeated in response to the push of the confirmation button 165. When the last delivery operation is completed and the confirmation button 165 is pushed, the integrated pack production controller 35 outputs the transfer permission signal.

The integrated pack production controller 35 stops transferring the containers 12 (12j) until the loose bills delivery controller 163 outputs the transfer permission signal. When the transfer permission signal is output, the container 12 (12j) is transferred by one pitch.

Load Adjuster

The load adjuster 24 will now be explained.

Figure 33:
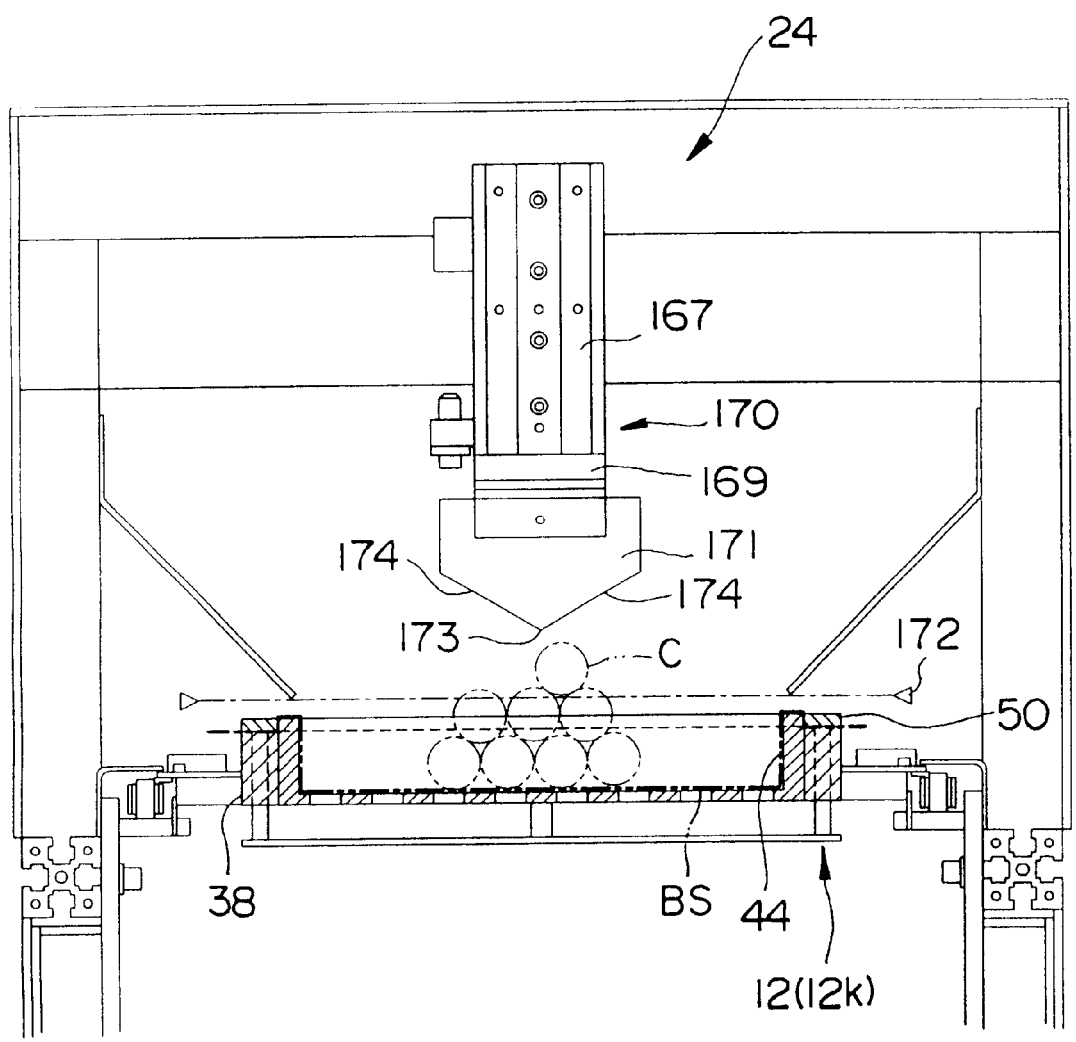
FIG. 33 is a front view showing a loading adjuster of the first embodiment of the present invention.

The load adjuster 24 adjusts the positions of the coin rolls and other loads delivered to the container 12. As shown in FIG. 33, the load adjuster 24 is located above the container 12 (12k) stopped at a predetermined adjustment position downstream of the loose bill deliverer. The load adjuster 24 is controlled by a load adjustment controller 138 (FIG. 3).

The load adjuster 24 comprises an air-driven drive unit 170, an adjuster portion 171, and a sensor 172. The drive unit 170 has a guide rail 167 positioned above the container 12 (12k) and extending vertically, and a movable body 169 movable along the guide rails 167. The adjuster portion 171 is fixed to the lower end of the movable body 169 of the drive unit 170. The sensor 172 is positioned slightly above the container 12 (12k) at the adjustment position and monitors the conditions of the coin rolls C loaded on the container 12 (12k).

The middle portion 173 of the adjuster portion 171 is positioned at the lowest position in the Y-direction. The adjuster portion 171 has lower surfaces 174 inclined upwardly toward both ends of the adjuster portion 171. The position of the middle portion 173 corresponds to the delivery position where the coin rolls C are stacked by the coin roll deliverers 16 to 21, and 23.

The sensor 172 detects that the height of the stacked coin rolls C exceeds the height of the container 12 (12k). The optical sensor 172 performs the detection based on an interrupted light path.

Figure 34:
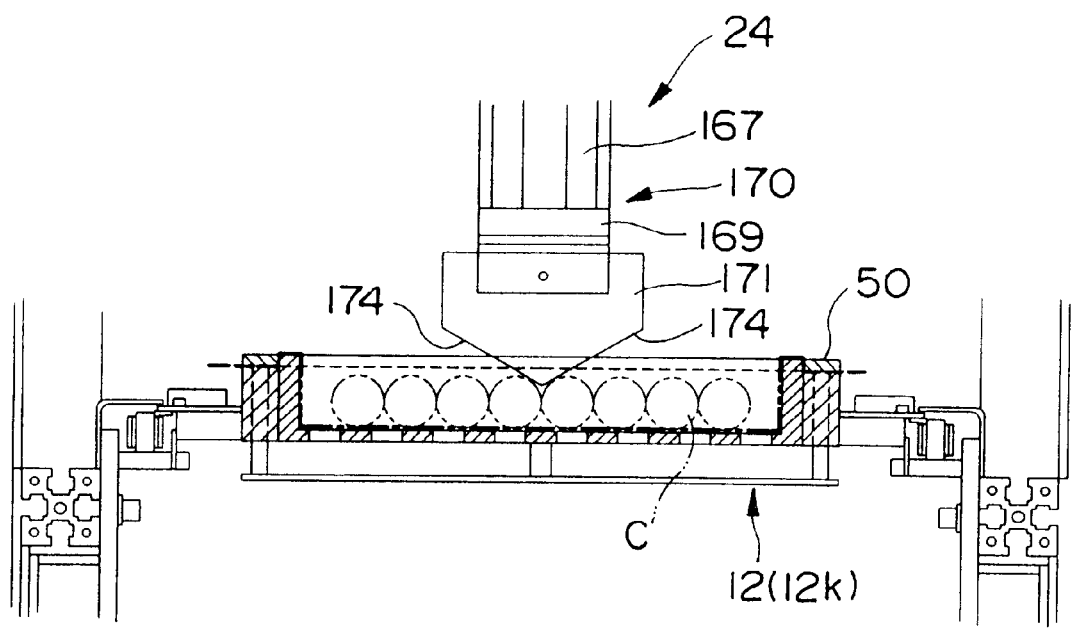
FIG. 34 is a front view showing the operation of the loading adjuster of the first embodiment of the present invention.

When the sensor 172 detects the coin rolls C, the load adjuster 168 determines that the conditions of the loaded coin rolls C are incomplete, and moves down the adjuster portion 171 (FIG. 34). Then, the adjuster portion 171 comes in contact with the upper portion of the stacked coin rolls C so as to press and slide the coin rolls in the horizontal direction, thereby regulating the stacked coin rolls C.

The sensor 172 is not always necessary, and the adjuster portion 171 may be moved down at least once for each container 12 (12k) to regulate the stacked coin rolls C.

In addition to the load adjuster 24 downstream of the loose bill deliverer, one or more other load adjusters 24 may be added for the other containers 12 upstream of the container 12k.

Top Sheet Supplier

Figure 35:
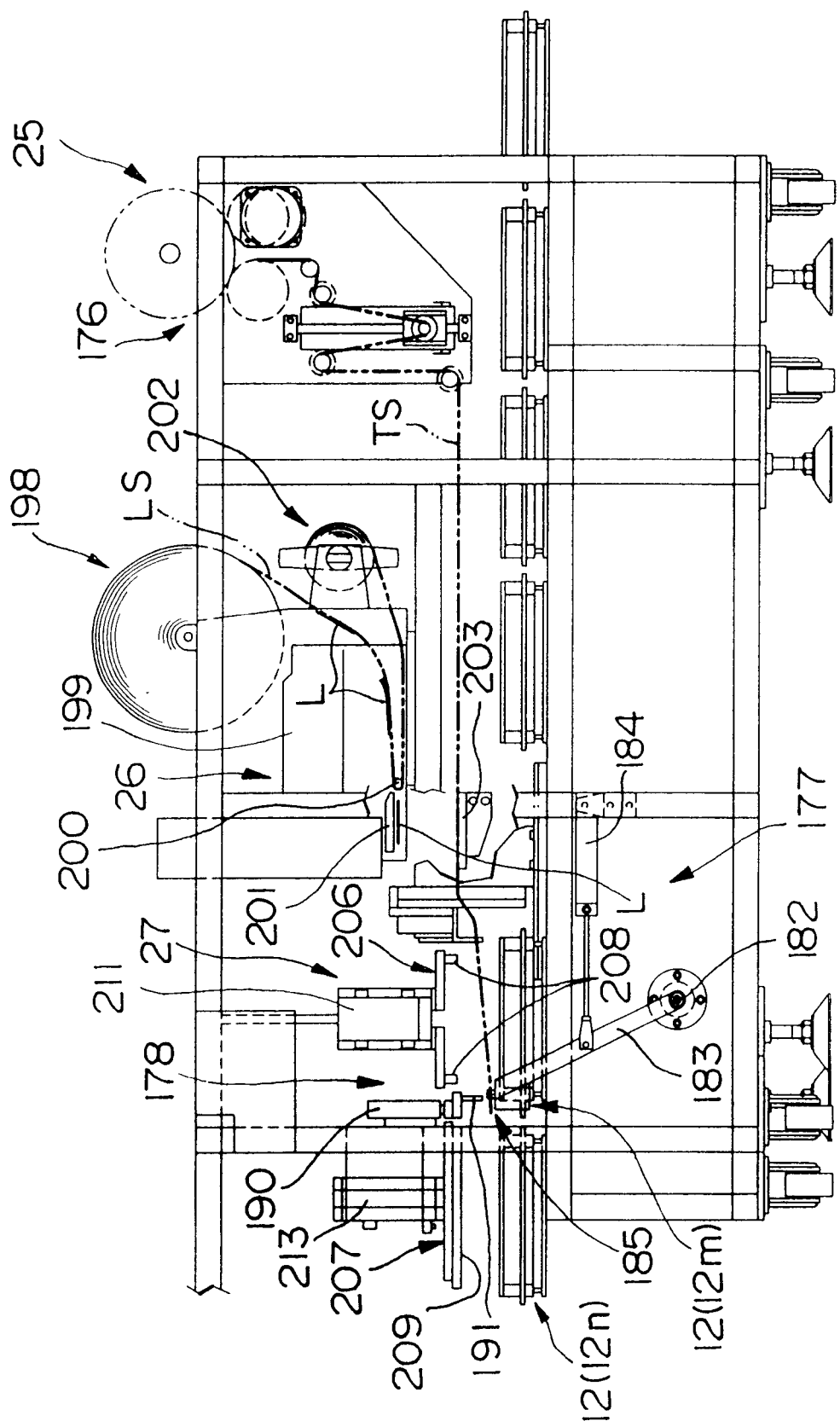
FIG. 35 is a side view showing a top sheet supplier, a printing label sticker, and a bonding device of the first embodiment of the present invention.
Figure 36:
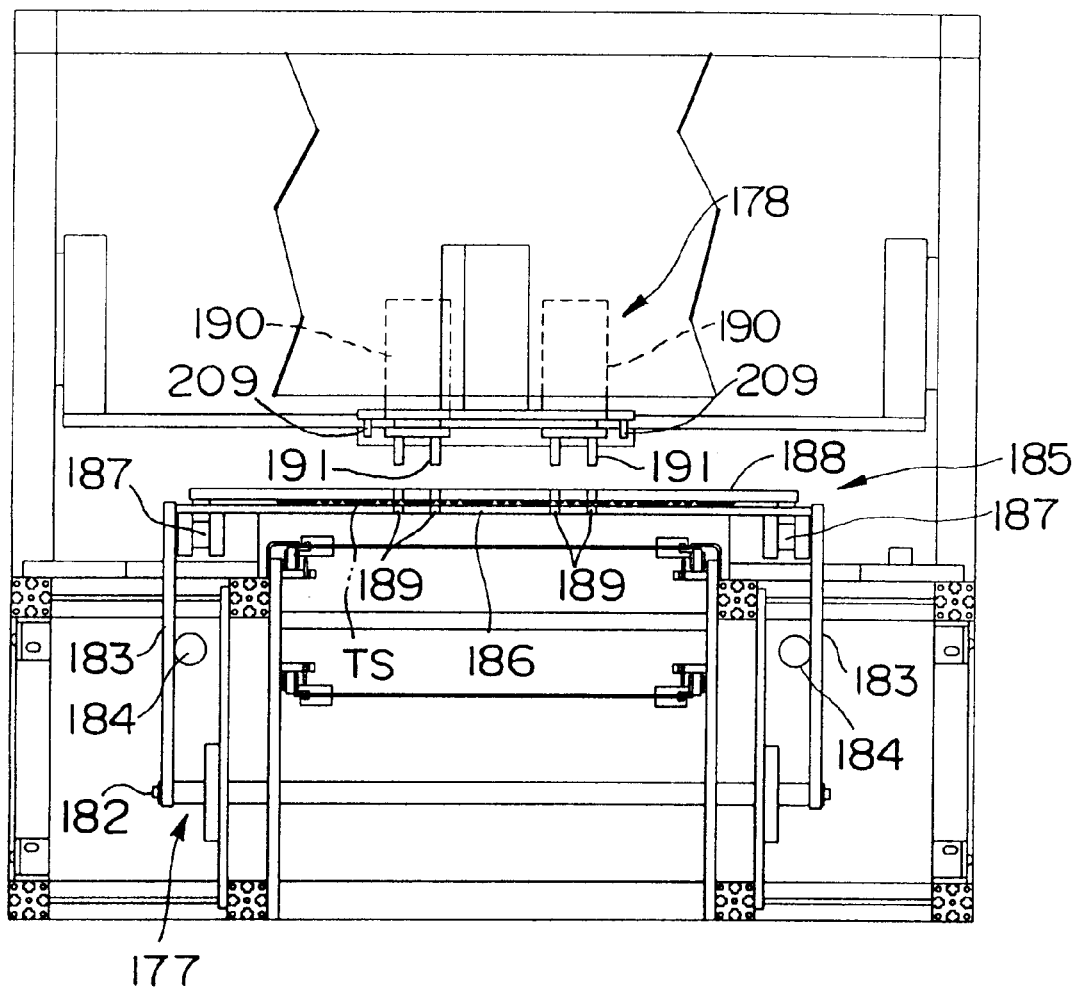
FIG. 36 is a front view showing a top sheet supplier, a printing label sticker, and a bonding device of the first embodiment of the present invention.
Figure 37:
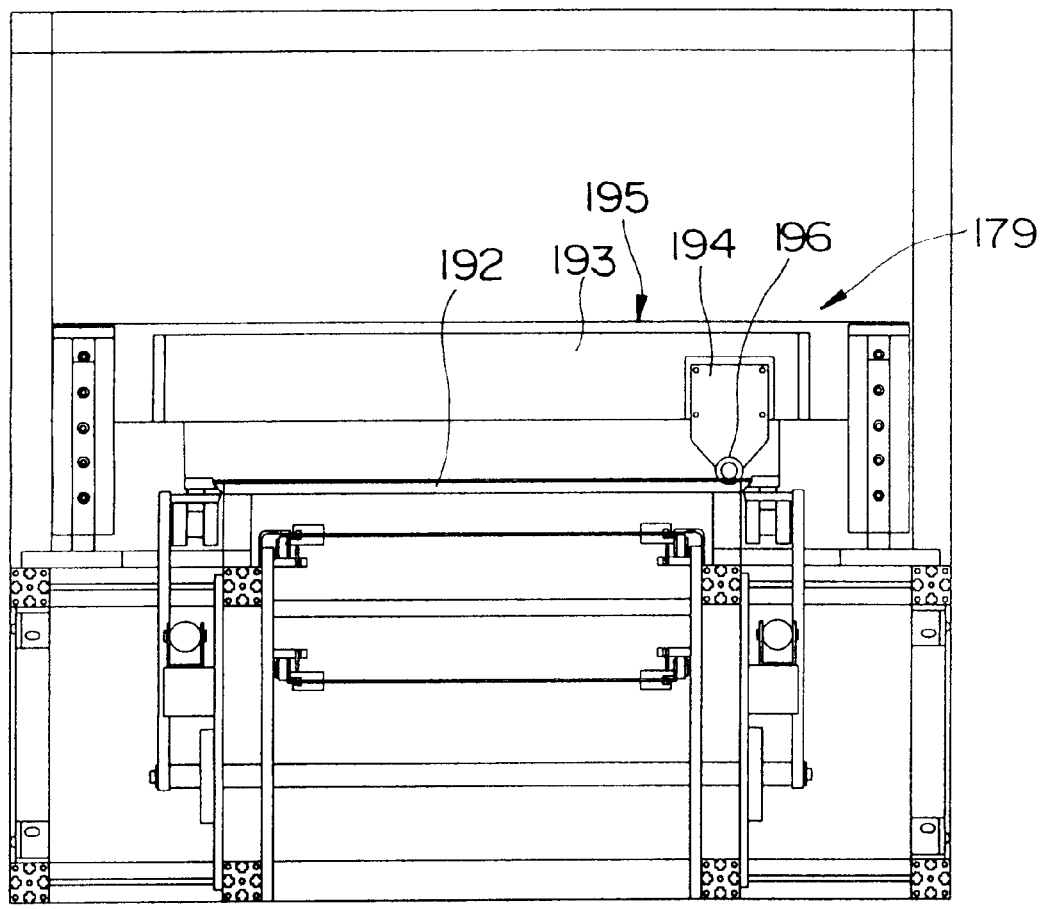
FIG. 37 is a front view showing a top sheet cutter of the first embodiment of the present invention.

As shown in FIGS. 35 to 37, the top sheet supplier 25 places a top sheet TS, made from transparent or semi-transparent material, on the container 12 (12m) stopped at a predetermined top sheet supply position downstream of the adjustment position. The top sheet supplier 25 has a support 176 positioned above and upstream of the container 12 (12m). The top sheet supplier 25 draws out the long top sheet (a pack material) TS from the roll supported by the support 176 and overlays the top sheet TS on the cash loaded into the concavity 44 of the container 12 (12m).

The top sheet supplier 25 comprises a top sheet extractor 177 for extracting the top sheet TS in the direction parallel to the transportation of the containers 12, a top sheet engager 178 for engaging with the top sheet TS, and a top sheet cutter 179 for setting the extracted top sheet TS. The top sheet extractor 177, the top sheet engager 178, and the top sheet cutter 179 are electrically connected to a top sheet supply bonding controller (a top sheet supplier, a change pack producer, a bonding device, or a change pack producer) 180 (FIG. 3).

The top sheet extractor 177 comprises: a support shaft 182 positioned below the container 12 (12m) at the top sheet supply position and extending in the Y-direction; a pair of extracting arms 183 whose lower ends are supported by the ends of the support shaft 182; and drive units 184 such as air cylinders whose middle portions are coupled to the extracting arms 183 and which extend in the X-direction above the support shaft 182. Between the upper ends of the extracting arms 183, the catcher 185 for catching the top sheet TS is provided across the container 12 (12m) in the Y-direction. The drive units 184 rotate the extracting arms 183 to move the catcher 185 between a upstream base position and a downstream extraction position.

The catcher 185, attached to the upper ends of the extracting arms 183, comprises: a catcher base 186 extending in the Y-direction; a pair of drive units 187 such as air cylinders positioned at both ends of the catcher base 186; and a catcher body 188 coupled to the drive units 187 and positioned to be above and parallel to the catcher base 186. The drive units 187 allows the catcher body 188 to come close to the catcher base 186 so that the catcher body 188 and the catcher base 186 catch the top sheet TS. The drive units 187 separate the catcher body 188 from the catcher base 186 so as to release the top sheet TS.

The catcher body 188 and the catcher base 186 have a plurality of, for example, four grooves 189 in their downstream portions, and the grooves 189 are vertical when the catcher body 188 and the catcher base 186 are positioned at the extraction position.

The top sheet engager 178 is positioned upstream of the catcher 185 at the extraction position. The top sheet engager 178 has two drive units 190 such as air cylinders, and four vertically-movable pins 191. Two pins 191 are attached to the underside of each drive unit 190. The pins 191 moved down by the drive units 190 are inserted through the grooves 189 of the catcher body 188 and the catcher base 186 at the extraction position.

The top sheet cutter 179 comprises a cutter rail 192, an air-driven drive unit 195, and a disc-shaped cutter 196. The cutter rail 192 is located above and upstream of the container 12 (12m) at the top sheet supply position, extends in the Y-direction, and has a groove, not shown, extending in the Y-direction in the top surface of the cutter rail 192. The drive unit 195 has a guide rail 193 above and parallel to the cutter rail 192, and a movable body 194 movably attached to the guide rail 193. The cutter 196 is rotatably attached to the lower end of the movable body 194 so as to allow the lower edge of the cutter 196 into the groove on the cutter rail 192. When the drive unit 195 moves the movable body 194, the cutter 196 moves on the cutter rail 192, cutting the top sheet TS on the cutter rail 192.

Labeler

The labeler 26 is disposed between the support 176 supporting the top sheet roll and the top sheet extractor 177. The labeler 26 comprises a support 198, a printer 199, a folder 200, a holder 201, a winder 202, and a sticker base 203. The support 198 supports a roll of a label sheet LS whose one surface is an adhesive coated surface. The printer 199 transfers the label sheet LS and prints a predetermined indication on the label of the label sheet LS based on the pack data. The folder 200 with a roller folds the label sheet LS printed by the printer 199 by 180 degrees downwardly so as to detach a label L from the label sheet LS and to allow the detached label L to protrude. The holder 201 is vertically movable and, using a vacuum means, attracts the upper surface of the label L partly detached by the folder 200. The winder 202 winds the label sheet LS from which the label L is detached. The sticker base 203 supports the underside of the top sheet TS when the label L held by the holder 201 is moved down to stick the label L on the top sheet TS. The printer 199, the holder 201, and the winder 202 are electrically connected to a labeler controller (labeler for printing and adhering a label) 204. The label L is printed for each container 12, that is, for each change pack P. Specifically, the label L indicates the amount of each type of cash loaded into the change pack P and a bar-code.

Bonding Device

The bonding device 27 will now be explained.

The bonding device 27 comprises a transverse side bonding portion 206 which is horizontally movable and which is disposed above the container 12 (12m) stopped at the top sheet supply position, and a longitudinal side bonding portion which is vertically movable and which is disposed above the container 12 (12m) stopped at a longitudinal side bonding position downstream of the top sheet supply position by one pitch.

The transverse side bonding portion 206 comprises a drive unit 211, such as an air cylinder, with a pair of movable shafts 210 (FIG. 42) extending vertically, and a pair of seals 208. A pair of the seals 208 are attached to the movable shafts 210, and extend in the Y-direction at the same height as each other. The seals 208, which are heated, come in full face contact with the pair of the seal receptors 47 of the container 12 (12m) extending in the Y-direction when the seals 208 are moved down.

The longitudinal side bonding portion 207 comprises a drive unit 213, such as an air cylinder, with a pair of movable shafts 212 (FIG. 42) extending vertically, and a pair of seals 209 attached to the movable shafts 212 and extending in the X-direction so as to make the positions of the seals 209 in the X-direction coincide with each other. The seals 209, which are heated, come in full face contact with a pair of the seal receptors 46 of the container 12 (12n) extending the X-direction when the seals 209 are moved down.

Assuming that the longitudinal side bonding portion 207 is moved upstream of the container 12 by one pitch between the containers 12, the seals 209 of the longitudinal side bonding portion 207 and the seals 208 of the transverse side bonding portion 206 form a rectangular shape, and the ends of the seals 208 and 209 are overlapped each other.

The transverse side bonding portion 206 and the longitudinal side bonding portion 207 are driven by the drive units 211 and 213 so as to move the bonding devices 206 and 207 synchronously. Their movement in the vertical direction is controlled by the top sheet supply bonding controller 180.

The operations of the top sheet supplier 25, the labeler 26, and the bonding device 27 will be explained.

By the labeler controller 204, the labeler 26 prints the data on the labels L one by one according to the sequence of the containers 12 based on the pack data. In these printed labels L, the label L prepared for the container 12 (12m) at the top sheet supply position is separated from the label sheet LS and is received by the holder 201. The label L is adhered on the top sheet TS to be placed on the container 12 (12b) before the extraction of the top sheet TS.

Figure 38:
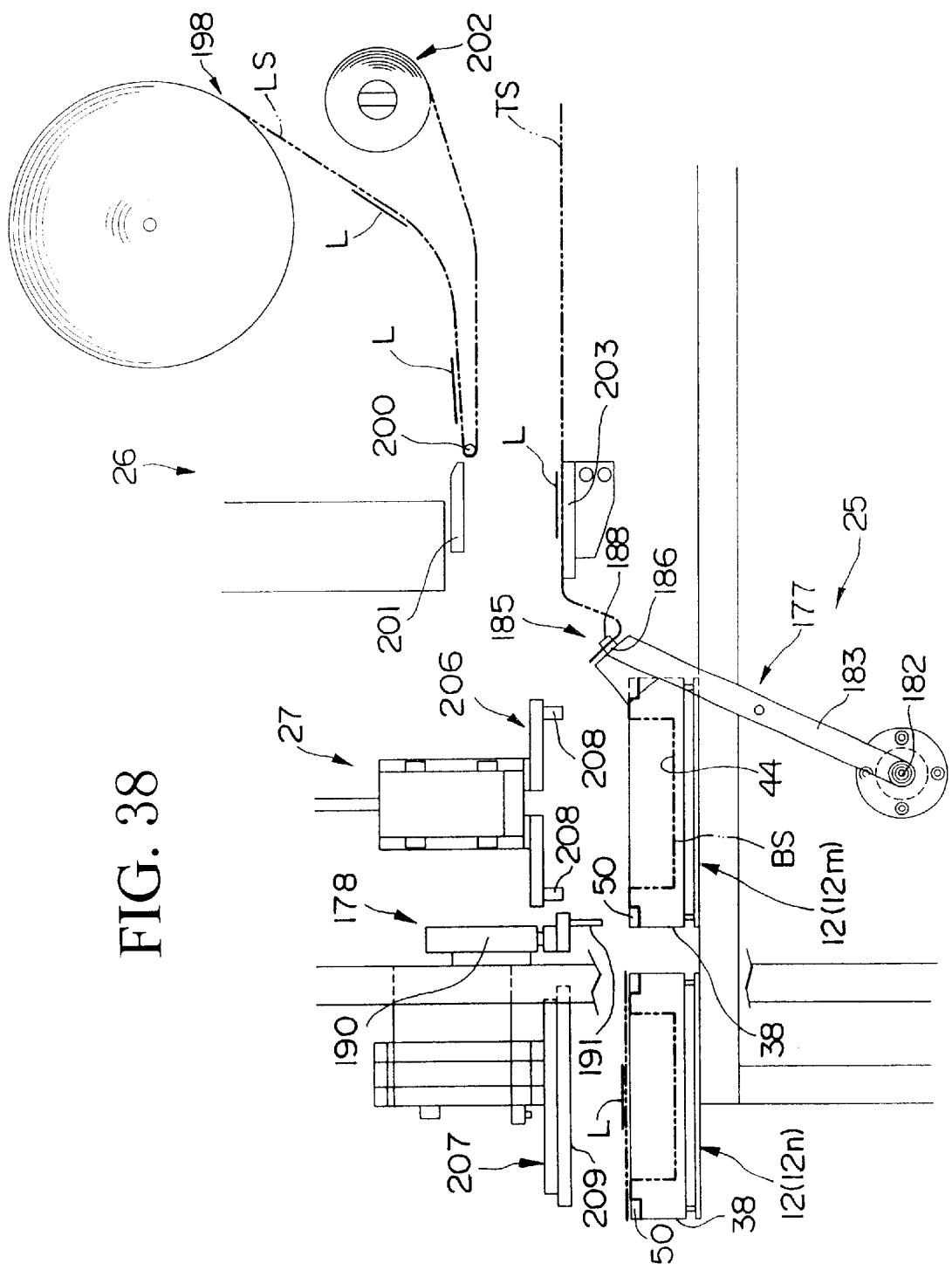
FIG. 38 is a side view showing the operations of a top sheet supplier, a printing label sticker, and a bonding device before extraction of the top sheet in the first embodiment of the present invention.
Figure 39:
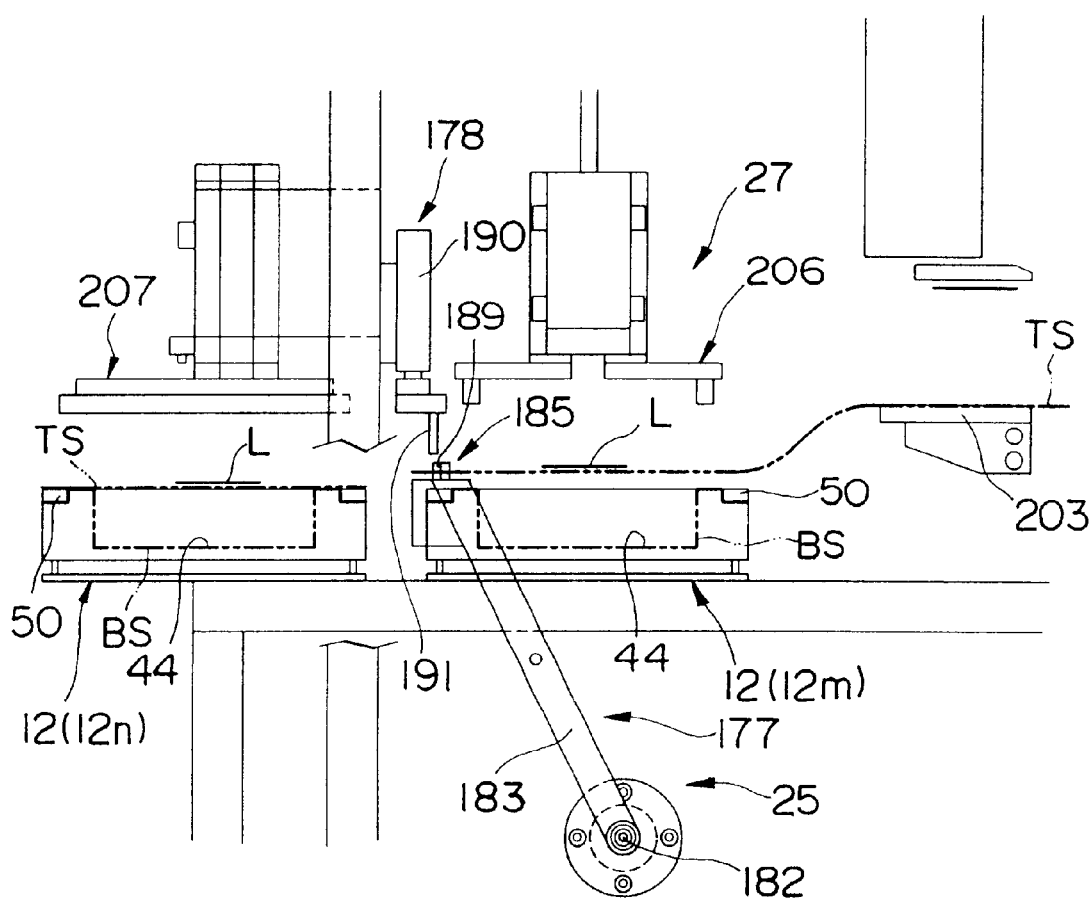
FIG. 39 is a side view showing the operations of the top sheet supplier, the printing label sticker, and the bonding device after extraction of the top sheet in the first embodiment of the present invention.

After the label L is adhered, the catcher 65 remains at the base position while the catcher body 188 and the catcher base 186 hold the end of the top sheet TS, the top sheet engager 178 maintains the pins 191 at the upper position, and the transverse side bonding portion 206 and the longitudinal side bonding portion 207 remain at the upper position (FIG. 38). First, the top sheet supply bonding controller 180 directs the drive unit 184 of the top sheet extractor 177 to rotate the extracting arms 183, so that the catcher 185 moves from the base position on the upstream portion of the container 12 (12m) at the top sheet supply position to the extraction position on the downstream portion of the container 12 (12m). Thus, the catcher 185 extracts the top sheet TS onto the container 12 (12m) (FIG. 39). The end of the extracted top sheet TS is positioned downstream of the stopper portion 50 of the container 12 (12m). The extracted top sheet TS has a width extending beyond both sides of the stopper portion 50 of the container 12 (12m) in the Y-direction. The entire top sheet TS has only to extend beyond at least the seal receptors 46 and 47.

On the extracted top sheet TS, the label L corresponding to the container 12 (12m) at the top sheet supply position is adhered at the center of the concavity 44.

Figure 40:
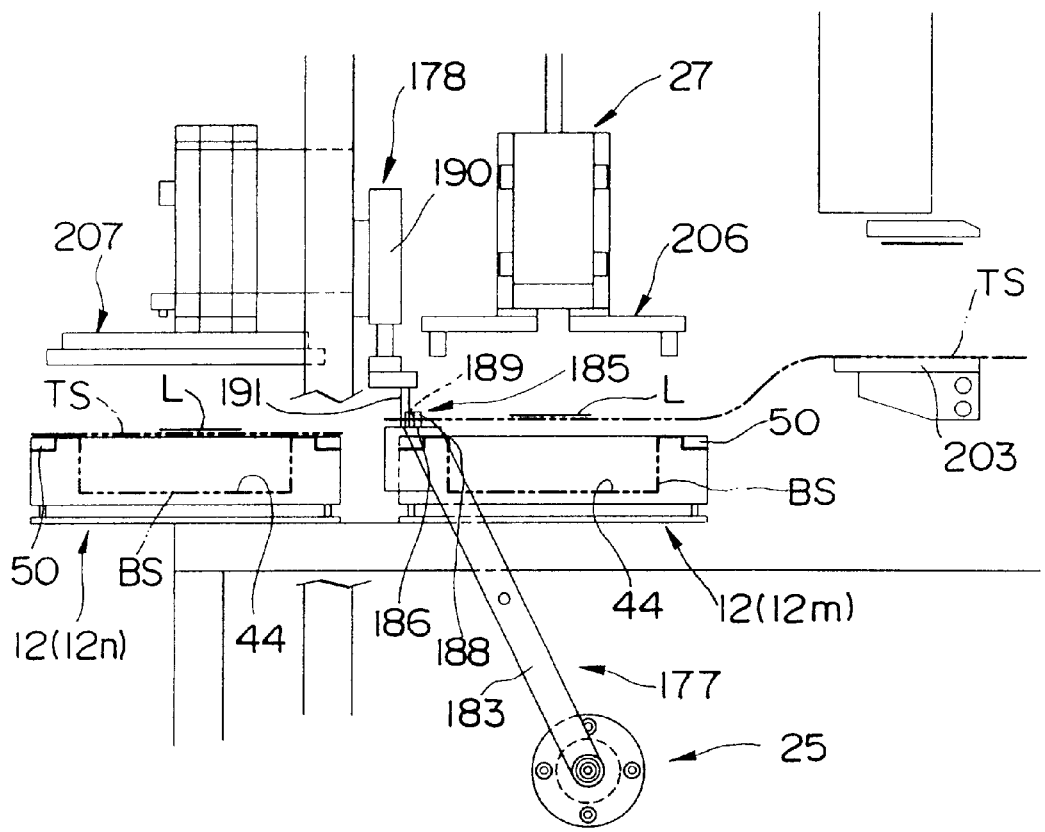
FIG. 40 is a side view showing the operations of the top sheet supplier, the printing label sticker, and the bonding device after engagement of the top sheet in the first embodiment of the present invention.

The top sheet supply bonding controller 180 directs the drive unit 190 of the top sheet engager 178 to move down and insert the pins 191 through the catcher 188 and the catcher base 186. As the result, the pins 191 pass through the downstream portion of the top sheet TS caught between the catcher 188 and the catcher base 186 on the container 12 (12m) at the top sheet supply position (FIG. 40).

Figure 41:
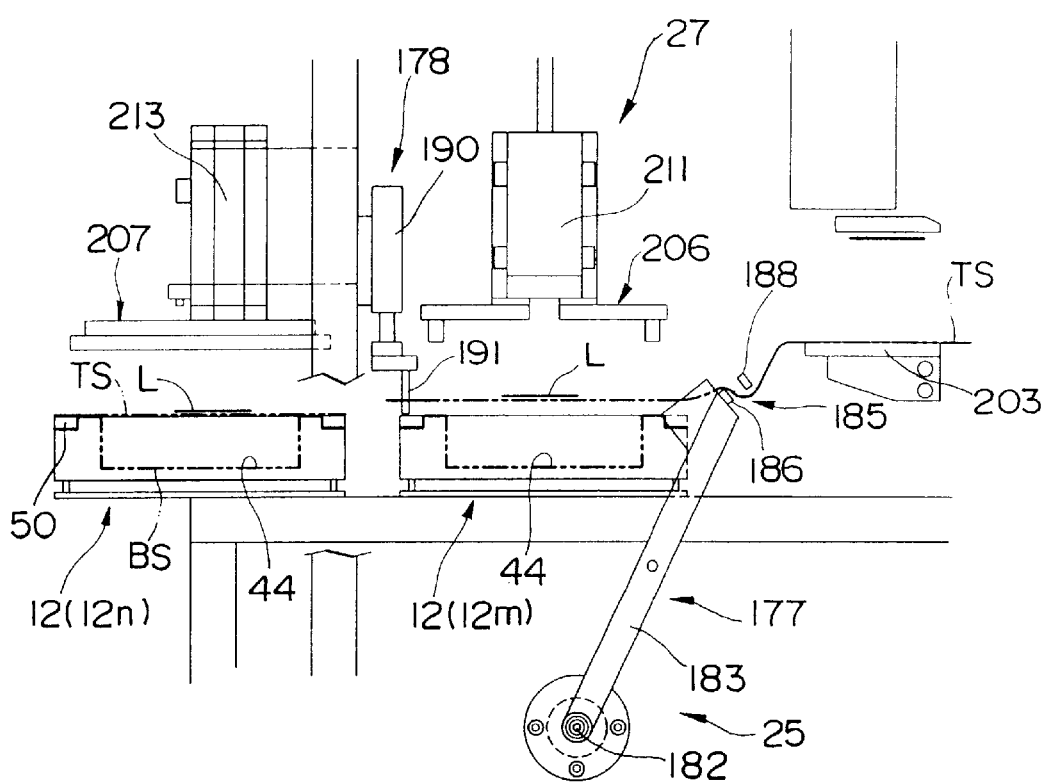
FIG. 41 is a side view showing the operations of the top sheet supplier, the printing label sticker, and the bonding device after the return of the extracting arm in the first embodiment of the present invention.

The top sheet supply bonding controller 180 directs the drive units 187 of the top sheet extractor 177 to release the top sheet TS from the catcher body 188 and the catcher base 186, and directs the drive units 184 to rotate the extracting arms 183 upstream and to return the catcher 185 to the upstream base position (FIG. 41).

Figure 42:
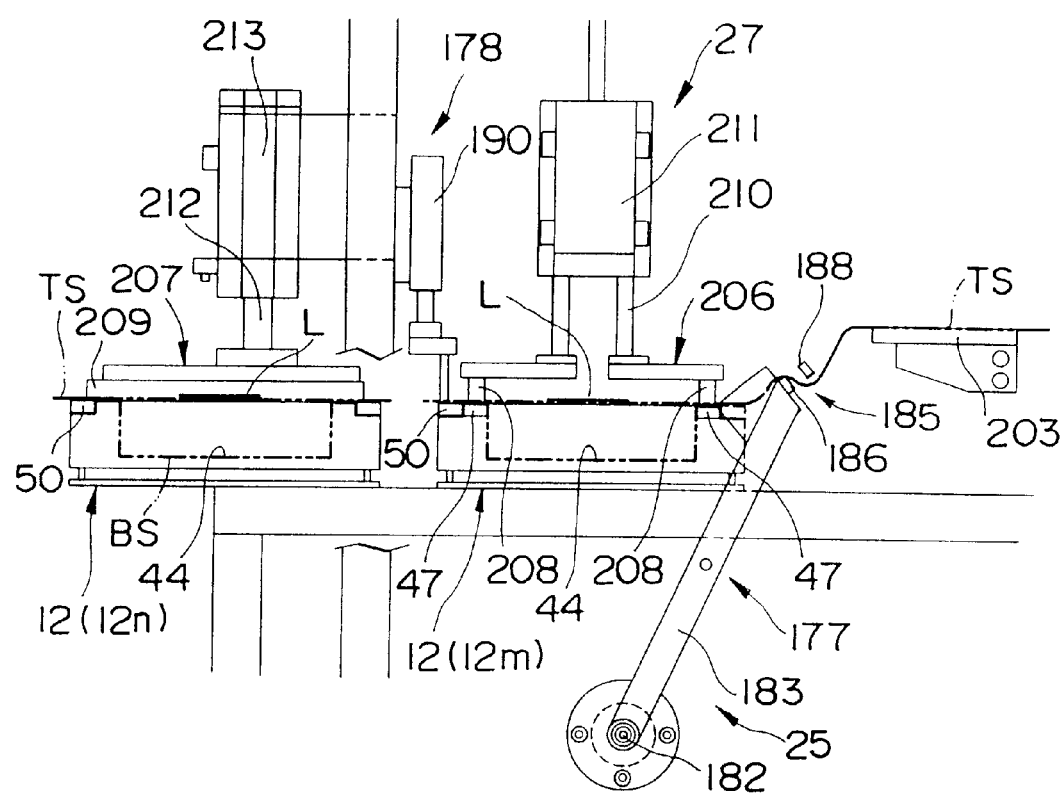
FIG. 42 is a side view showing the operations of the top sheet supplier, the printing label sticker, and the bonding device during bonding by the bonding device in the first embodiment of the present invention.

The top sheet supply bonding controller 180 controls the drive units 211 and 213 to synchronously move down the transverse side bonding portion 206 and the longitudinal side bonding portion 207. Thus, the overlapped portion of the top sheet TS and the base sheet BS is held between the front and rear seals 208 of the transverse side bonding portion 206 and the front and rear receptors 47 of the container 12 (12m) at the top sheet supply position. Simultaneously, the overlapped portion of the top sheet TS and the base sheet BS is caught between the right and left seals 209 of the longitudinal side bonding portion 207 and the right left seal receptors 46 of the container 12 (12n) stopped at the longitudinal side bonding position downstream of the top sheet supply position by one pitch (FIG. 42).

On the container 12 (12m) at the top sheet supply position, the top sheet TS and the base sheet BS are bonded by heat at two lines in front of and in the rear of the concavity 44. On the container 12 (12n) at the longitudinal side bonding position, the top sheet TS and the base sheet BS are bonded by heat at two lines on the right and the left of the concavity 44. Thus, the seals 208 and 209 and the seal receptors 46 and 47 bond the tip sheet TS and the base sheet BS outside the concavity 44 of the container 12 and within the stopper portion 50.

Before the seals 208 and 209 come in contact with the seal receptors 46 and 47, the top sheet supply bonding controller 180 holds the top sheet TS by the catcher 185 of the sheet extractor 177 which had returned to the base position.

Figure 43:
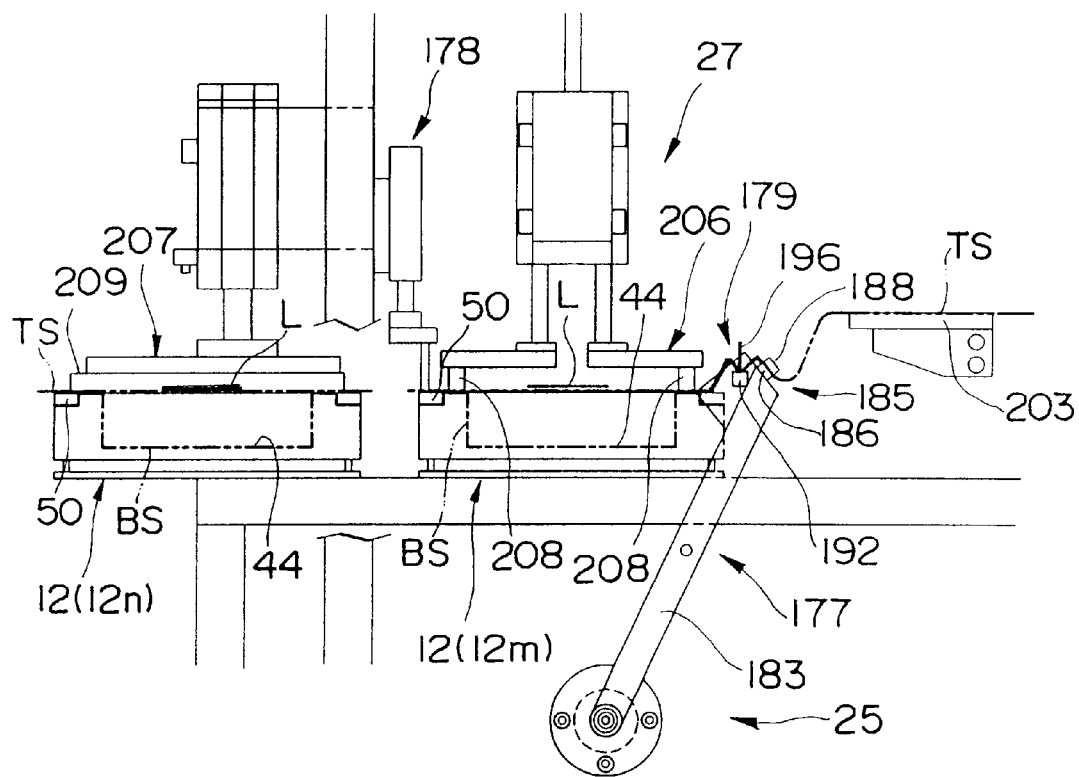
FIG. 43 is a side view showing the operations of the top sheet supplier, the printing label sticker, and the bonding device before extraction of the top sheet in the first embodiment of the present invention.

The top sheet supply bonding controller 180 moves the moveable body 194 of the top sheet cutter 179 along the guide rail 193, rotating the cutter 196 within the groove, not shown. As the result, the cutter 196 cuts the top sheet TS on the cutter rail 192 extracted by the tip sheet extractor 177 (FIG. 43). The cutting position is set at the upstream portion of the top sheet TS on the container 12 (12m) and between the portion bonded by the transverse side bonding portion 206 and the portion held by the catcher 185.

The base position where the catcher 185 of the top sheet extractor 177 returns is set near and upstream of the cutter rail 192. Before the top sheet cutter 179 cuts the top sheet TS, the catcher 185 of the top sheet extractor 177 releases the top sheet TS, returns to the base position, and catches the top sheet TS to maintain the shape of the base sheet BS, preventing twisting, and this allows the base sheet cutter 179 to cut the base sheet BS satisfactorily.

On the container 12 (12n) at the longitudinal side bonding position, after the transverse side bonding portion 206 bonded the top sheet TS and the base sheet BS at their front and rear portions, the longitudinal side bonding portion 207 bonds the top sheet TS and the base sheet BS by heat at their right and left portions, thus forming the change pack P with four bonded sides which includes the cash. The label L is attached to the center of the change pack P.

Figure 44:
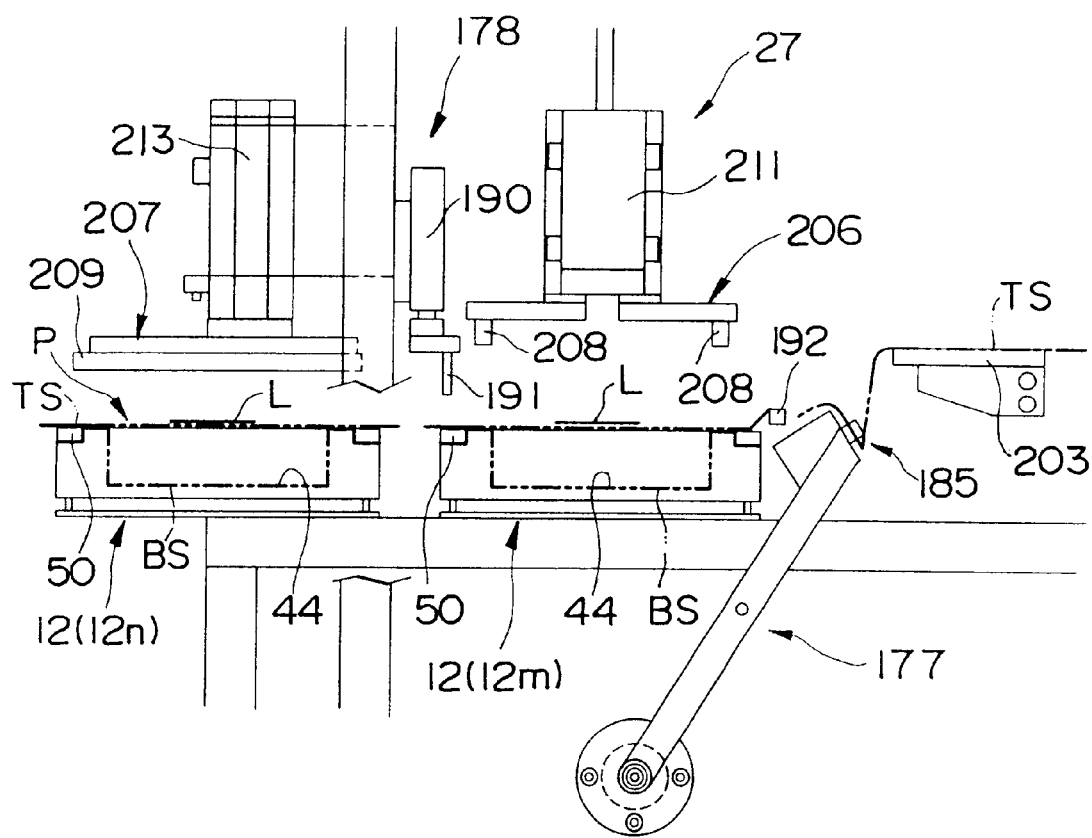
FIG. 44 is a side view showing the operations of the top sheet supplier, the printing label sticker, and the bonding device when the bonding device separates from the sheets in the first embodiment of the present invention.

When the top sheet supply bonding controller 180 moves down and maintains the transverse side bonding portion 206 and the longitudinal side bonding portion 207 at a predetermined interval, and moves up them (FIG. 44), the top sheet supply bonding controller 180 outputs the transfer permission signal to the integrated pack production controller 35. The signal is output after cutting the top sheet TS on the container 12 (12m).

Lifter

The lifter 28 will now be explained.

Figure 45:
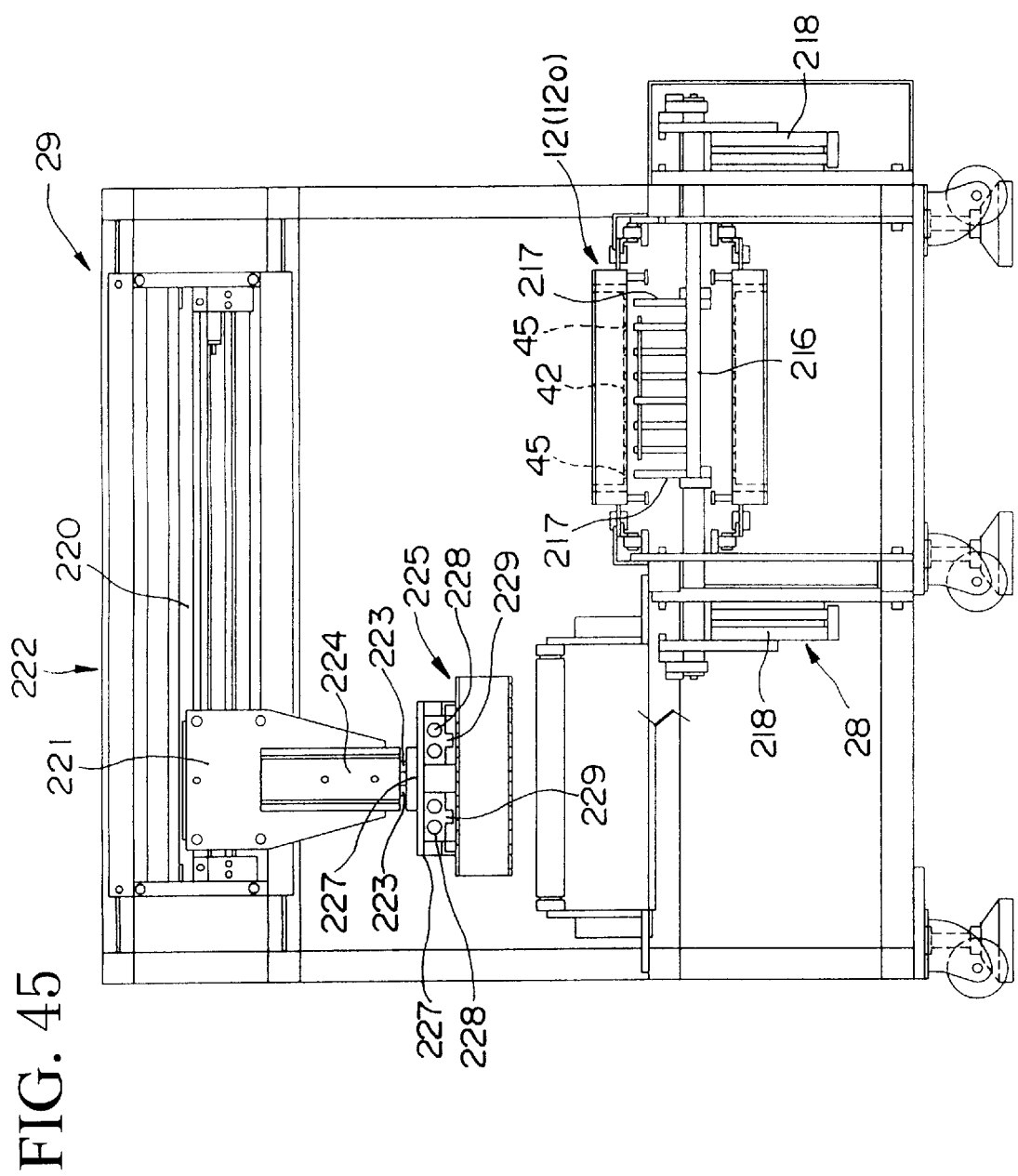
FIG. 45 is a front view showing a lifter and a transfer device of the first embodiment of the present invention.
Figure 46:
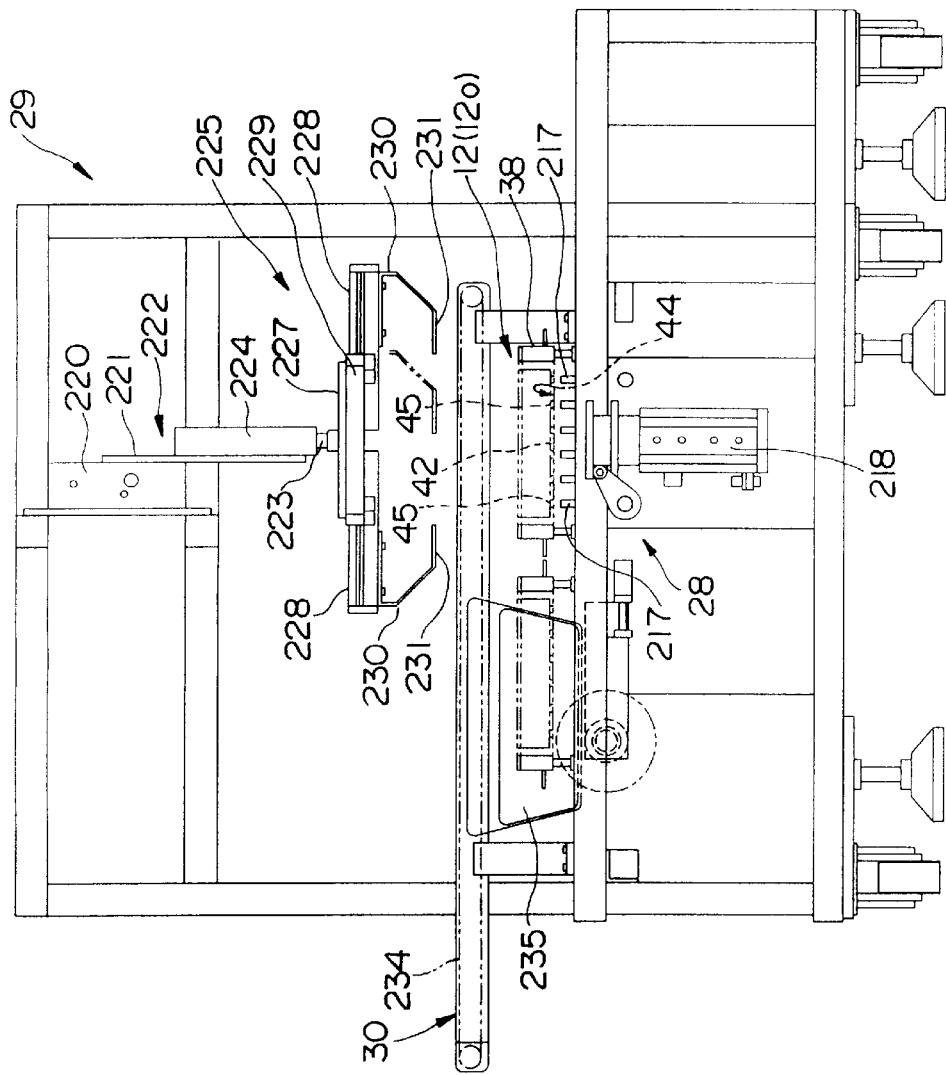
FIG. 46 is a side view showing a lifter and a transfer device of the first embodiment of the present invention.
Figure 47:
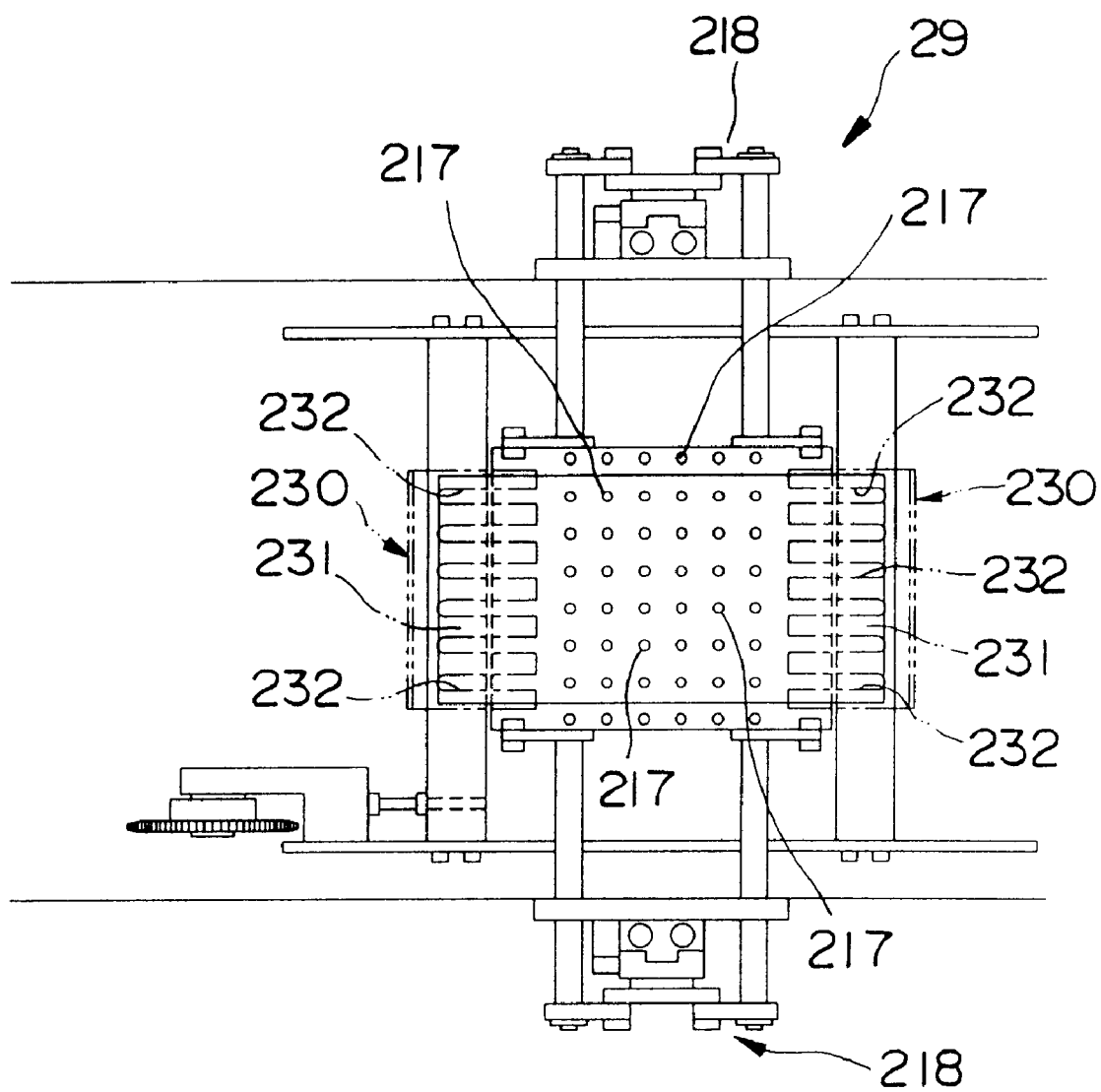
FIG. 47 is a top view showing a lifter and a transfer device of the first embodiment of the present invention.

The lifter 28 is controlled by a transfer controller 215 (FIG. 3). As shown in FIGS. 45 to 47, the lifter 28 is located downstream of the container 12 (12o) stopped at a predetermined transfer position downstream of the longitudinal side bonding position, and lifts up the change pack P.

The lifter 28 comprises a base 216 disposed below the container 12 (12o), a number of pins 217 corresponding to the holes 45 of the container 12 (12c), and a pair of drive units 218, such as air cylinders, for moving up and down the base 216 with the pins 217.

Figure 48:
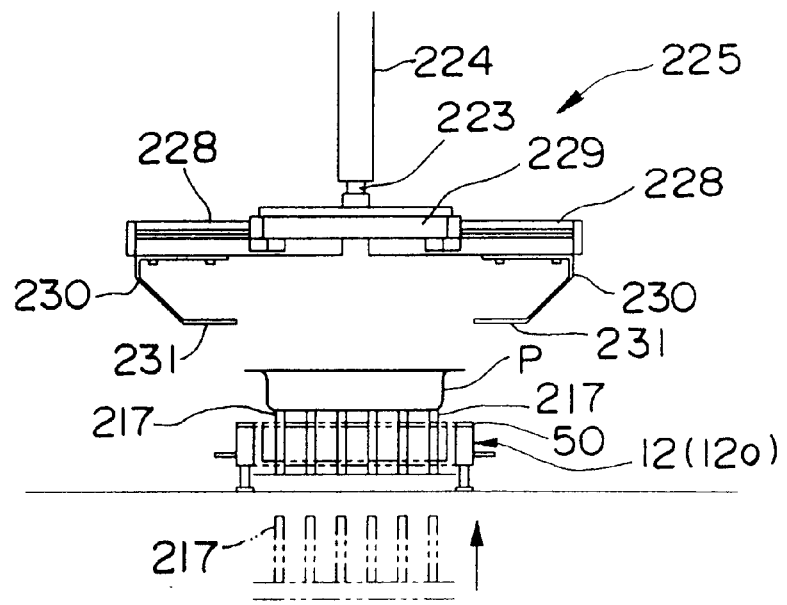
FIG. 48 is a side view showing the operations of the lifter and the transfer device when lifting up the change pack in the first embodiment of the present invention.

By driving the drive units 218, the pins 217 are moved between a recessed position and a protruding position. At the recessed position, the pins 217 are completely recessed from the container 12 (12o) stopped at the transfer position. At the protruding position, the pins 217 are inserted through the holes 45 so as to protrude from the bottom 42 of the concavity 44. That is, the pins 217 at the recessed position do not interfere with the transferred container 12, and the pins 217 at the protruding position come into contact with the underside of the change pack P in the concavity 44 and lift the change pack P (FIG. 48). The change pack P is lifted within the stopper portion 50 of the container 12 (12O), removing the base sheet portion inserted between the stopper portion 50 and the container body 38.

Transfer Device

The transfer device 29 will now be explained.

The transfer device 29 is located above the container 12 (12o) stopped at the transfer position, and holds and transfers the lifted change pack P. The transfer device 29 is controlled by a transfer controller 215.

The transfer device 29 comprises an air-driven transfer drive unit 222, a vertical drive unit 224 such as an air cylinder, and a support 225. The transfer drive unit 222 has a guide rail 220 extending in the Y-direction above the container 12 (12o) at the transfer position, and a movable body 221 movable by the guide rail 220. The vertical drive unit 224 is attached to the movable body 221 so that a movable shaft 223 extends vertically. The support 225 is attached to the lower end of the movable shaft 223.

The support 225 comprises a base 227, a pair of support drive units 229 such as air cylinders, and support bodies 230. The base 227 is fixed to the underside of the movable shaft 223. The support drive units 229 are attached to the base 227 so that movable shafts 228 of the support drive units 229 extend in the X-direction and in opposite directions to each other. The support bodies 230 are symmetrically attached to the movable shafts 228 of the support drive units 229 so as to approach and separate from each other by both support drive units 229.

The support bodies 230 have lower plates 231 protruding toward each other. The lower plates 231 have a number of grooves 232 in their ends, forming a comb shape.

As shown in FIG. 47, the positions of the grooves 232 in the Y-direction correspond to the pins 217 of the lifer 28, thereby allowing the lower plates 231 to be inserted between the pins 217.

According to the instruction from the transfer controller 215, the transfer drive unit 220 moves the support 225 to a predetermined pickup position just above the container 12 (12o) stopped at the transfer position, the vertical drive unit 224 moves up the support 225, and the support drive units 229 maintain the support bodies 230 separate from each other.

Figure 49:
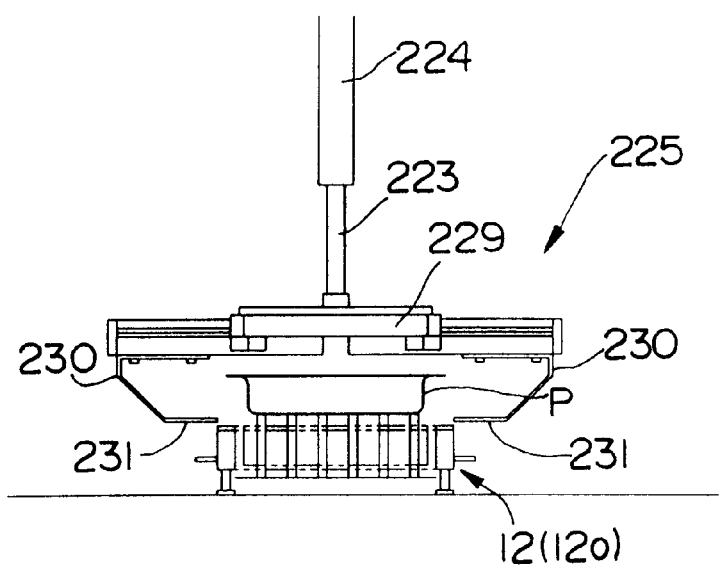
FIG. 49 is a side view showing the operations of the lifter and the transfer device after a support is lowered in the first embodiment of the present invention.
Figure 50:
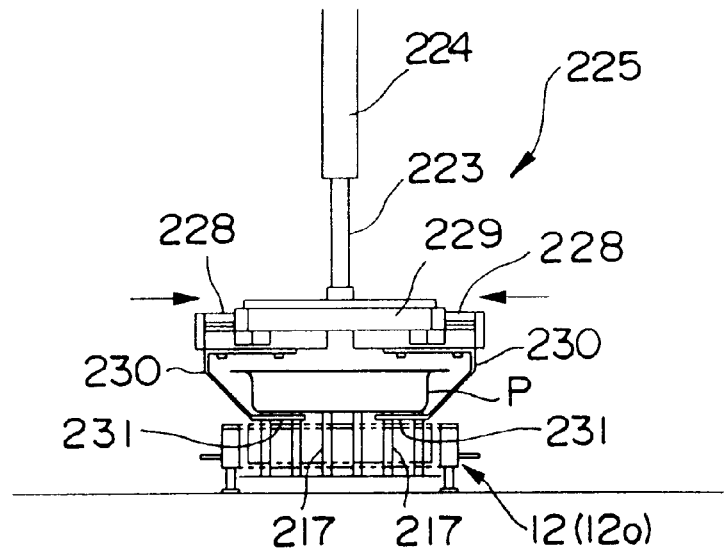
FIG. 50 is a side view showing the operations of the lifter and the transfer device when the support supports the change pack in the first embodiment of the present invention.

When the pins 217 of the lifter 28 lift up the change pack P in the container 12 (12o) (FIG. 48), the vertical drive unit 224 moves down the support 225 (FIG. 49). When the support 225 is moved down until the lower plates 231 of the support bodies 230 are positioned below the change pack P, the support drive units 229 move the support bodies 230 to approach each other so that the pins 217 enter the grooves 232, thus allowing the lower plates 231 to be inserted between the pins 217 (FIG. 50).

Figure 51:
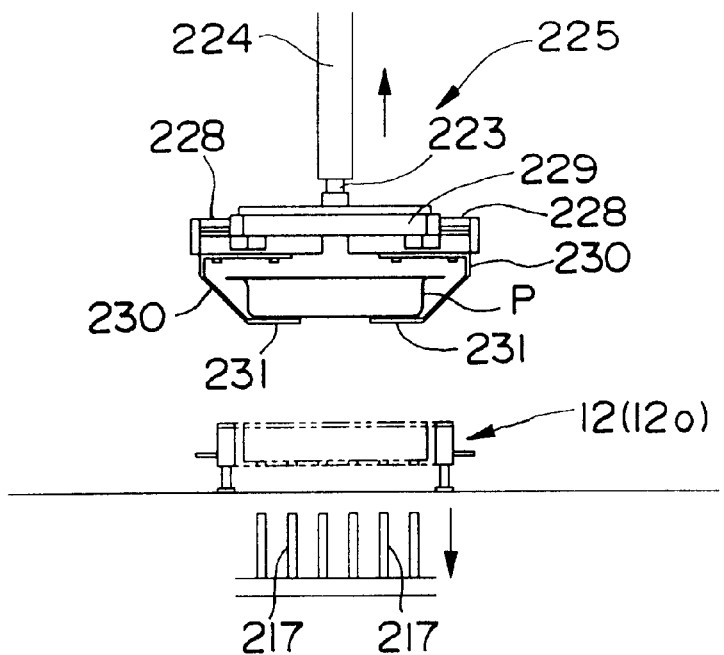
FIG. 51 is a side view showing the operations of the lifter and the transfer device when transferring the change pack in the first embodiment of the present invention.

Next, the transfer controller 215 moves up the support 225 using the vertical drive unit 224. Then, the support 225 picks up the change pack P, which then is separated from the pins 217. Simultaneously, the drive units 218 extract the pins 217 to the recessed position below the container 12 (12o) (FIG. 51). When the vertical drive unit 224 moves up the support 225, the transfer controller 215 outputs the transfer permission signal to the integrated pack production controller 35.

Figure 52:
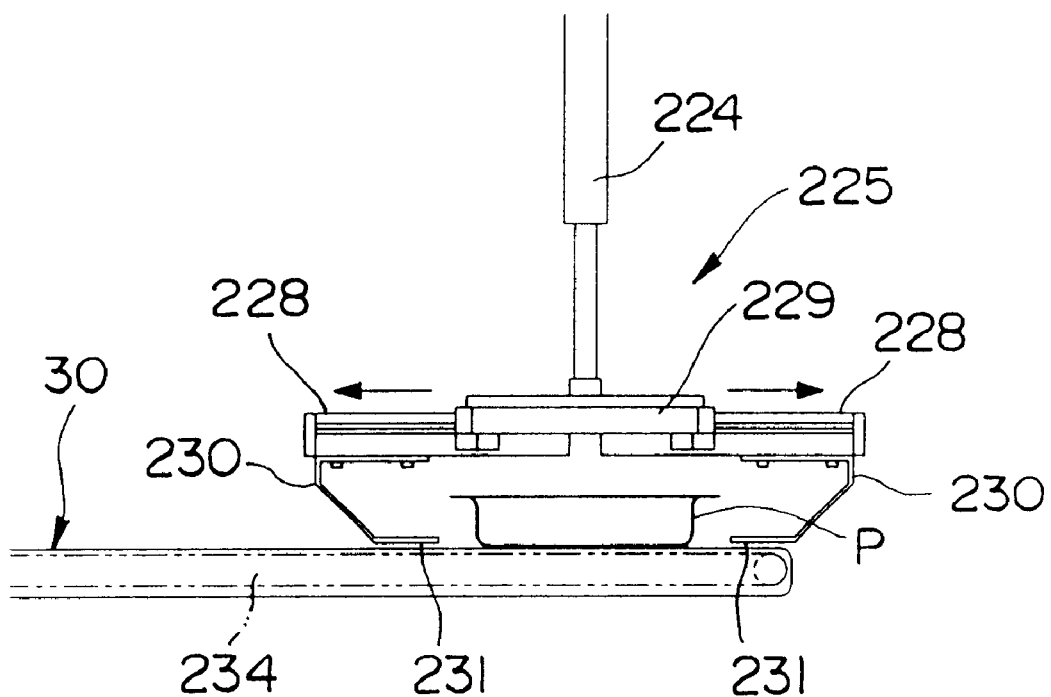
FIG. 52 is a side view showing the operations of the lifter and the transfer device when transporting the change pack in the first embodiment of the present invention.

The transfer controller 215 moves the support 225, which picks up the change pack P, using the transfer drive unit 222, toward and above the checker 30 disposed beside the container 12 (12o). Then, the vertical drive unit 224 moves down the support 225, the support drive units 229 separates the support bodies 230 of the support 225, thereby releasing the change pack P onto the checker 30 (FIG. 52).

The checker 30 comprises a belt conveyer 234, located beside the main conveyer 11, for transporting the change pack P in the same direction as the main conveyer 11, and a weighing machine 235 (shown in FIG. 46) for weighing the change pack P on the belt conveyer 234. The checker 30 is electrically connected to the change pack checker controller (change pack checker) 236 which checks the weight measured by the weighing machine 235 and controls the belt conveyer 234.

The change pack checker controller 236 stores reference weight data for each change pack P based on the number of bills in the pack data for each change pack P, and compares the reference data with the weight measured by the weighing machine 235 for each change pack P. When the difference is within a predetermined permissible range, the change pack P is transferred downstream to a bagging checker 238 (FIG. 1) by the belt conveyer 234. After the time required for transportation of the change pack P has passed, the change pack checker controller 236 outputs the transfer permission signal to the integrated pack production controller 35.

When the difference exceeds the permissible range, the change pack checker controller 236 repeats the measurement and the comparison predetermined times depending on the circumstances. When the measured value exceeds the range in the repeated measurement and comparison, the change pack checker controller 236 indicates the occurrence of mis-dispensing the package using a visual or auditory means. The change pack checker controller 236 pauses outputting the transfer permission signal until the weighing machine 235 detects that the change pack P is removed from the belt conveyer 234. When the weighing machine 235 detects that the change pack P is removed from the belt conveyer 234, the change pack checker controller 236 outputs the transfer permission signal to the integrated pack production controller 35. The change pack checker controller 236 is connected to a display, not shown, for indicating the actual measured weight data.

Bagging Checker

The bagging checker 31 (FIG. 1) will now be explained.

The bag, not shown, is prepared to pack the change packs P for each group. A shipping tag showing the bar-code is issued in advance and is attached to each bag.

The bagging checker 31 comprises a scanner 239 for reading the bar-code on the shipping tag on the bag and the bar-code on the change pack P, and a display 240 for displaying information to an operator. The bagging checker 31 is connected to a bagging checker controller 241 which verifies the bar-code. The bagging checker controller 241 is electrically connected to a shipping tag issuer, which is not shown, for issuing the shipping tag.

Data Input Device and Integrated Pack Production Controller

The data input device 36 and the integrated pack production controller 35 will be explained.

The data input device 36 receives instructions input by an operator, who can select an initial registration mode for registering a contractor, a store, and a cash-register, a change data registration mode for registering the change data, the relationship registration mode for registering the relationship of the production date to a reference delivery date, a reserve count mode for counting the amount of each type of cash on the production date in response to the input of the production date, and a change pack production mode for producing the change pack.

When the initial registration mode is selected, the integrated pack production controller 35 directs the data input device 36 to display a guide menu for the initial registration mode. Then, the operator inputs a contractor, stores, a delivery route, and cash-registers. A contractor register (a contractor register means) 244 registers the input contractor, the store register (a store register means) 245 registers the input stores and the input delivery route, and the cash-register register (a cash-register register means) 246 registers the input cash-registers (FIG. 3).

That is, in response to the input of the contractor (for example, a contractor name distinguishable from other contractors) to the data input device 36, a main controller 243 directs the contractor register 244 to store the contractor name. Subsequently, in response to the input of the stores of the contractor to the data input device 36, the main controller 243 directs the store register 245 to store the stores associated with the contractor. Subsequently, in response to the input of the delivery route through the stores (for example, a route name distinguishable from other routes), the main controller 243 directs the store register 245 to store the delivery route associated with the contractor. Subsequently, in response to the input of the cash-registers in the stores (for example, a register number distinguishable from the other cash-registers in the same store), the main controller 243 directs the cash-register register 246 to store the cash-registers associated with the stores. Thus, the registrations are repeated for all the contractors.

Figure 53:
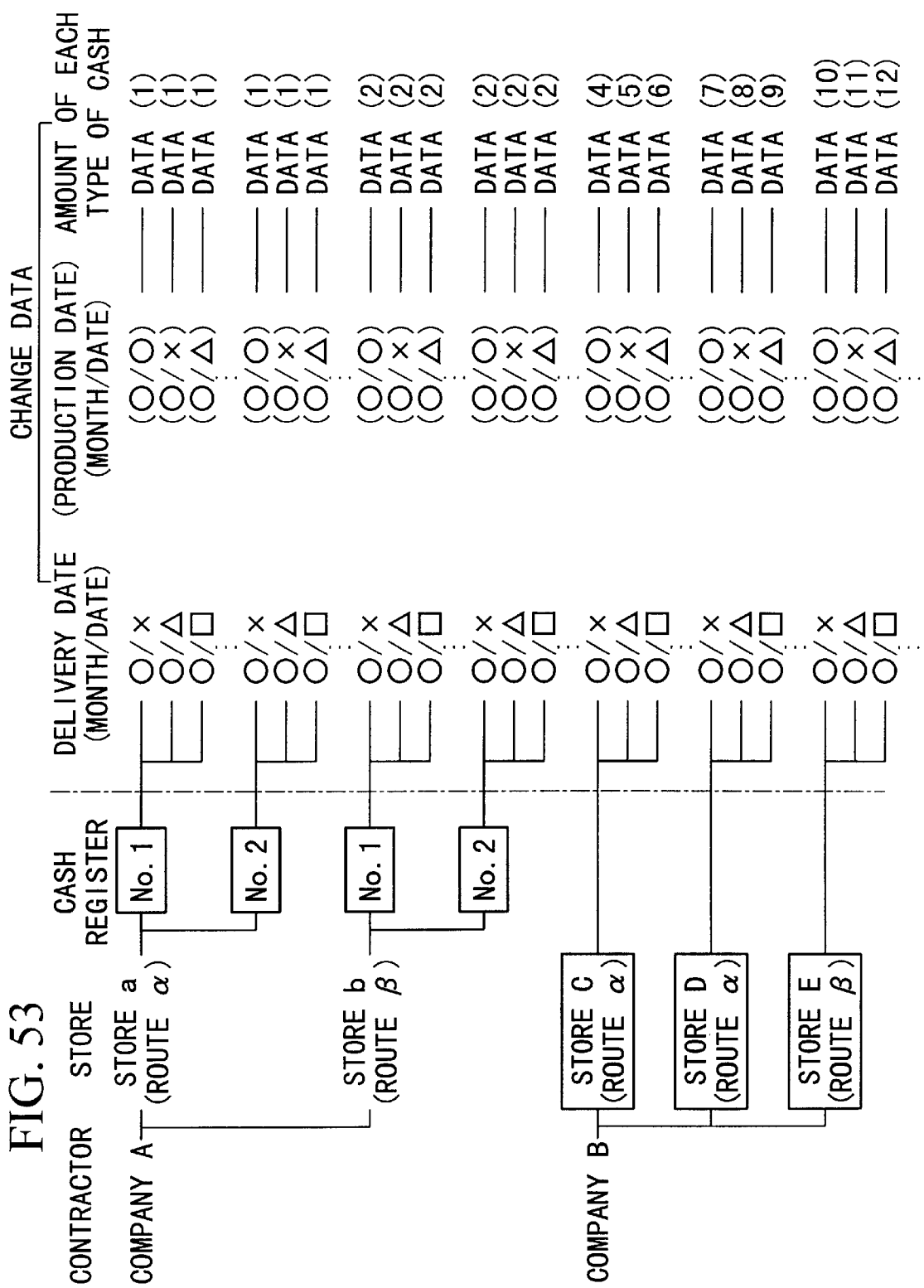
FIG. 53 is a schematic diagram showing input data in the first embodiment of the present invention.

The registered data of the contractors, stores, delivery routes, and cash-registers, have a hierarchic structure, shown in FIG. 53, associating the contractors, stores, and cash-registers. The delivery route is determined for each store (see the company A in FIG. 53). The cash-registers may not be always registered, and when they are not registered, the registered data of the contractor and the stores have a hierarchic structure without the cash-registers (see the company B in FIG. 53). When the cash-registers are at the lowest level of the hierarchic structure, each cash-register has a group. When the stores are at the lowest level, each store has a group (the groups are in the boxes in FIG. 53).

In the initial registration mode, the stored data can be read, modified, and restored.

In consideration of the efficiency of the delivery, two or more delivery routes can be prepared for the stores of one contractor, and one delivery route can be prepared for the stores of the different contractors (the routes α and β in FIG. 53).

When the change data registration mode is selected, the integrated pack production controller 35 controls the main controller 243 to display a guide menu of the change data registration mode through the data input device 36. Then, the operator inputs the change data for each group registered in the initial registration mode. The main controller 243 stores the input change data in a change data memory 247, associating the change data with the groups as shown in FIG. 53. As shown in FIG. 53, the change data includes a delivery date and an amount of each type of cash. Specifically, the change data with different delivery dates are stored independently even when the amount of each type of cash are identical to each other. The change data are input and stored for each group and for each day.

In the change data registration mode, the stored data can be read, modified, and re-stored.

Alternatively, one contractor may be handled as a group, and in this case, any one of a contractor, stores, and cash-registers can be directly input.

The types are coin rolls of fifty 100-yen coins, fifty 50-yen coins, fifty 10-yen coins, fifty 500-yen coins, fifty 5-yen coins, fifty 1-yen coins, and twenty 500-yen coins, stacks of one hundred 10000-yen bills, one hundred 5000-yen bills, and one hundred 1000-yen bills, and loose bills of 10000-yen bills, 5000-yen bills, and 1000-yen bills.

Further, the apparatus for dispensing change may allow the input of the change data which includes large stacks of one thousand 10000-yen bills (ten stacks of bills), one thousand 5000-yen bills (ten stacks of bills), one thousand 1000-yen bills (ten stacks of bills), and large packages of two thousand 500-yen coins, four thousand 100-yen coins, four thousand 50-yen coins, four thousand 10-yen coins, four thousand 5-yen coins, and five thousand 1-yen coins, although this embodiment does not handle them.

When the relationship registration mode is selected, the integrated pack production controller 35 instructs the main controller 243 to display a guide menu for the relationship registration mode through the data input device 36. Then, the operator inputs the relationship of the production date to the reference delivery date for each store registered in the initial registration mode. The main controller 243 stores the input relationship data in a relationship memory 248, associating the relationship data with the stores. The relationship between the production date and the delivery date defines when the change packs are produced before the delivery date. By presetting the relationship data, in response to the input of the delivery date of the change data, the production date can be automatically determined. The change data memory 247 stores the determined production date as a part of the change data, associating the production date with the delivery date.

That is, by inputting the delivery date, which is a part of the change data, the production date is automatically determined and registered.

In this relationship registration mode, the stored data can be read, modified, and re-stored.

When the reserve count mode is selected, the integrated pack production controller 35 instructs the main controller 243 to display a guide menu for the reserve count mode through the data input device 36. Then, the operator inputs the production date though the data input device 36.

The main controller 243 outputs the input production date to a reserve calculator 249. The reserve calculator 249 reads all the change data, which includes the input production date, from the change data memory 247, and counts the amount of each type of cash to be prepared on the production date. A printer, not shown, prints the amount of each type of cash with the production date.

The change pack production mode includes a contractor-based production mode, and a delivery-route-based production mode. When the contractor-based production mode is selected in the change pack production mode, the integrated pack production controller 35 instructs the main controller 243 to display a guide menu for the contractor-based production mode through the data input device 36. Then, the operator inputs the production date and the contractor through the data input device 36.

In response to the input of the production date and the contractor, the main controller 243 outputs the input production date and contractor data to an contractor-based production instructor (an contractor-based production instructor means) 250. The contractor-based production instructor 250 reads only the change data of the input production date and of the input contractor from the change data memory 247, and outputs them to the main controller 243.

When the delivery-route-based production mode is selected in the change pack production mode, the integrated pack production controller 35 instructs the main controller 243 to display a guide menu for the delivery-route-based production mode through the data input device 36. Then, the operator inputs the production date and the contractor through the data input device 36.

In response to the input of the production date and the delivery route, the main controller 243 outputs the production date and the delivery route to the delivery-route-based production instructor (delivery-route-based production instructor) 251. The delivery-route-based production instructor 251 reads only the change data of the input production date and the input delivery route from the change data memory 247, and outputs the read change data to the main controller 243.

The integrated pack production controller 35 includes a change data divider (a change pack producer) 252 and a pack data memory 253.

The change data divider 252 receives the change data for each group, which are read in the change pack production mode, from the main controller 243. The change data divider 252 calculates the amount (number, or weight) of cash corresponding to the received change data, compares the amount of cash with the reference value, and, when the amount exceeds the reference value, divides the change data into a plurality of pack data so as to set the amount of cash of each pack data below the reference value, and stores the pack data in the pack data memory 253.

That is, the change data divider 252 compares the total amount of cash corresponding to the change data for one group with the predetermined reference value, and, when the total amount of cash is below the reference value, stores the change data as pack data to the memory, associating the pack data with the group. On the other hand, when the total amount of cash exceeds the reference value, the change data divider 252 divides the change data into a plurality of pack data, associating the pack data with the group. The amount of cash of each pack data is below the reference value, and each pack data includes one type of cash, except when the amount of one of types exceeds the reference value. The number of the divided pack data is set to a minimum.

Specifically, the operation of the apparatus of the present invention will be explained when the total amount of cash exceeds the reference value. In FIG. 54, in order to allow easy explanation, the change packs of the coin rolls are created, and the reference value is set to thirty coin rolls.

When the total amount of cash exceeds the reference value, the amount of each type of cash is compared with the reference value. When the amount of one of types of cash exceeds the reference value, the change data corresponding to this type of cash are divided to set the amount below the reference value, and the divided data are registered. In FIG. 54, the change data includes the fifty rolls of 10-yen coins which exceeds the reference value 30, and the 10-yen coin rolls are divided into thirty coin rolls and twenty coin rolls. On the other hand, when the amounts of cash are below the reference value, the change data is divided into a plurality of divided according to the types of cash. For instance, the coin rolls other than the 10-yen coin rolls are divided as shown in FIG. 54. Thus, each of the divided data includes only one type of cash and does not include the other type of cash.

Then, the divided data are combined to minimize the number of data so that the combined data does not exceed the reference value (see the pack data in FIG. 54).

The pack data memory 253 stores the created divided data and combined divided data as the pack data, associating the pack data with the group. The number of the divided data and the identification numbers are attached to the pack data within the same group.

The pack data are created for all the groups.

The control operation of the integrated pack production controller 35 in the apparatus for dispensing change will be explained.

The reserve count mode is selected and the production date is input through the data input device 36. The amount of each type of cash to be prepared at the production date is calculated and printed. Based on the printed reserve data, the coin rolls C and the stacks of bills S1 are loaded beforehand on the coin roll deliverer 16 to 21 and 23, stacked bills deliverers 22, and loose bill deliverer 32.

Then, the change pack production mode is selected, the contractor-based production mode or the delivery-route-based production mode is selected, and the production date is input through the data input device 36. The integrated pack production controller 35 reads the change data of the groups from the change data memory 247, and directs the change data divider 252 to create the pack data.

The integrated pack production controller 241 outputs a command to the bagging checker controller 241 to print the shipping tags for the bags using the shipping tag issuer. When the group corresponds to the store, the shipping tag indicates the contractor and the store with the bar-code indicating the group. When the group corresponds to the cash-register, the shipping tag indicates the contractor and the store with the bar-code indicating the group.

When all the change data are converted into the pack data, the integrated pack production controller 35 assigns the first pack data to the container 12 (12*a*) stopped at the base sheet supply position. Subsequently, the controller 35 assigns the pack data one by one to the container 12 stopped at the base sheet supply position. Naturally, the assigned pack data is maintained to the moving container 12 irrespective of its position until the change pack P is completed. The pack data in the same group are assigned to the containers 12 according to the numerical order.

The integrated pack production controller 35 outputs a command to the base sheet supply controller 60, which then supplies the base sheet BS using the base sheet supplier 14 and the base sheet arranger 15 onto the container 12 (12*a*) stopped at the base sheet supply position. The base sheets BS are supplied to all the containers 12 corresponding to the pack data.

Additionally, the integrated pack production controller 35 sends a command to the coin roll delivery controller 98, which then loads the coin rolls of fifty 100-yen coins using the coin roll deliverer 16 onto the container 12 (12*b*) stopped at the first coin roll loading position. The number of the loaded coin rolls is specified in the pack data.

The integrated pack production controller 35 outputs a command to the coin roll delivery controller 99, which then loads the coin rolls of fifty 50-yen coins using the coin roll deliverer 17 onto the container 12 (12*c*) stopped at the second coin roll loading position. The number of the loaded coin rolls is specified in the pack data.

The integrated pack production controller 35 outputs a command to the coin roll delivery controller 100, which then loads the coin rolls of fifty 10-yen coins using the coin roll deliverer 18 onto the container 12 (12*d*) stopped at the third coin roll loading position. The number of the loaded coin rolls is specified in the pack data.

The integrated pack production controller 35 outputs a command to the coin roll delivery controller 101, which then loads the coin rolls of fifty 500-yen coins using the coin roll deliverer 19 onto the container 12 (12*e*) stopped at the fourth coin roll loading position. The number of the loaded coin rolls is specified in the pack data.

The integrated pack production controller 35 outputs a command to the coin roll delivery controller 102, which then loads the coin rolls of twenty 500-yen coins using the coin roll deliverer 20 onto the container 12 (12*f*) stopped at the fifth coin roll loading position. The number of the loaded coin rolls is specified in the pack data.

The integrated pack production controller 35 outputs a command to the coin roll delivery controller 103, which then loads the coin rolls of fifty 5-yen coins using the coin roll deliverer 21 onto the container 12 (12*g*) stopped at the sixth coin roll loading position. The number of the loaded coin rolls is specified in the pack data.

The integrated pack production controller 35 outputs a command to the stacked bills delivery controller 123, which then loads stacks of bills using the stacked bills deliverer 22 onto the container 12 (12*h*) stopped at the stacked bills loading position. The number of the loaded stacks of bills is specified in the pack data.

The integrated pack production controller 35 outputs a command to the coin roll delivery controller 104, which then loads the coin rolls of fifty 1-yen coins using the coin roll deliverer 23 onto the container 12 (12*i*) stopped at the seventh coin roll loading position. The number of the loaded coin rolls is specified in the pack data.

The integrated pack production controller 35 outputs a command to the loose bills delivery controller 163, which then loads stacks of loose bills using the loose bills deliverer 32 once or several times onto the container 12 (12*j*) stopped at the loose bills loading position. The number of the loaded stacks of loose bills is specified in the pack data. The operator may load the delivered loose bills onto the container 12 (12*j*).

The integrated pack production controller 35 outputs a command to the load adjuster 168, which then detects the condition of the loaded coin rolls by the sensor 172, determines that the condition is incomplete when the sensor 172 detects the coin roll, and moves down the adjuster portion 171 by driving the drive unit 170. The adjuster portion 171 comes in contact with the tops of the stacked coin rolls, and presses and slides them to both sides.

The integrated pack production controller 35 outputs a command to the labeler controller 204, which then controls the labeler 26 to print the contents of the pack data to the containers 12 in the order of the pack data. When the group corresponds to the store, the printed content includes the contractor, the store, the amount of each type of cash, the reference weight of the change pack calculated based on the amount of each type of cash, and the bar-code indicating the group.

On the other hand, when the group corresponds to the cash-register, the printed content includes the contractor, the store, the cash-register, the amount of each type of cash, the reference weight of the change pack calculated based on the amount of each type of cash, and the bar-code indicating the group.

Irrespective of the groups, when the pack data is one of the divided change data, the division is indicated by a printed fraction whose denominator is the number of the divide data and whose numerator is the identification number. When the change data in the group becomes the pack data as is, the fraction is not indicated.

The integrated pack production controller 35 outputs a command to the labeler controller 204, which then attaches the label L to the extracted portion of the top sheet TS for the container 12 (12*m*) stopped at the top sheet supply position.

The integrated pack production controller 35 outputs a command to the top sheet supply bonding controller 180, which then supplies the top sheet TS using the top sheet supplier 25 onto the container 12 (12*m*) stopped at the top sheet supply position, so as to cover the cash on the base sheet TS. The bonding device 27 bonds the front and rear portions of the base sheet BS and the top sheet TS on the container 12 (12*m*), and bonds the right and left portions of the base sheet BS and the top sheet TS on the container 12 (12*n*).

Further, the integrated pack production controller 35 outputs a command to the transfer controller 215, which then lifts up the change pack P from the container 12 (12*o*) at the transfer position by the lifter 28, and transfers the change pack P onto the belt conveyer 234 of the checker 30 by the transfer device 29.

The change pack checker controller 236 obtains the reference data of the weight of the change pack, based on the pack data for the transferred change pack P, and compares the reference data with the data measured by the weighing machine 235. When the difference is within the permissible error range, the belt conveyer 234 transfers the change pack P downstream to the bagging checker 238.

The change pack checker controller 236 is electrically connected to a display, which displays the measured weight data. As a result, the operator can monitor the difference between the measured weight data and the calculated weight data indicated on the label on the change pack.

The base sheet supply arrangement controller 60, the coin roll delivery controllers 98 to 104, the stacked bills delivery controller 123, the loose bills delivery controller 163, the load adjuster controller 168, the top sheet supply bonding controller 180, and the transfer controller 215 output the transfer permission signals to the integrated pack production controller 35. The integrated pack production controller 35 includes transfer control flags which are turned on in response to the transfer permission signals. When all the devices for handling the containers 12 terminate their operations and the all the transfer control flags are turned on, the integrated package controller 35 outputs a command to the conveyer drive controller 54, which then moves the containers 12 by one pitch. On the other hand, when the containers 12 are transferred by one pitch, the integrated pack production controller 35 turns off the transfer control flags.

As described above, when the base sheet supplier 14 and the base sheet arranger 15 place the base sheet BS on the container 12, as the container 12 proceeds, the coin roll deliverer 16 delivers the necessary coin rolls of fifty 100-yen coins on the base sheet BS within the concavity 44, the coin roll deliverer 17 delivers the necessary coin rolls of fifty 50-yen coins on the base sheet BS within the concavity 44, and the coin roll deliverer 18 delivers the necessary coin rolls of fifty 10-yen coins on the base sheet BS within the concavity 44.

As the container 12 proceeds, the coin roll deliverer 19 delivers the necessary coin rolls of fifty 500-yen coins on the base sheet BS within the concavity 44, the coin roll deliverer 20 delivers the necessary coin rolls of twenty 500-yen coins on the base sheet BS within the concavity 44, the coin roll deliverer 21 delivers the necessary coin rolls of fifty 5-yen coins on the base sheet BS within the concavity 44, the stacked bills deliverer 22 delivers the necessary stacks of bills on the base sheet BS within the concavity 44, the operator loads the necessary loose bills from the loose bills deliverer 32 on the base sheet BS within the concavity 44, and the coin roll deliverer 23 delivers the coin rolls of fifty 1-yen coins on the base sheet BS within the concavity 44.

As the container is transferred, the load adjuster 24 adjust the condition of the loaded coin rolls. The top sheet supplier 25 supplies the top sheet TS with the label L, on which the pack data corresponding to each container 12 by the labeler 26, so as to cover the cash on the base sheet BS. The bonding device 27 bonds the front and rear portions of the sheets, and subsequently bonds the right and left portions of the sheets. The transfer device 29 transfers the change pack to the checker 30, which then checks the weight and transports the change pack to the bagging checker 31.

The operation of bagging the change packs P will now be explained.

When the confirmation signal is output to indicate the completion of the operation of bagging the change packs P of the prior group, the integrated pack production controller 35 obtains the next group of the change packs P which is to be transferred from the checker 28 to the bagging checker 31, and informs the bagging checker controller 241 of the next group. The bagging checker controller 241 instructs the display 240 to display the next group for which a bag is to be prepared. That is, when the group corresponds to the store, the display indicates the contractor and the store. When the group corresponds to the cash-register, the display indicates the contractor, the store, and the cash-register.

The operator prepares the bag with the shipping tag indicating the displayed group, and provides it to the scanner 239, which then reads the bar-code on the shipping tag. The bagging checker controller 241 realizes the group of the bar-code, and confirms whether the group is identical to the displayed group. When the group is identical, the display 240 indicates the consistency and produces a particular sound, and the bagging checker controller 241 allows the input of the bar-code of the change pack P which will be explained below.

When the group of the bag is not identical to the displayed group, the display indicates the inconsistency and produces a particular sound, and rejects the input of the bar-code of the change pack P. The operator provides the bar-code of the correct bag to the scanner, thus achieving consistency of the groups.

When the group of the bag is identical to the group displayed by the display 240, the bagging checker controller 241 allows the input of the bar-code of the change pack P transferred from the checker 30. The operator provides the bar-code of the change pack P to the scanner 239, which then reads the bar-code. The bagging checker controller 241 realizes the group in the bar-code, and confirms whether the group is identical to the displayed group. When the group is identical, the display 240 indicates the consistency and produces a particular sound. When the group includes a plurality of the pack data, the bagging checker controller 241 rejects the input of the bar-code of the other bag and allows the input of the bar-code of the change pack P in the same group. When the group includes only single pack data, the bagging checker controller 241 rejects the input of the bar-code of the other change pack P and allows the input of the bar-code of the next bag. Then, the display 240 displays that bagging the change packs of this group are completed, and the integrated pack production controller 35 receives the confirmation signal of completing the operation of bagging the change packs P in the group.

When the group of the bag is not identical to the displayed group, the display indicates the inconsistency and produces the particular sound of the inconsistency, and rejects the input of the bar-code of the next change pack P and the next bag. The operator provides the bar-code of the correct change pack to the scanner, thus achieving consistency of the groups.

When the group includes a plurality of the pack data, in response to the input of the bar-code of the change pack P of this group, the bagging checker controller 241 rejects the input of the bar-code of the next bag and allows the input of the bar-code of the change pack P in the same group until all the bar-codes of the change packs P in the same group are read and input. When all the bar-codes of the change packs in the same group are input, the bagging checker controller 241 rejects the input of the bar-code of the other change pack P and allows the input of the bar-code of the next bag, and instructs the display 240 to display that bagging all the change packs P in the same group is completed.

According to the first embodiment described above, the base sheet BS from the base sheet supplier 14 and the top sheet TS from the top sheet supplier 25 are bonded by bonding device 27 so as to include the cash from the coin roll deliverers 16 to 21 and 23 and the stacked bills deliverer 22. Therefore, this apparatus eliminates the work of transferring the change packs into the bags, reducing the labor costs to prepare change.

Instead of a bag, the base sheet BS and the top sheet TS are used in the change pack, thereby reducing the cost of the package. Further, the drop of the coin rolls from the coin roll deliverer 16 to 21 and 23 is shortened, thereby preventing the coin rolls from being bent and broken.

The checker 30 measures the weight of the change pack P, and compares the measured weight with the reference weight data calculated based on the pack data input to the data input device 36, thus preventing the transfer of the incomplete change pack P.

The container 12 has a concavity 44 which holds the placed base sheet BS, and the concavity prevents the cash from accidentally falling from the base sheet BS. Therefore, the change pack P can be manufactured with an inexpensive sheet.

In addition, the coin roll deliverers 16 to 21 and 23 and the stacked bills deliverer 22 are arranged at the intervals (pitches) between the containers 12, and the coins and bills are delivered one by one from the coin roll deliverers 16 to 21 and 23 and the stacked bills deliverer 22 to the containers 12. This shortens the time required for the delivery of cash onto the base sheet BS.

The change pack P has the attached label L indicating information such as the group and the amount of each type of cash, eliminating the work of attaching specifications describing these information. This reduces the labor costs required to prepare change.

In addition, the contents of the label L include the reference weight data of the change pack P, and the operator can easily monitor the reference weight data of the change pack P from the label L. Therefore, the weight of the change pack P can be manually compared with the reference weight data without the checker 30.

The stacked bill deliverer 22 for delivering the stack of bills S1 and coin roll deliverers 16 to 21 and 23 for delivering the coin rolls C allow the automatic preparation of the change packs P which include the stacks of bills S1 and the coin rolls C.

The coin roll deliverers 16 to 21 and 23 have the coin packagers 94, which allow the use of collected loose coins.

The change data divider 252 calculates the amount of cash corresponding to the change data beforehand, based on the change data input from the data input device 36. When the amount of cash exceeds the reference values, the divider divides the change data into a plurality of the pack data to arrange the quantities of cash corresponding to the pack data below the reference value. When the change data divider divides the change data, the change packs P are prepared based on the divided change data. The large amount of cash is divided into a plurality of the change packs P, preventing the large amount of cash from overflowing the package and from accidentally falling from the transfer device 29 because of overweight. Thus, the change pack P can be reliably prepared.

The change data divider 252 divides the change data into a plurality of pack data, so that each pack data includes the same type of cash, except when the amount of the same type of cash exceeds the reference value. Therefore, when the change packs P are prepared based on the divided pack data, the same types of coins or bills are not divided into two or more change packs P, except when the amounts of the same type of cash exceed the reference value. The operator does not make a mistake when counting the amount of cash.

When the change data is not divided, the labeler 26 attaches the label L, indicating the contents of the change data, to the change pack P. When the change data is divided, the labeler 26 attaches the label L, indicating the contents of the pack data, to the change pack P. Thus, the change packs P indicate the contents of cash, which can be easily confirmed by the label L.

When the change data is not divided, the labeler 26 prints the reference weight, calculated based on the change data, on the label L. When the change data is divided, the labeler 26 prints each reference weight, calculated based on the pack data, on the label L. Thus, the change packs P indicate the reference weight of the packed cash, which can be easily confirmed by the label L.

The labeler 26 prints the identification of the division of the change data on the label L. When the change data is divided, the labeler 26 prints the indication (the denominator of the fraction) that the pack data is derived from the same change data. Thus, the label L of the change pack P indicates whether it is one of the divided data and specifies the other divided data. This enhances the efficiency of sorting the cash.

In response to the input of the change data for each store, the apparatus prepares the divided change packs P for each store. In response to the input of the change data for each cash-register, the apparatus prepares the divided change packs P for each cash-register. Thus, the change packs P can be prepared according to the desired units.

When the base sheet supplier 14 supplies the base sheet BS onto the container 12 (12a), the base sheet pusher 80 enters the concavity 44 to push the base sheet BS into the concavity 44 of the container 12 (12a). The base sheet insert 81 inserts the edge of the base sheet BS between the container body 38 and the stopper portion 50. As a result, the base sheet BS is formed into a box shape within the concavity 44, and the edge of the base sheet BS is engaged. Into the base sheet BS with the box shape, the coin roll deliverers 16 to 21 and 23 deliver the coin rolls C. In this process, the drop of the coin rolls C is shortened, preventing the coin rolls C from being bent or broken.

Before the base sheet insert 81 inserts the edge of the base sheet BS between the container body 38 and the stopper portion 50, the drive unit 83 detaches the stopper portion 50 from the holding surface 52 of the container body 38, so that the edge of the base sheet BS is reliably and easily inserted by the base sheet insert 81. After the base sheet insert 81 inserts the edge of the base sheet BS between the container body 38 and the stopper portion 50, the drive unit 83 moves the stopper portion 50 close to the holding surface 52 of the container body 38, preventing the edge of the base sheet BS from coming off. Therefore, the edge of the base sheet BS is securely inserted and satisfactorily held between the container 38 and the stopper portion 50.

The base sheet extractor 57 catching the base sheet BS moves downstream of the container 12 (12a), drawing out the base sheet BS onto the container 12 (12a), and then the base sheet cutter 59 cuts down the upstream portion of the base sheet BS. Thus, the base sheet BS is supplied to the container 12 (12a). The apparatus reduces the costs of the base sheet because the apparatus does not require a base sheet which is cut down beforehand.

When the base sheet engager 58 engages the downstream portion of the base sheet BS drawn out by the base sheet extractor 57, the base sheet extractor 57 releases the base sheet BS, returns to the position upstream of the container 12 (12a), and holds the upstream portion of the base sheet BS. Then, the base sheet cutter 57 cuts down the base sheet BS. Thus, the base sheet extractor 57 prevents the base sheet from being twisted, and allows the base sheet cutter 59 to cut down the base sheet BS. Because the base sheet extractor 57 returns to the base position, the next base sheet BS can be quickly drawn out.

The coin packagers 94 of the coin roll deliverers 16 to 19, 21, and 23 prepare coin rolls C from the loose coins, and discharge the coin rolls C so that the axes of the coin rolls C are parallel to the main conveyer 11. The coin rolls C are transferred by the coin roll conveyer 95 in the direction perpendicular to the axes of the coin rolls C. The guide portion 96 adjusts the axes of the coin rolls, and the counter deliverer 97 delivers the coin rolls to the containers 12 attached to the main conveyer 11. Thus, the coin rolls C are supplied while the axes of the coin rolls are aligned to be parallel, the positions of the delivered coin rolls C are stable so that the coin rolls C are securely loaded into the concavity 44 of the base sheet BS.

Each of the coin roll deliverers 16 to 19, 21, and 23, which includes the coin packagers 94, the coin roll conveyers 95, the guide portions 96, and the counter deliverers 97, is assigned for each type of cash. The coin roll deliverers 16 to 19, 21, and 23 are provided for all types of cash, thereby preventing a shortage of coin rolls. Further, the apparatus discharges the coin rolls while appropriately regulating the positions of the coin rolls. This reduces the labor required for the supply of the coin rolls C, eliminates complicated controls, and securely loads all types of coin rolls C in the concavity 44 on the base sheet BS.

In the stacked bills deliverer 22, the deliverer portion 119 delivers the stack of bills S1 one by one from the storage spaces 133 to 136, and the holder transporter 122 holds and loads the stack of bills S1 on the container 12 (12h). This apparatus eliminates the labor required for the transportation of the stacks of bills S1, and reduces the labor costs to prepare change.

Further, one holder transporters 122 is provided for all the types of the stacks of bills S1, thereby reducing the costs.

The aligner 121 aligns the positions of the stacks of bills S1, so that the holder transporter 122 can securely hold the stacks of bills S1, which are therefore reliably loaded on the container 12 (12h).

The holder transporter 122 changes the load positions of the stacks of bills S1 in the container 12 (12h), based on the input data, preventing the stacks of bills S1 from being irregularly loaded into the container 12. Thus, the stacks of bills S1 can be loaded efficiently and in a well-regulated manner in the storage space in the container 12.

The holder transporter 122 can arrange the load condition of the stacks of bills S1 within the container 12 (12h) based on the input data. For example, when the stacks of bills S1 interfere with the coin rolls C, the holder transporter 122 changes the load condition of the stacks of bills to avoid interference with the coin rolls. Thus, the stacks of bills S1 can be loaded efficiently and in a well-regulated manner in the storage space in the container 12 (12h).

When the container 12 reaches the loose bills loading position, the loose bills deliverer 32 delivers the loose bills while counting the number of the loose bills, based on the pack data corresponding to the container 12 (12j). Further, the conveyer drive controller 54 controls the transfer of the conveyer 12 based on the operation through the confirmation button 165. Until loading the loose bills is completed and the operator pushes the confirmation button 165, the conveyer 12 is stopped at the loose bills loading position. This prevents the container 12 from being accidentally transferred before loading the loose bills from the loose bills deliverers 32. Therefore, the loose bills can be securely loaded even in the manual operation.

When the number of the loose bills to be delivered exceeds the predetermined value, the loose bills deliverer 32 repeats the delivery of the loose bills so that the number of the loose bills to be delivered is below the predetermined value. Therefore, the number of loose bills is unlimited. The apparatus of the present invention can handle a large amount of the loose bills for change if necessary.

The repetition of the delivery of the loose bills is performed for each type of bills, so that the loose bills are divided within the container 12 (12j) according to their types. For example, the same type of loose bills may be bound by a rubber band and may be loaded into the container 12 (12j).

Because the division sensor 166 reports the repetition of the delivery of the loose bills, the operator can recognize the repetition, thus preventing an accident.

The loose bills deliverer 32, which repeats the delivery of the loose bills, pauses the delivery until the next input through the confirmation button 165. When the delivered loose bills are not removed, the deliverer does not deliver the next loose bills, preventing the next loose bills from being mixed with the prior loose bills. The conveyer drive unit 54 pauses the transfer of the container 12 until the next input through the confirmation button 165, and prevents unexpected movement of the conveyer 12 during the repetition of the delivery of the loose bills. Thus, when the loose bills are divided and the delivery is repeated, the loose bills are easily divided and sorted in the container 12, and are loaded securely and reliably.

The bonding device 27 bonds the base sheet BS and the top sheet TS outside the concavity 44 which includes the cash, preventing the coins and bills from being bonded together. Therefore, the apparatus can securely prepare the change pack even with an inexpensive sheet.

Because the outer portion of the base sheet BS outside the concavity 44 is held between the holding surface 52 of the container body 38 and the stopper portion 50, the outer portion can be prevented from being accidentally bent inwardly. Thus, the base sheet BS and the top sheet TS can be securely bonded.

Because the bonding device 27 bonds the base sheet BS and the top sheet TS outside the concavity 44 of the container body 38 and inside the stopper portion 50, the change pack P can be removed from the gap between the stopper portion 50 and the container body 38 even when the stopper portion 50 is provided.

The transverse side bonding portion 206 and the longitudinal side bonding portion 207 are independently operated at the different positions. That is, the bonding by the transverse side bonding portion 206 and the bonding by the longitudinal side bonding portion 207 are separately performed. Therefore, the intersections of the front and rear bonded portions and the right and left bonded portions are satisfactorily bonded, thereby enhancing the bonding strength. Further, the transverse side bonding portion 206 and the longitudinal side bonding portion 207 may operate simultaneously, thereby shortening the time required for bonding the entire sheets.

The top sheet extractor 177 catches the long top sheet TS and moves downstream of the container 12 (12m), so as to provide the top sheet TS on the container 12 (12m). Then, the top sheet cutter 179 cuts down the upstream portion of the top sheet TS to supply the top sheet TS on the container 12 (12m). The apparatus of the present invention does not require a top sheet which is cut beforehand depending on the shape of the container 12 (12m), thus reducing the costs of the top sheet TS.

When the top sheet engager 178 engages the upstream portion of the top sheet TS onto the container 12 (12m) extracted by the top sheet extractor 177, the top sheet extractor 177 releases the top sheet TS, returns to the position upstream of the container 12 (12m), and holds the upstream portion of the top sheet TS. Then, the top sheet cutter 179 cuts the top sheet TS. The top sheet extractor 177 prevents the top sheet TS from being twisted, thereby allowing the top sheet cutter 177 to securely cut the top sheet TS. The top sheet extractor 177, returns to the upstream position, and can quickly perform the next extraction of the top sheet TS.

The lifter 28 moves up the pins 217 through the bottom 42 of the concavity 44 of the container 12 (12o) to lift up the completed change pack P from the concavity 44, and holds and transfers the change pack P using the transfer device 29. By lifting up the change pack P from the concavity 44 using the pins 217, the transfer device 29 can easily hold the change pack P. Therefore, even when the change pack P is made of inexpensive base and top sheets, the change pack P can be easily transferred.

With the transfer device 29, the change pack P is automatically provided to the checker 30, which then automatically performs the check operation, thereby reducing the labor costs.

The checker 30 transfers the change pack P which is determined to be complete, thereby reducing the labor costs.

The bagging checker 32 displays the bag data of the target group through the display 240. Then, the operator prepares the bag, and the bagging checker controller 241 recognizes the group and confirms whether the group of the bag coincides with the group displayed on the display 240. When the group of the bag is not the displayed group, the controller informs the operator of the inconsistency by an alarm. On the other hand, when the bagging checker controller 241 determines that the group of the bag is the group displayed on the display 240, the operator prepares the change pack P whose group is identical to the group of the bag. The bagging checker controller 241 recognizes the group of the change pack P, and confirms whether the group of the change pack P is the group of the bag recognized by the bagging checker controller 241. When the group of the change pack P is not the group of the bag, the bagging checker controller 241 informs the operator of the inconsistency by an alarm. Thus, the completed change packs P can be bagged reliably.

By attaching the shipping tag to the bag, when the scanner 239 reads the barcode of the shipping tag of the bag which the operator prepared, the bagging checker controller 241 recognizes the group from the bar-code, and confirms whether the group is identical to the group displayed on the display 240. Thus, the group of the bag can be easily and reliably confirmed.

By attaching the label L to the change pack P, when the scanner 239 reads the bar-code of the label L of the change pack P, the bagging checker controller 241 recognizes the group from the bar-code, and confirms whether the group of the label L is identical to the group of the bag. Thus, the group of the bag can be easily and reliably confirmed.

The single scanner 239 is used for the recognition of the bag and the change pack P, reducing the costs and preventing mistakes of incorrect scanning. The single bagging checker controller 241 recognizes both the bag and the change pack P, thereby reducing the costs.

When the bagging checker controller 241 recognizes all the change packs P corresponding to the group of the bag, the display 240 displays the completion. Therefore, when bagging several change packs P, the operator will not forget to bag the change pack P. That is, a number of the change packs P can be reliably bagged.

The load adjuster 24 adjusts and regulates the coins and bills which are delivered on the base sheet BS in the concavity 44 of the container 12 (12k) by the coin roll deliverer 16 to 21 and 23. The load adjuster 24 prevents the top sheet TS and the base sheet BS from being unsatisfactorily bonded. Therefore, the top sheet TS and the base sheet BS are satisfactorily bonded.

Only when the sensor 172 detects that the condition of cash on the base sheet BS in the concavity 44 of the container 12 (12k) is incomplete, the adjuster portion 171 of the load adjuster 24 driven by the drive unit 170 adjusts and regulates the coins and bills. That is, when the coins and bills are appropriately loaded, the adjuster portion 171 does not work. Thus, the drive unit 170 can avoid useless operations, and can have durability.

Because the data input device 36 can set the change data for each store, each cash-register, or each day, the apparatus of the present invention can prepare different change for each day.

Further, because the relationship of the delivery date of the change pack P to the production date is preset, once the delivery date is input through the data input device 36, the production date is automatically set. Therefore, after setting the delivery date, the change packs P are automatically created on the production day.

In response to the input of the production date, the reserve calculator 249 counts all the change data of the change to be created on the production day, and calculates the amount of each type of cash. The printer, not shown, prints the amount of each type of cash, and the necessary reserve can be clearly confirmed before the production day.

To create the change packs P for each contractor, the contractor name is input to the contractor-based production instructor 251, which then reads the change data of the input contractor, and the main controller 243 creates the change packs of the input contractor based on the read change data. Thus, the change packs may be created for each contractor.

The store register 245 allows the registration of the store with the delivery route, which can be easily confirmed.

To create the change pack P for each delivery route, the delivery route is input to the delivery-route-based production instructor 251, which then reads all the change data of the input delivery route, and the main controller 243 creates the change packs P based on the read change data. Thus, the change packs may be created for each delivery route.

Second Embodiment

The second embodiment of the apparatus for dispensing change of the present invention will be explained with reference to FIGS. 55 to 65, in which the same reference numbers in the first embodiment designate like parts in the second embodiment and the difference will be discussed.

Figure 55:
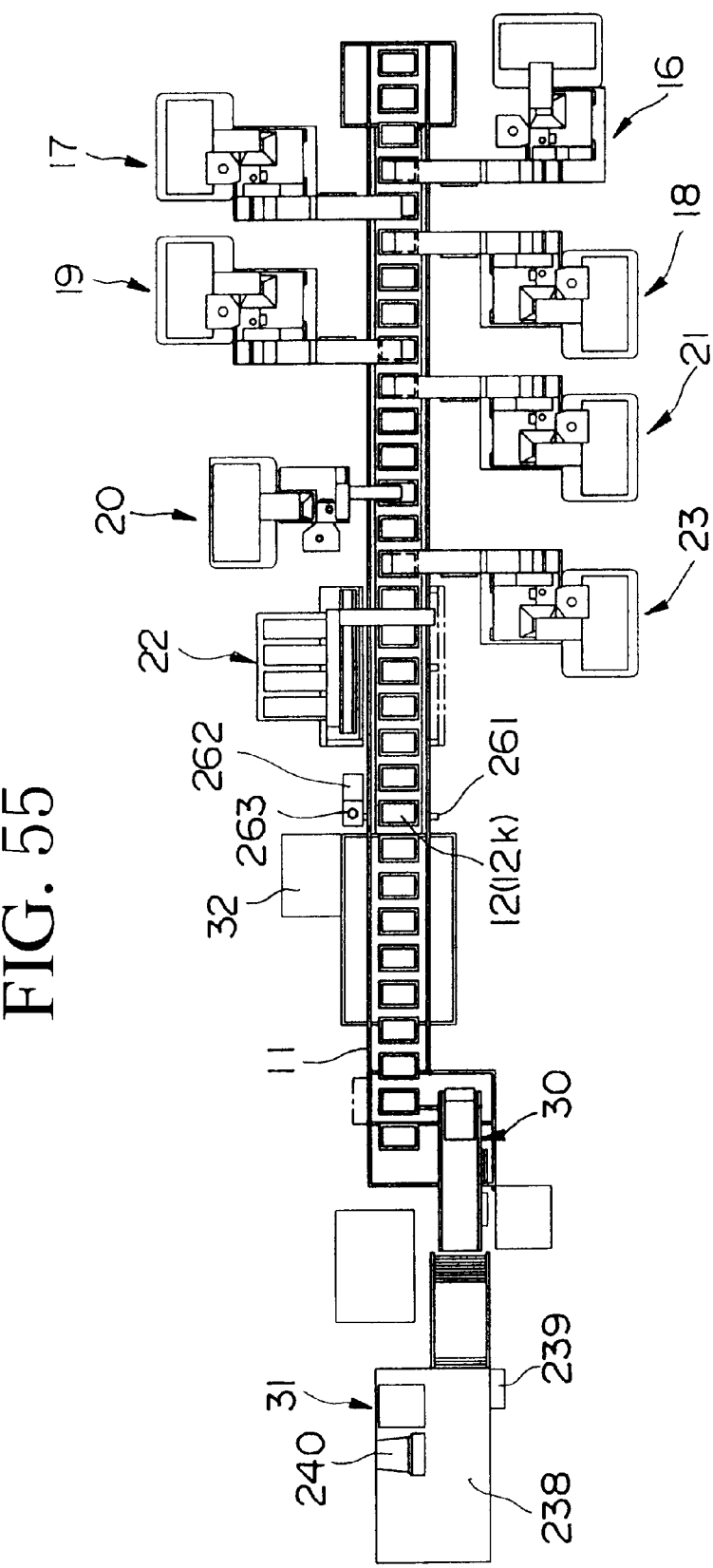
FIG. 55 is a top view showing the second embodiment of the apparatus for dispensing change of the present invention.

In the second embodiment, the layout is modified. As shown in FIG. 55, the second embodiment includes, in sequence from the upper stream, the coin roll deliverer 16 for delivering the coin roll of fifty 100-yen coins, the coin roll deliverer 17 for delivering the coin roll of fifty 50-yen coins, the coin roll deliverer 18 for delivering the coin roll of fifty 10-yen coins, the coin roll deliverer 19 for delivering the coin roll of fifty 500-yen coins, the coin roll deliverer 21 for delivering the coin roll of twenty 500-yen coins, the coin roll deliverer 23 for delivering the coin roll of fifty 1-yen coins, and a stacked bills deliverer 22.

The second embodiment is not equipped with a load sensor and a confirmation button. In the second embodiment, the loose bill deliverer controller (a cash deliverer, a loose bills deliverer, or a change pack producer) 163 controls the loose bills deliverer (a cash deliverer, a loose bills deliverer, or a change pack producer) 32 to deliver the stacks of loose bills, and a loose bills pack producer 255 automatically creates a loose bills pack P1 with the top sheet TS as a pack sheet.

Figure 56:
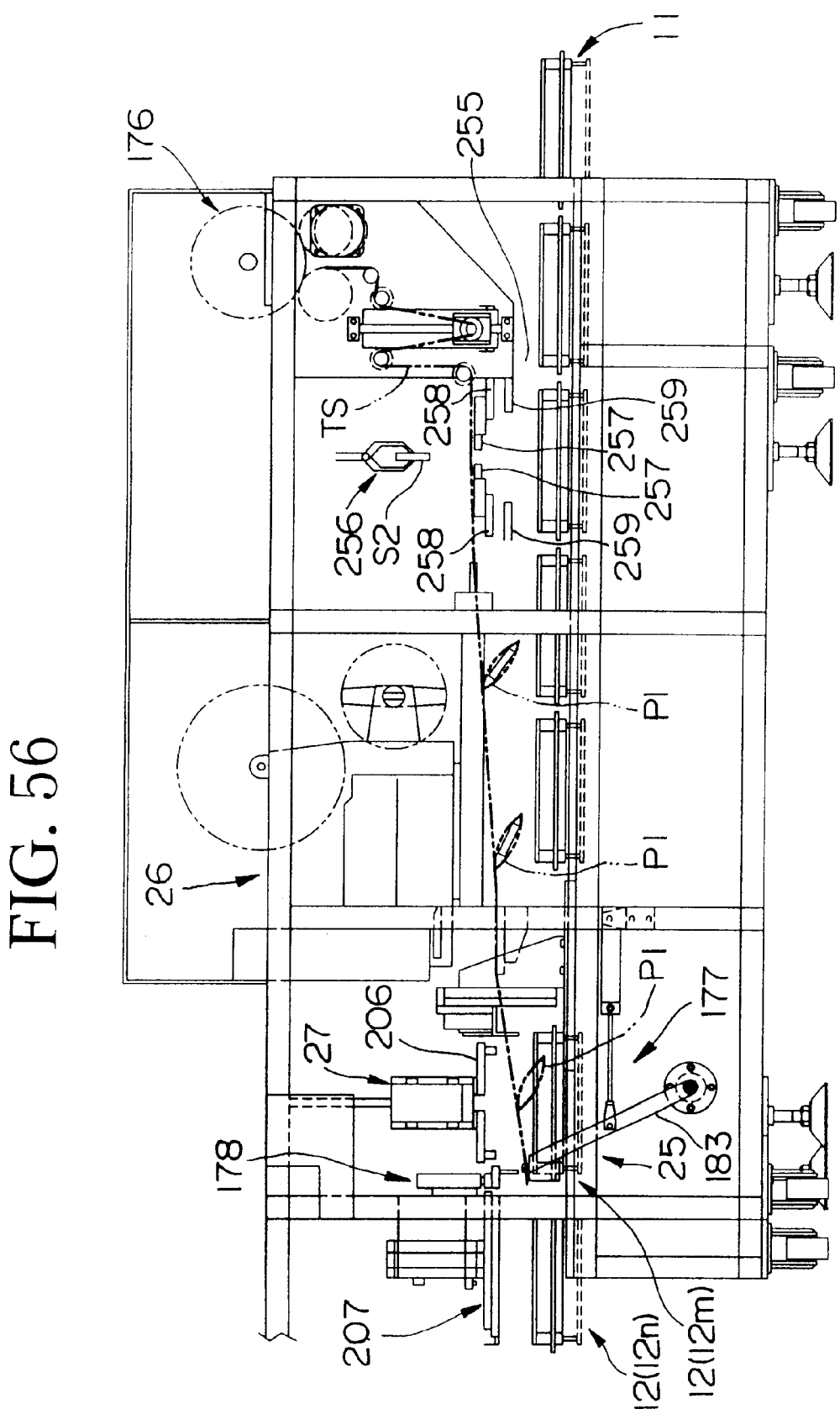
FIG. 56 is a side view showing a top sheet supplier, a labeler, and a bonding device of the second embodiment of the present invention.

As shown in FIG. 56, the loose bill pack producer 255 is located between the support 176 of the top sheet supplier 25 and the extracting arms 183 and upstream of the labeler 26. The loose bills pack producer 255 has a hand 256 for holding the stacks of loose bills delivered from the loose bills deliverer 32. The hand 256 with opened lower ends holds the loose bills S2 so that their longitudinal sides are aligned in the Y-direction, and that the loose bills S2 protrude downwardly. The hand 256 is vertically movable while holding the loose bills S2 (hereinafter referred as an "vertically moving condition").

The loose bills pack producer 255 has a pair of support bases 257, a pair of seals 258, and a pair of catchers 259. The support bases 257 support the underside of the top sheet TS and are disposed in front of and in the rear of the vertically movable hand 256. The support bases 257 are movable to approach and to separate from each other. The seals 258 are disposed below the support bases 257 and in front of and in the rear of the hand 256. The catchers 259 are disposed below the seals 258 and in front of and in the rear of the hand 256. The catchers 259 are movable to approach and separate from each other. The support bases 257 approach each other by a predetermined interval.

Figure 57:
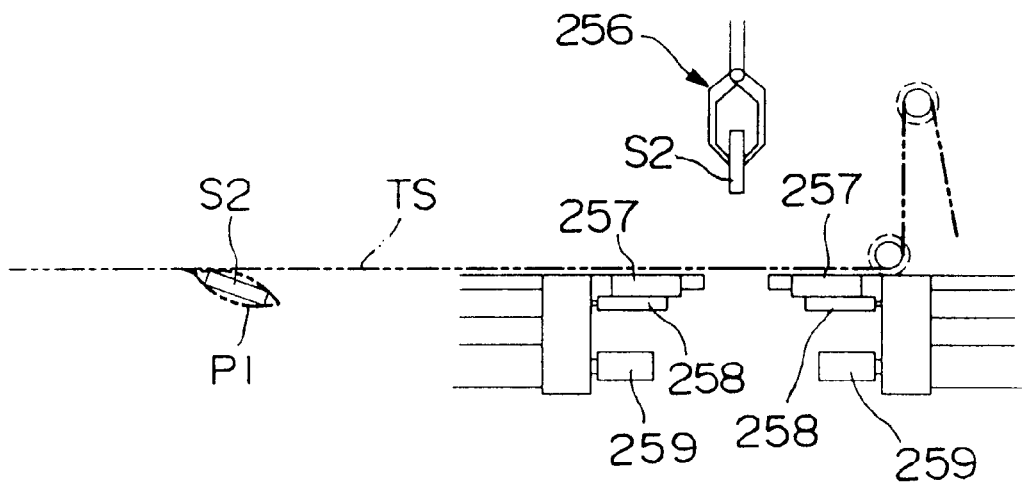
FIG. 57 is a side view showing the operation of a loose bills pack producer before moving down the loose bills in the second embodiment of the present invention.
Figure 58:
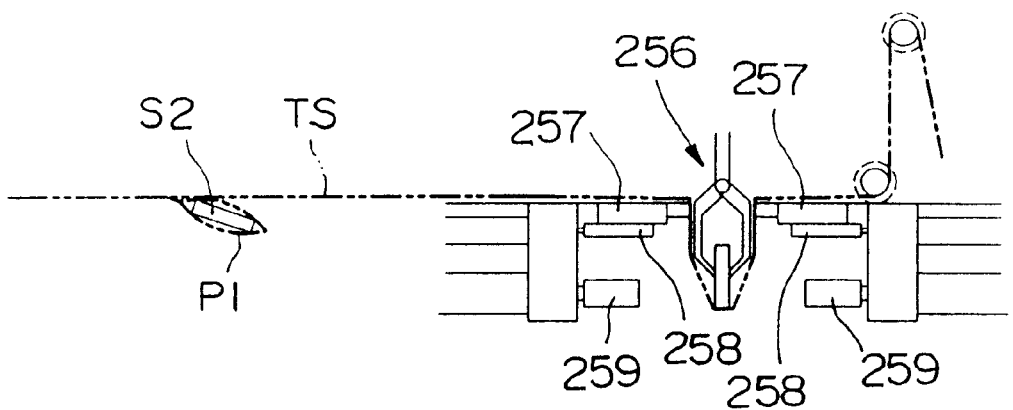
FIG. 58 is a side view showing the operation of the loose bills pack producer when moving down the loose bills in the second embodiment of the present invention.

The portion of the top sheet TS on the support bases 257 is assigned to a predetermined container 12. Therefore, based on the pack data corresponding to the portion of the top sheet TS on the support bases 257, the loose bills deliverer 32 delivers the stacks of loose bills S2. The loose bills pack producer 255 holds the loose bills S2 using the hand 256, and sets the hand 256 in the vertically moving position (FIG. 57). Then, the support bases 257 approach each other, the seals 258 separate from each other, and the catchers 259 separate from each other. The hand 256 is moved down while maintaining the vertically moving condition. The hand 256 passes between the support bases 257, and the loose bills S2 press the top sheet TS on the support bases 257. As a result, the top sheet TS, whose downstream portion is caught by the extracting arms 183, is drawn out from the support 176 so as to allow the loose bills S2 and the hand 256 to pass between the support bases 257. The top sheet TS is guided by the support bases 257 and is bent at the portion in contact with the lower ends of the loose bills S2 (FIG. 58).

Figure 59:
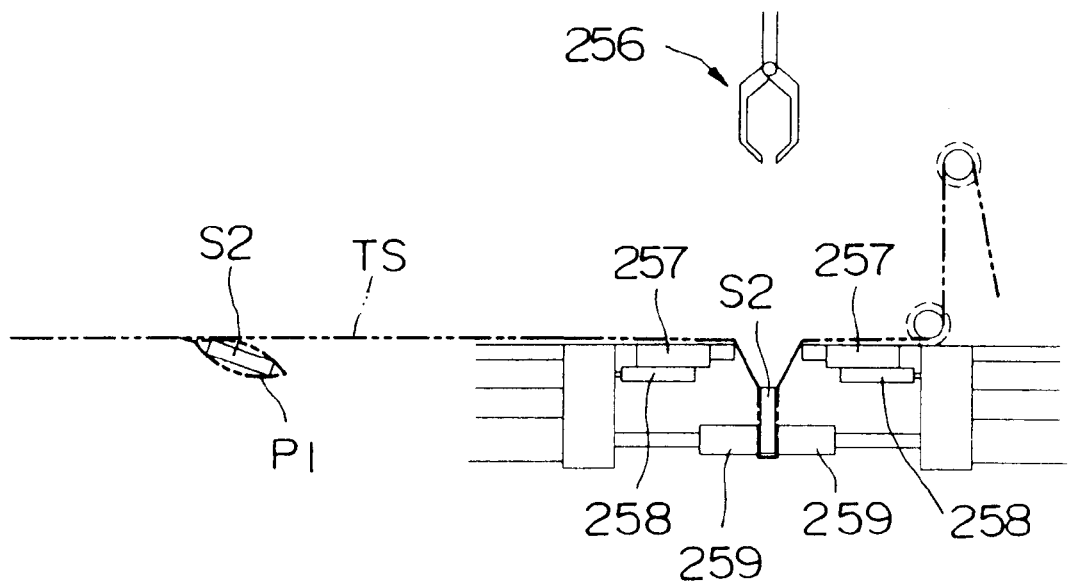
FIG. 59 is a side view showing the operation of the loose bills pack producer before catching the loose bills in the second embodiment of the present invention.

Then, the catchers 259 approach each other in the X-direction to catch the loose bills S2 with the top sheet TS, and the hand 256 releases the loose bills S2, is moved up, and extracted from the gap between support bases 257 (FIG. 59).

The hand 256 and the catchers 259 are complementary comb shapes for moving in the Y-direction and complementarily holding the loose bills S2. The catchers 259 catch the top sheet TS, and the hand 256 releases the loose bills S2 without disturbing the arrangement of the stacks of loose bills S2.

Figure 60:
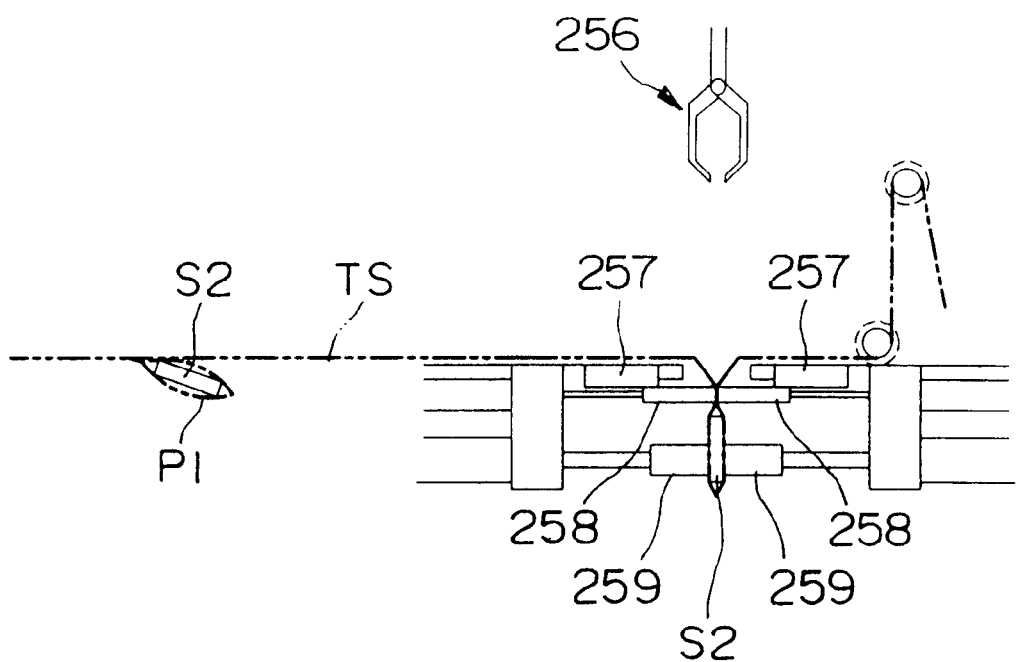
FIG. 60 is a side view showing the operation of the loose bills pack producer when bonding the top sheet in the second embodiment of the present invention.

The seals 258 approach each other to bend and overlap the top sheet TS above the loose bills S2, and the overlapped portions of the top sheet TS are bonded by heat (FIG. 60). Thus, the loose bills pack P1 packaging the loose bills S2 with the top sheet TS is formed. To prevent the loose bills S2 from falling from the openings of the loose bills pack P1 in the Y-direction, the portions of the top sheet TS on both right and left sides of the loose bills S2 may be bonded.

Figure 61:
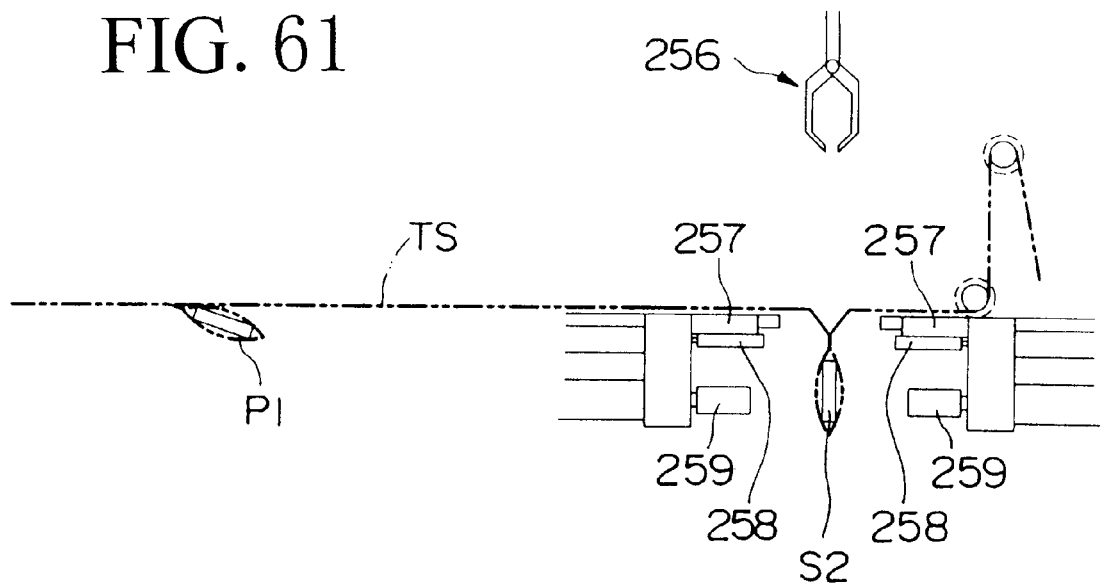
FIG. 61 is a side view showing the operation of the loose bills pack producer after bonding the top sheet in the second embodiment of the present invention.

Then, the seals 258 separate from each other, the catchers 259 separate from each other, and the support bases 257 separate from each other (FIG. 61).

Figure 62:
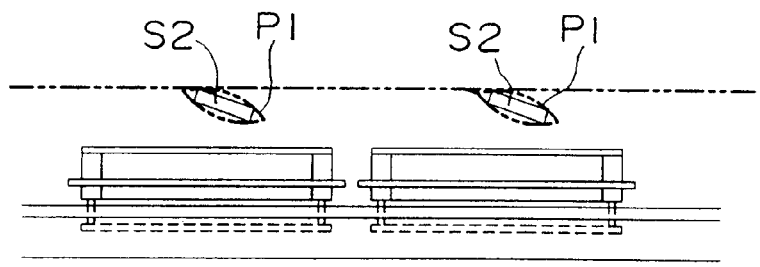
FIG. 62 is a side view showing the operation of the loose bills pack producer when transferring the loose bills pack in the second embodiment of the present invention.

The loose bills pack P1, which is formed on the top sheet TS, is transferred with the top sheet TS by the top sheet extractor 177 of the top sheet supplier 25 which is controlled by the top sheet supply bonding controller 180 (FIG. 62). The loose bills pack P1 is transferred to the container 12 (12*m*) stopped at the top sheet supply position. Then, the top sheet TS is cut at its downstream portion in the process for producing the prior change pack P, and the top sheet extractor 177 extracts the top sheet TS so as to position the loose bill pack P1 above the concavity 44 of the container 12 (12*m*) (FIG. 56). The bonding device 27 bonds the top sheet TS with the base sheet BS, and the top sheet cutter 179 cuts the top sheet TS at its upstream portion, so that the loose bills pack P1 is included into the change pack P.

Figure 63:
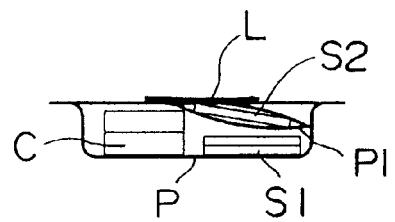
FIG. 63 is a side view showing the change pack produced by the second embodiment of the present invention.

In this change pack P, the loose bills S2 are held in the loose bills pack P1 which is bent toward the base sheet BS while the other cash is loaded between the top sheet TS and the base sheet BS (FIG. 63).

The second embodiment does not have a load adjuster. Instead, the second embodiment includes a sensor 261, an incomplete loading alarm 262, and a confirmation button 263. The sensor 261 is located slightly above the container 12 (12*k*) between the stacked bills deliverer 22 and the loose bills pack producer 255 and monitors the condition of the loaded coin rolls C. The incomplete loading alarm 262 gives alarm by a visual or auditory means. The confirmation button 263 receives the input by the operator. The sensor 261, the incomplete loading alarm 262, and the confirmation button 263 are electrically connected to an adjustment controller, not shown.

When the stacked coin rolls C reach a specified height above the container 12 (12*k*), the sensor 261 detects the over-height. The sensor 261 may be an optical sensor which performs the detection based on an interrupted light path.

When the container 12 is stopped at the adjustment position, the adjustment controller determines whether the sensor 261 detects the coin roll C. When the sensor 261 detects the coin roll C, the controller determines that the condition of the loaded coin rolls C is incomplete, and instructs the incomplete loading alarm 262 to give an alarm. On the other hand, when the sensor 261 does not detect the coin roll C, the controller determines that the condition of the loaded coin rolls C is complete, outputs the transfer permission signal to the integrated pack production controller 35, and turns on the transfer permission flag (transfer control flag).

When the incomplete loading alarm 262 gives an alarm, the operator recognizes that the loading condition is incomplete, and manually adjusts and regulates the coins and bills on the container 12 (12*k*). After the adjustment of the cash is completed, the operator pushes the confirmation button 263, and then the adjustment controller outputs the transfer permission signal to the integrated pack production controller 35 and turns on the transfer permission flag.

When the sensor 261 detects the coin roll C, the adjustment controller does not output the transfer permission signal to the integrated pack production controller 35 until the operator pushes the confirmation button 263. Because at least one of the transfer permission flags is in the off-state, the container 12 is not transferred. Therefore, this prevents the top sheet TS from accidentally being supplied on and bonded to the base sheet BS on the container 12 at the adjustment position. When the confirmation button 263 is pushed, the adjustment controller outputs the transfer permission flag to the integrated pack production controller 35 and turns on the transfer permission flag. Then, the top sheet TS is supplied and is bonded by heat onto the base sheet BS on the container 12 (12*k*) at the adjustment position.

The lifter 28 and the transfer device 29 in the second embodiment differ from those in the first embodiment.

Figure 64:
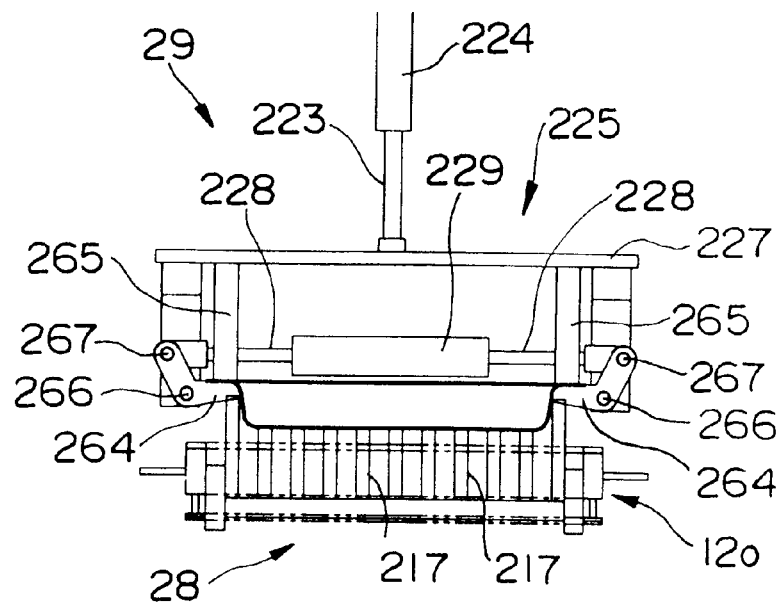
FIG. 64 is a front view showing the operations of the lifter and the transfer device of the second embodiment of the present invention.

As shown in FIG. 64, the heights of the pins 217 in the lifter 28 are different. Specifically, all the pins 217 are positioned on grids, and the pins 217 nearest both outer edges, as seen from the X- and Y-directions, are higher than the other pins 217. That is, the outermost pins 217 as seen from the top side are higher than the other inner pins 217.

Figure 65:
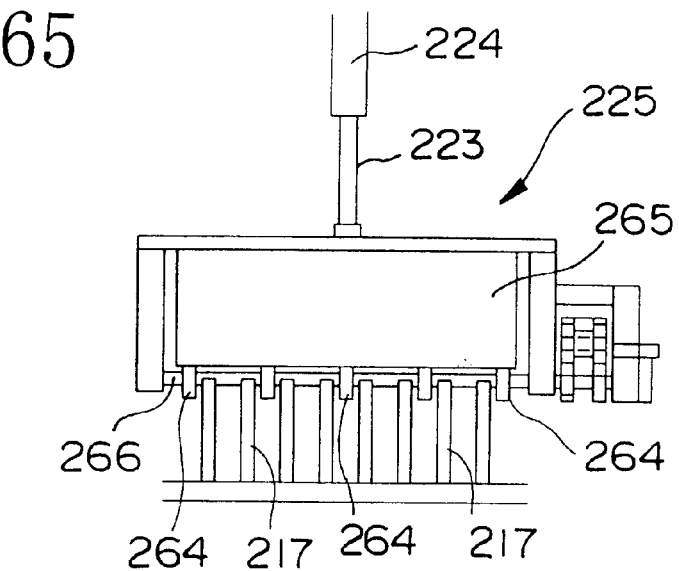
FIG. 65 is a side view showing the operations of the lifter and the transfer device of the second embodiment of the present invention.

The transfer device 29, shown in FIGS. 64 and 65, has a support 225 different from that of the first embodiment. Specifically, the support 225 has lower claws 264, and an upper stopper 265. The lower claws 264 are coupled via support shafts 267 to movable shafts 228 of the support drive units 229, and are arranged symmetrically to each other. The upper stopper 265 is attached to the upper ends of the lower claws 264. The lower claws 264 are rotatably attached to a base 227 by a support shaft 226 so that the lower claws 264 symmetrically extend to each other. The support drive units 229 rotate up and down the ends of the lower claws 264 by the support shaft 266. When the lower claws 264 are rotated so that their ends are moved up, the ends of the lower claws 264 come in contact with the upper stopper portion 265.

On the upper surfaces of the ends of the lower claws 264 and of the underside of the upper stopper 265, high frictional portions are attached in order to prevent the held change pack P from accidentally falling because of its weight.

A number of the lower claws 264 are arranged on both sides in the Y-direction, forming comb shapes.

The intervals between the lower claws 264 correspond to the highest outermost pins 217 of the lifter 28 so that the lower claws 264 can be inserted between the pins 217.

The transfer controller 215 moves the support 225 by the transfer drive unit 222 to a specified position just above the container 12 (12o), moves up the support 225 by the vertical drive unit 224, separates the lower claws 264 from the upper stoppers 265, and stands by.

When the lifter 28 lifts up the change pack P in the container 12 (12o), the vertical drive unit 224 moves down the support 225. When the lower claws 264 and the upper stoppers 265 are moved down to the same level as the bonded portion of the top sheet TS and the base sheet BS of the change pack P, the support drive units 229 rotate the lower claws 264 and inserts them between the pins 217, thus holding the change pack P using the lower claws 264 and the upper stoppers 265 (FIG. 64).

Because the pins 217 of the lifter 28 are higher than the inner pins, the cash moves toward the center of the change pack P off the portions held by the support 225.

Then, the vertical drive unit 224 moves up the support 225. While holding the change pack P, the support 225 lifts up the change pack P, separates it from the pins 217, and moves it above the checker 30. The vertical drive unit 224 moves down the support 225. The lower claws 264 of the support 225 are rotated so as to release the change pack P from the lower claws 264 and the upper stoppers 265, at which point the change pack P is delivered to the checker 30.

In the second embodiment, the change pack P, lifted up by the pins 217, is held by the lower claws 264, inserted between the pins 217, and by the upper stoppers 265 above the change pack P, and is transferred by moving up the lower claws 265 and the upper stoppers 265. Therefore, the lower claws 265 and the upper stoppers 265 can be small, and the change pack P with an unstable shape can be held securely.

Because the pins 217 are higher than the inner pins, the coins and bills are moved toward the center when the change pack P is lifted up. This prevents the coins and bills from being held by the upper stoppers 265 and the lower claws 264.

The loose bills deliverer 32 counts the loose bills and delivers the stack of loose bills based on the input data. The loose bills pack producer 255 packs the loose bills with the top sheet TS as a pack sheet to create the loose bills pack P1. The top sheet supplier 25 loads the loose bills pack P onto the container 12 (12m). Thus, the loose bills S2 are collected and loaded not manually, but automatically. This automatic loading operation reduces the labor costs to prepare change.

The hand 256 and the support bases 257 of the loose bills pack producer 255 press the loose bills S2 onto the top sheet TS, which is then bent. The seals 258 bond the bent portion to the other portion of the top sheet TS, thus completing the loose bills pack P1. The loose bills pack PI can be easily prepared, eliminating a complicated mechanism and reducing the costs.

Because the top sheet TS is also used as the pack sheet for the loose bills S2, the costs of preparing the loose bills pack can be reduced. Further, because the top sheet supplier 25 transfers the loose bills, the costs of manufacturing the entire apparatus can be reduced.

When the sensor 261 detects that the condition of the coin rolls, delivered to the base sheet BS in the concavity 44 of the container 12 (12k) by the coin roll deliverers 16 to 21, and 23, is incomplete, the incomplete loading alarm 262 gives an alarm, and the adjustment controller does not allow bonding base sheet BS and the top sheet TS by the bonding device 27. After the operator who receives the alarm adjusts the condition of the cash and pushes the confirmation button, the adjustment controller permits bonding the base sheet BS and the top sheet TS by the bonding device 27. Thus, even when the condition of the loaded coins and bills is incomplete, the apparatus of the present invention prevents incompletely bonding the top sheet TS and the base sheet BS. That is, the apparatus of the present invention bonds the top sheet TS and the base sheet BS completely and satisfactorily.

While in the first and second embodiments the containers 12 are discontinuously transferred by one pitch corresponding to the interval between the containers 12, the containers 12 may be stopped at positions off the pitch. In this case, when the container 12 stores only a number of the coin rolls, the coin roll deliverers 16 to 21, and 23 may deliver the coin rolls so that the axes of the coin rolls are aligned in the X-direction, setting the size of the change pack P appropriately. When the containers 12 are positioned at the predetermined pitches, the coin roll deliverers 16 to 21, and 23 may deliver the coin rolls by guiding them with the walls 41 downstream of the container 12. When the containers 12 are positioned off the pitches, that is, at intermediate positions, the positions of the coin roll deliverers 16 to 21 and 23 may determined so that the coin rolls are guided by the walls 41 upstream of the containers 12.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An apparatus for dispensing change and packing cash in a change pack for a plurality of contract dealers based on input change data, comprising:

a contract dealer storage device for storing contract dealer information;

a store storage device for storing store information of said contract dealers, said store storage device registering a delivery route for the stores;

a cash-register storage device for storing cash register information for said stores;

a data input device for inputting change data by at least one of a store and a cash register for each contract dealer for each day;

a change data calculator for calculating amounts of cash corresponding to the change data to be delivered to the respective stored stores and cash registers of the contract dealers, on each day based on the input change data;

a comparator for determining whether a calculated amount of cash corresponding to a said change data can be packed in one change pack;

a change data divider for dividing said change data into divided change data, each having an amount of cash than can be packed in one change pack, when said calculated amount of cash can not be packed in one change pack;

a change pack production date setter for setting a production date of at least one change pack in response to input of change data including a delivery date for the cash;

a change pack produce for successively and automatically producing a plurality of change packs which contain cash for the stores and cash registers of the contract dealers to use for change, bas d on the change data and divided change data; and a delivery-route-based production instructor for instructing the change pack producer to produce the chan e packs by a delivery route according to a production instruction, on the respective production date set by the change pack production date setter.

2. An apparatus according to claim 1, wherein said data input device allows the registration of a relationship of a delivery date of the change pack to a production date of the change pack.

3. An apparatus according to claim 2, further comprising a contract dealer based production instructor for producing the change pack for each contract dealer in response to an instruction.

4. An apparatus according to claim 2, further comprising:

a reserve calculator for adding up all the change data of change to be prepared on a production date of the change packs, and calculating an amount of each type of cash to be prepared; and a printer for printing the amount of each type of cash calculated by said reserve calculator.

5. An apparatus according to claim 4, further comprising a contract dealer based production instructor for producing the change pack for each contract dealer in response to an instruction.

6. An apparatus according to claim 1, further comprising:

a reserve calculator for adding up all the change data of change to be prepared on a production date of the change packs, and calculating an amount of each type of cash to be prepared; and a printer for printing the amount of each type of cash calculated by said reserve calculator.

7. An apparatus according to claim 6, further comprising a contract dealer based production instructor for producing the change pack for each contract dealer in response to an instruction.

8. An apparatus according to claim 1, further comprising a contract dealer based production instructor for producing the change pack for each contract dealer in response to an instruction.

* * * * *